US011797568B2

(12) United States Patent
Mahale et al.

(10) Patent No.: US 11,797,568 B2
(45) Date of Patent: *Oct. 24, 2023

(54) DYNAMIC CHRONOMETRY DATA ORIENTATION

(71) Applicant: ThoughtSpot, Inc., Mountain View, CA (US)

(72) Inventors: Tushar Mahale, Milpitas, CA (US); Siva Singaram, San Jose, CA (US); Vishwas Sharma, Foster City, CA (US); Donko Donjerkovic, San Mateo, CA (US); Simranjyot Singh Gill, San Jose, CA (US); Archit Bansal, Cupertino, CA (US); Rakesh Kothari, San Jose, CA (US); Sanchit Gupta, Sunnyvale, CA (US)

(73) Assignee: ThoughtSpot, Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/067,452

(22) Filed: Dec. 16, 2022

(65) Prior Publication Data
US 2023/0124508 A1    Apr. 20, 2023

Related U.S. Application Data

(63) Continuation of application No. 16/834,149, filed on Mar. 30, 2020, now Pat. No. 11,550,817.

(51) Int. Cl.
*G06F 16/00* (2019.01)
*G06F 16/27* (2019.01)
*G06F 16/2458* (2019.01)

(52) U.S. Cl.
CPC .......... *G06F 16/27* (2019.01); *G06F 16/2477* (2019.01)

(58) Field of Classification Search
CPC .............................. G06F 16/27; G06F 16/2477
See application file for complete search history.

(56) References Cited

U.S. PATENT DOCUMENTS

| 5,719,826 | A  | 2/1998 | Lips          |
|-----------|----|--------|---------------|
| 7,099,659 | B1 | 8/2006 | Schnake et al.|

(Continued)

FOREIGN PATENT DOCUMENTS

| WO | 2012048163 A2      | 4/2012 |             |
|----|--------------------|--------|-------------|
| WO | WO-2012048163 A2 * | 4/2012 | G06Q 10/10  |

OTHER PUBLICATIONS

ISO/TC 154 N, "Data elements and interchange formats—Information interchange—Representation of dates and times—Part 1: Basic rules", Oct. 26, 2016, www.iso.org (48 pp).

(Continued)

*Primary Examiner* — Syed H Hasan
(74) *Attorney, Agent, or Firm* — Young Basile Hanlon & MacFarlane, P.C.

(57) ABSTRACT

Operating a low-latency database analysis system using domain-specific chronometry may include obtaining chronometry configuration data including chronometric instance data describing an instance of a chronometric unit of a domain-specific chronometry dataset that describes an era, such that the chronometry configuration data includes respective chronometric instance data describing each instance of the first chronometric unit of the domain-specific chronometry dataset for the era of the domain-specific chronometry dataset, generating, in the low-latency database analysis system, a domain-specific chronometry dataset in accordance with the chronometry configuration data, such that the domain-specific chronometry dataset describes a chronometric unit such that a temporal location expressed with reference to the chronometric unit and indicative of an epoch value differs from a temporal location indicative of (Continued)

the epoch value and expressed in accordance with a canonical chronometry, and storing the domain-specific chronometry dataset in the low-latency database analysis system.

20 Claims, 7 Drawing Sheets

(56) References Cited

U.S. PATENT DOCUMENTS

| | | | |
|---|---|---|---|
| 7,349,920 | B1 | 3/2008 | Feinberg et al. |
| 7,533,348 | B2 | 5/2009 | D'Hers et al. |
| 7,543,125 | B2 | 6/2009 | Gokhale |
| 7,870,016 | B2 | 1/2011 | Fazal et al. |
| 8,266,193 | B2 | 9/2012 | Fong et al. |
| 8,966,381 | B2 | 2/2015 | Dong et al. |
| 9,576,007 | B1 | 2/2017 | Sivathanu et al. |
| 10,324,956 | B1 | 6/2019 | Tang |
| 10,929,486 | B1 | 2/2021 | Chau et al. |
| 2002/0194014 | A1 | 12/2002 | Starnes et al. |
| 2003/0105852 | A1 | 6/2003 | Das et al. |
| 2003/0115188 | A1 | 6/2003 | Srinivasa et al. |
| 2005/0091269 | A1 | 4/2005 | Gerber et al. |
| 2005/0094494 | A1 | 5/2005 | Parees et al. |
| 2006/0253475 | A1* | 11/2006 | Stewart ............... G06Q 10/109 |
| 2009/0271791 | A1 | 10/2009 | Gokhale |
| 2012/0054623 | A1* | 3/2012 | Guan ................... G06Q 10/109 708/111 |
| 2012/0239451 | A1 | 9/2012 | Caligor |
| 2012/0303425 | A1 | 11/2012 | Katzin et al. |
| 2015/0172330 | A1 | 6/2015 | Kaplan |
| 2016/0180294 | A1 | 6/2016 | Simon et al. |
| 2018/0157729 | A1 | 6/2018 | Lee |
| 2018/0302443 | A1 | 10/2018 | Weiss et al. |
| 2020/0090130 | A1 | 3/2020 | Penzo et al. |
| 2020/0143304 | A1 | 5/2020 | Schwartz et al. |

OTHER PUBLICATIONS

NRF, "4-5-4 Calendar", NRF Protect, National Retail Federalation, NRF Job Board, https://nrf.com/resources/4-5-4-calendar, Date Unknown, Downloaded Mar. 30, 2020 (4 pp).

Wikipedia, "ISO week date", https://en.wikipedia.org/wiki/ISO_week_date, Date Unknown, Downloaded Jan. 8, 2020 (8 pp).

Zhang, Hao, et al., "In-Memory Big Data Management and Processing: a Survey", IEEE Transactions on Knowledge and Data Engineering, IEEE Service Centre, Los Alamitos, CA, US, vol. 27, No. 7, Jul. 2, 2015, pp. 1920-1948 XP011583218 (29 pp).

Extended European Search Report dated Aug. 2, 2021, in co-pending EP Application No. 21165981.8 (13 pp).

De Jong, K., et al., "A Physical Data Model for Spatio-Temporal Objects", Environmental Modelling and Software, vol. 122, Oct. 16, 2019, XP085913515 (15 pp).

* cited by examiner

DYNAMIC CHRONOMETRY DATA ORIENTATION

CROSS-REFERENCE TO RELATED APPLICATION(S)

This application is a continuation of U.S. patent application Ser. No. 16/834,149, filed Mar. 30, 2020, the entire disclosure of which is hereby incorporated by reference.

BACKGROUND

Advances in computer storage and database technology have led to exponential growth of the amount of data being created. Businesses are overwhelmed by the volume of the data stored in their computer systems. Existing database analytic tools are inefficient, costly to utilize, and/or require substantial configuration and training.

SUMMARY

Disclosed herein are implementations of dynamic chronometry data orientation in a low-latency database analysis system.

An aspect of the disclosure is a method of dynamic chronometry data orientation for use in a low-latency database analysis system. The method includes obtaining chronometry configuration data, generating, in the low-latency database analysis system, a domain-specific chronometry dataset in accordance with the chronometry configuration data, such that the domain-specific chronometry dataset describes a chronometric unit such that a temporal location expressed with reference to the chronometric unit and indicative of an epoch value differs from a temporal location indicative of the epoch value and expressed in accordance with a canonical chronometry, and storing the domain-specific chronometry dataset in the low-latency database analysis system.

Another aspect of the disclosure is a method of dynamic chronometry data orientation for use in a low-latency database analysis system. The method includes obtaining chronometry configuration data. The method includes generating, in the low-latency database analysis system, a domain-specific chronometry dataset in accordance with the chronometry configuration data, such that the domain-specific chronometry dataset describes a chronometric unit such that a temporal location expressed with reference to the chronometric unit and indicative of an epoch value differs from a temporal location indicative of the epoch value and expressed in accordance with a canonical chronometry. The method includes generating a chronometry table in a distributed in-memory database of the low-latency database analysis system, storing the domain-specific chronometry dataset in the chronometry table in the low-latency database analysis system, generating an object representing the domain-specific chronometry dataset, storing the object in a distributed in-memory ontology of the low-latency database analysis system as ontological data representing the domain-specific chronometry dataset, generating a chronometry index for indexing descriptor values for chronometric units from the domain-specific chronometry dataset associated with a chronometric unit type, and generating a finite state machine based on the ontological data representing the domain-specific chronometry dataset.

Another aspect of the disclosure is a method of dynamic chronometry data orientation for use in a low-latency database analysis system. The method includes obtaining chronometry configuration data, wherein the chronometry configuration data includes chronometric instance data describing an instance of a first chronometric unit of the domain-specific chronometry dataset, wherein the domain-specific chronometry dataset describes an era corresponding to a duration from a minimum chronometric location of the domain-specific chronometry dataset to a maximum chronometric location of the domain-specific chronometry dataset, such that the chronometry configuration data includes respective chronometric instance data describing each instance of the first chronometric unit of the domain-specific chronometry dataset for the era of the domain-specific chronometry dataset. The method includes generating, in the low-latency database analysis system, a domain-specific chronometry dataset in accordance with the chronometry configuration data, such that the domain-specific chronometry dataset describes a chronometric unit such that a temporal location expressed with reference to the chronometric unit and indicative of an epoch value differs from a temporal location indicative of the epoch value and expressed in accordance with a canonical chronometry. The method includes storing the domain-specific chronometry dataset in the low-latency database analysis system.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
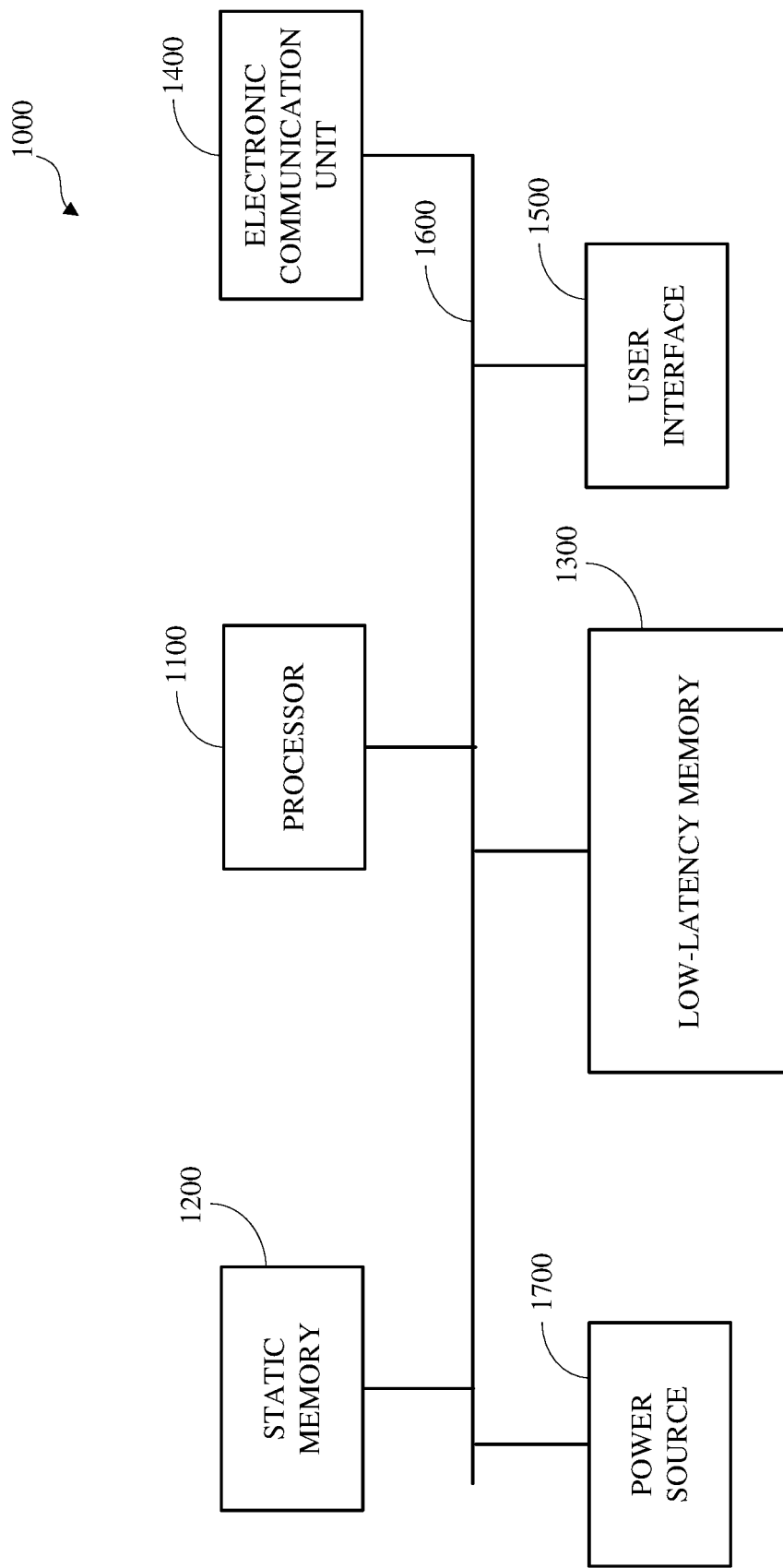
FIG. 1 is a block diagram of an example of a computing device.

Businesses and other organizations store large amounts of data, such as business records, transaction records, and the like, in data storage systems, such as relational database systems that store data as records, or rows, having values, or fields, corresponding to respective columns in tables that can be interrelated using key values. Databases structures are often normalized or otherwise organized to maximize data density and to maximize transactional data operations at the expense of increased complexity and reduced accessibility for analysis. Individual records and tables may have little or no utility without substantial correlation, interpretation, and analysis. The complexity of these data structures and the large volumes of data that can be stored therein limit the accessibility of the data and require substantial skilled human resources to code procedures and tools that allow business users to access useful data. The tools that are available for accessing these systems are limited to outputting data expressly requested by the users and lack the capability to identify and prioritize data other than the data expressly requested. Useful data, such as data aggregations, patterns, and statistical anomalies that would not be available in smaller data sets (e.g., 10,000 rows of data), and may not be apparent to human users, may be derivable using the large volume of data (e.g., millions or billions of rows) stored in complex data storage systems, such as relational database systems, and may be inaccessible due to the complexity and limitations of the data storage systems.

Some analytical data access systems may be based on the use of a system-defined chronometry for representing temporal data, such as time and date data. For example, the system-defined chronometry may correspond with a Gregorian calendar. The system-defined chronometry may be implemented as program instructions, which may include aspects that are defined by the operating environment of the analytical data access, or low-latency database analysis, system, such as by a hardware component, an operating system, or a combination thereof. Analytical data access systems based on the use of a system-defined chronometry may omit support for representing data using chronometry or calendaring systems that vary from the system-defined, e.g., Gregorian, chronometry. Including support other chronometry, such as a domain-specific or user-defined chronometry may be unavailable or may be based on inefficient and expensive manual coding.

Analytical data access systems including dynamic chronometry data orientation may include the use of domain-specific chronometry, such as instead of, in addition to, or in combination with, the use of system-defined chronometry. Analytical data access systems including dynamic chronometry data orientation may obtain chronometry configuration data defining or describing a domain-specific chronometry. For example, analytical data access systems including dynamic chronometry data orientation may include an interface, such as a user interface, for defining or describing the domain-specific chronometry configuration data. Analytical data access systems including dynamic chronometry data orientation may generate a domain-specific chronometry dataset in accordance with the chronometry configuration data. The domain-specific chronometry dataset may be stored in the analytical data access, or low-latency database analysis, system. Analytical data access systems including dynamic chronometry data orientation may represent temporal data, such as time and date data, using domain-specific chronometry. Analytical data access systems including dynamic chronometry data orientation may improve the efficiency, accuracy, and utility of analytical data access systems by dynamically representing temporal data, such as time and date data, with respect to domain-specific, or user-defined, chronometry.

FIG. 1 is a block diagram of an example of a computing device 1000. One or more aspects of this disclosure may be implemented using the computing device 1000. The computing device 1000 includes a processor 1100, static memory 1200, low-latency memory 1300, an electronic communication unit 1400, a user interface 1500, a bus 1600, and a power source 1700. Although shown as a single unit, any one or more element of the computing device 1000 may be integrated into any number of separate physical units. For example, the low-latency memory 1300 and the processor 1100 may be integrated in a first physical unit and the user interface 1500 may be integrated in a second physical unit. Although not shown in FIG. 1, the computing device 1000 may include other aspects, such as an enclosure or one or more sensors.

The computing device 1000 may be a stationary computing device, such as a personal computer (PC), a server, a workstation, a minicomputer, or a mainframe computer; or a mobile computing device, such as a mobile telephone, a personal digital assistant (PDA), a laptop, or a tablet PC.

The processor 1100 may include any device or combination of devices capable of manipulating or processing a signal or other information, including optical processors, quantum processors, molecular processors, or a combination thereof. The processor 1100 may be a central processing unit (CPU), such as a microprocessor, and may include one or more processing units, which may respectively include one or more processing cores. The processor 1100 may include multiple interconnected processors. For example, the multiple processors may be hardwired or networked, including wirelessly networked. In some implementations, the operations of the processor 1100 may be distributed across multiple physical devices or units that may be coupled directly or across a network. In some implementations, the processor 1100 may include a cache, or cache memory, for internal storage of operating data or instructions. The processor 1100 may include one or more special purpose processors, one or more digital signal processor (DSP), one or more microprocessors, one or more controllers, one or more microcontrollers, one or more integrated circuits, one or more an Application Specific Integrated Circuits, one or more Field Programmable Gate Array, one or more programmable logic arrays, one or more programmable logic controllers, firmware, one or more state machines, or any combination thereof.

The processor 1100 may be operatively coupled with the static memory 1200, the low-latency memory 1300, the electronic communication unit 1400, the user interface 1500, the bus 1600, the power source 1700, or any combination thereof. The processor may execute, which may include controlling, such as by sending electronic signals to, receiving electronic signals from, or both, the static memory 1200, the low-latency memory 1300, the electronic communication unit 1400, the user interface 1500, the bus 1600, the power source 1700, or any combination thereof to execute, instructions, programs, code, applications, or the like, which may include executing one or more aspects of an operating system, and which may include executing one or more instructions to perform one or more aspects described herein, alone or in combination with one or more other processors.

The static memory 1200 is coupled to the processor 1100 via the bus 1600 and may include non-volatile memory, such as a disk drive, or any form of non-volatile memory capable of persistent electronic information storage, such as in the absence of an active power supply. Although shown as a single block in FIG. 1, the static memory 1200 may be implemented as multiple logical or physical units.

The static memory 1200 may store executable instructions or data, such as application data, an operating system, or a combination thereof, for access by the processor 1100. The executable instructions may be organized into programmable modules or algorithms, functional programs, codes, code segments, or combinations thereof to perform one or more aspects, features, or elements described herein. The application data may include, for example, user files, database catalogs, configuration information, or a combination thereof. The operating system may be, for example, a desktop or laptop operating system; an operating system for a mobile device, such as a smartphone or tablet device; or an operating system for a large device, such as a mainframe computer.

The low-latency memory 1300 is coupled to the processor 1100 via the bus 1600 and may include any storage medium with low-latency data access including, for example, DRAM modules such as DDR SDRAM, Phase-Change Memory (PCM), flash memory, or a solid-state drive. Although shown as a single block in FIG. 1, the low-latency memory 1300 may be implemented as multiple logical or physical units. Other configurations may be used. For example, low-latency memory 1300, or a portion thereof, and processor 1100 may be combined, such as by using a system on a chip design.

The low-latency memory 1300 may store executable instructions or data, such as application data for low-latency access by the processor 1100. The executable instructions may include, for example, one or more application programs, that may be executed by the processor 1100. The executable instructions may be organized into programmable modules or algorithms, functional programs, codes, code segments, and/or combinations thereof to perform various functions described herein.

The low-latency memory 1300 may be used to store data that is analyzed or processed using the systems or methods described herein. For example, storage of some or all data in low-latency memory 1300 instead of static memory 1200 may improve the execution speed of the systems and methods described herein by permitting access to data more quickly by an order of magnitude or greater (e.g., nanoseconds instead of microseconds).

The electronic communication unit 1400 is coupled to the processor 1100 via the bus 1600. The electronic communication unit 1400 may include one or more transceivers. The electronic communication unit 1400 may, for example, provide a connection or link to a network via a network interface. The network interface may be a wired network interface, such as Ethernet, or a wireless network interface. For example, the computing device 1000 may communicate with other devices via the electronic communication unit 1400 and the network interface using one or more network protocols, such as Ethernet, Transmission Control Protocol/Internet Protocol (TCP/IP), power line communication (PLC), Wi-Fi, infrared, ultra violet (UV), visible light, fiber optic, wire line, general packet radio service (GPRS), Global System for Mobile communications (GSM), code-division multiple access (CDMA), Long-Term Evolution (LTE), or other suitable protocols.

The user interface 1500 may include any unit capable of interfacing with a human user, such as a virtual or physical keypad, a touchpad, a display, a touch display, a speaker, a microphone, a video camera, a sensor, a printer, or any combination thereof. For example, a keypad can convert physical input of force applied to a key to an electrical signal that can be interpreted by computing device 1000. In another example, a display can convert electrical signals output by computing device 1000 to light. The purpose of such devices may be to permit interaction with a human user, for example by accepting input from the human user and providing output back to the human user. The user interface 1500 may include a display; a positional input device, such as a mouse, touchpad, touchscreen, or the like; a keyboard; or any other human and machine interface device. The user interface 1500 may be coupled to the processor 1100 via the bus 1600. In some implementations, the user interface 1500 can include a display, which can be a liquid crystal display (LCD), a cathode-ray tube (CRT), a light emitting diode (LED) display, an organic light emitting diode (OLED) display, an active matrix organic light emitting diode (AMOLED), or other suitable display. In some implementations, the user interface 1500, or a portion thereof, may be part of another computing device (not shown). For example, a physical user interface, or a portion thereof, may be omitted from the computing device 1000 and a remote or virtual interface may be used, such as via the electronic communication unit 1400.

The bus 1600 is coupled to the static memory 1200, the low-latency memory 1300, the electronic communication unit 1400, the user interface 1500, and the power source 1700. Although a single bus is shown in FIG. 1, the bus 1600 may include multiple buses, which may be connected, such as via bridges, controllers, or adapters.

The power source 1700 provides energy to operate the computing device 1000. The power source 1700 may be a general-purpose alternating-current (AC) electric power supply, or power supply interface, such as an interface to a household power source. In some implementations, the power source 1700 may be a single use battery or a rechargeable battery to allow the computing device 1000 to operate independently of an external power distribution system. For example, the power source 1700 may include a wired power source; one or more dry cell batteries, such as nickel-cadmium (NiCad), nickel-zinc (NiZn), nickel metal hydride (NiMH), lithium-ion (Li-ion); solar cells; fuel cells; or any other device capable of powering the computing device 1000.

Figure 2:
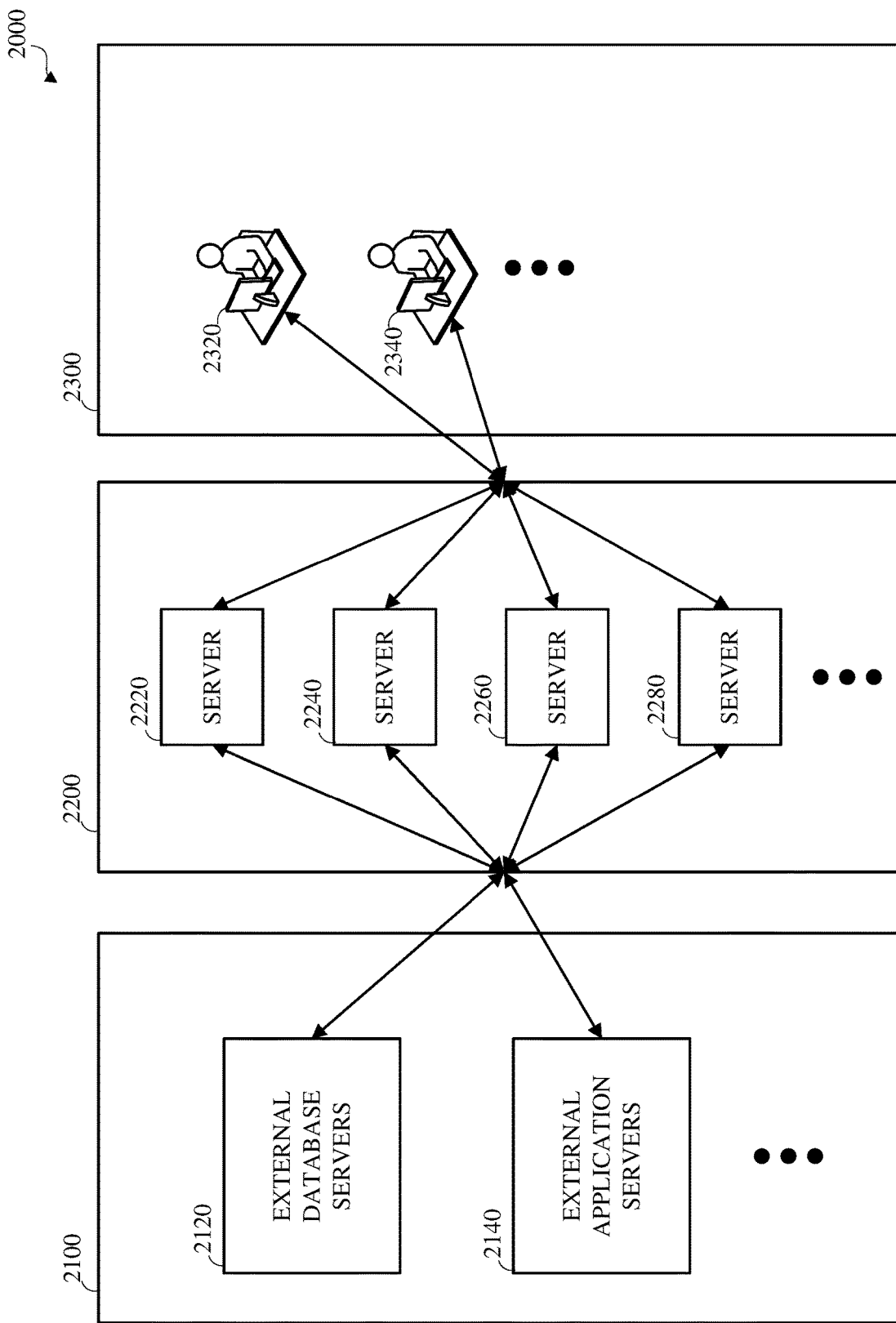
FIG. 2 is a block diagram of an example of a computing system.

FIG. 2 is a block diagram of an example of a computing system 2000. As shown, the computing system 2000 includes an external data source portion 2100, an internal database analysis portion 2200, and a system interface portion 2300. The computing system 2000 may include other elements not shown in FIG. 2, such as computer network elements.

The external data source portion 2100 may be associated with, such as controlled by, an external person, entity, or organization (second-party). The internal database analysis portion 2200 may be associated with, such as created by or controlled by, a person, entity, or organization (first-party). The system interface portion 2300 may be associated with, such as created by or controlled by, the first-party and may be accessed by the first-party, the second-party, third-parties, or a combination thereof, such as in accordance with access and authorization permissions and procedures.

The external data source portion 2100 is shown as including external database servers 2120 and external application servers 2140. The external data source portion 2100 may include other elements not shown in FIG. 2. The external data source portion 2100 may include external computing devices, such as the computing device 1000 shown in FIG. 1, which may be used by or accessible to the external person, entity, or organization (second-party) associated with the external data source portion 2100, including but not limited to external database servers 2120 and external application servers 2140. The external computing devices may include data regarding the operation of the external person, entity, or organization (second-party) associated with the external data source portion 2100.

The external database servers 2120 may be one or more computing devices configured to store data in a format and schema determined externally from the internal database analysis portion 2200, such as by a second-party associated with the external data source portion 2100, or a third party. For example, the external database server 2120 may use a relational database and may include a database catalog with a schema. In some embodiments, the external database server 2120 may include a non-database data storage structure, such as a text-based data structure, such as a comma separated variable structure or an extensible markup language formatted structure or file. For example, the external database servers 2120 can include data regarding the production of materials by the external person, entity, or organization (second-party) associated with the external data source portion 2100, communications between the external person, entity, or organization (second-party) associated with the external data source portion 2100 and third parties, or a combination thereof. Other data may be included. The external database may be a structured database system, such as a relational database operating in a relational database management system (RDBMS), which may be an enterprise database. In some embodiments, the external database may be an unstructured data source. The external data may include data or content, such as sales data, revenue data, profit data, tax data, shipping data, safety data, sports data, health data, weather data, or the like, or any other data, or combination of data, that may be generated by or associated with a user, an organization, or an enterprise and stored in a database system. For simplicity and clarity, data stored in or received from the external data source portion 2100 may be referred to herein as enterprise data.

The external application server 2140 may include application software, such as application software used by the external person, entity, or organization (second-party) associated with the external data source portion 2100. The external application server 2140 may include data or metadata relating to the application software.

The external database servers 2120, the external application servers 2140, or both, shown in FIG. 2 may represent logical units or devices that may be implemented on one or more physical units or devices, which may be controlled or operated by the first party, the second party, or a third party.

The external data source portion 2100, or aspects thereof, such as the external database servers 2120, the external application servers 2140, or both, may communicate with the internal database analysis portion 2200, or an aspect thereof, such as one or more of the servers 2220, 2240, 2260, and 2280, via an electronic communication medium, which may be a wired or wireless electronic communication medium. For example, the electronic communication medium may include a local area network (LAN), a wide area network (WAN), a fiber channel network, the Internet, or a combination thereof.

The internal database analysis portion 2200 is shown as including servers 2220, 2240, 2260, and 2280. The servers 2220, 2240, 2260, and 2280 may be computing devices, such as the computing device 1000 shown in FIG. 1. Although four servers 2220, 2240, 2260, and 2280 are shown in FIG. 2, other numbers, or cardinalities, of servers may be used. For example, the number of computing devices may be determined based on the capability of individual computing devices, the amount of data to be processed, the complexity of the data to be processed, or a combination thereof. Other metrics may be used for determining the number of computing devices.

The internal database analysis portion 2200 may store data, process data, or store and process data. The internal database analysis portion 2200 may include a distributed cluster (not expressly shown) which may include two or more of the servers 2220, 2240, 2260, and 2280. The operation of distributed cluster, such as the operation of the servers 2220, 2240, 2260, and 2280 individually, in combination, or both, may be managed by a distributed cluster manager. For example, the server 2220 may be the distributed cluster manager. In another example, the distributed cluster manager may be implemented on another computing device (not shown). The data and processing of the distributed cluster may be distributed among the servers 2220, 2240, 2260, and 2280, such as by the distributed cluster manager.

Enterprise data from the external data source portion 2100, such as from the external database server 2120, the external application server 2140, or both may be imported into the internal database analysis portion 2200. The external database server 2120, the external application server 2140, or both may be one or more computing devices and may communicate with the internal database analysis portion 2200 via electronic communication. The imported data may be distributed among, processed by, stored on, or a combination thereof, one or more of the servers 2220, 2240, 2260, and 2280. Importing the enterprise data may include importing or accessing the data structures of the enterprise data. Importing the enterprise data may include generating internal data, internal data structures, or both, based on the enterprise data. The internal data, internal data structures, or both may accurately represent and may differ from the enterprise data, the data structures of the enterprise data, or both. In some implementations, enterprise data from multiple external data sources may be imported into the internal database analysis portion 2200. For simplicity and clarity, data stored or used in the internal database analysis portion 2200 may be referred to herein as internal data. For example, the internal data, or a portion thereof, may represent, and may be distinct from, enterprise data imported into or accessed by the internal database analysis portion 2200.

The system interface portion 2300 may include one or more client devices 2320, 2340. The client devices 2320, 2340 may be computing devices, such as the computing device 1000 shown in FIG. 1. For example, one of the client devices 2320, 2340 may be a desktop or laptop computer and the other of the client devices 2320, 2340 may be a mobile device, smartphone, or tablet. One or more of the client devices 2320, 2340 may access the internal database analysis portion 2200. For example, the internal database analysis portion 2200 may provide one or more services, application interfaces, or other electronic computer communication interfaces, such as a web site, and the client devices 2320, 2340 may access the interfaces provided by the internal database analysis portion 2200, which may include accessing the internal data stored in the internal database analysis portion 2200.

In an example, one or more of the client devices 2320, 2340 may send a message or signal indicating a request for data, which may include a request for data analysis, to the internal database analysis portion 2200. The internal database analysis portion 2200 may receive and process the request, which may include distributing the processing among one or more of the servers 2220, 2240, 2260, and 2280, may generate a response to the request, which may include generating or modifying internal data, internal data structures, or both, and may output the response to the client device 2320, 2340 that sent the request. Processing the request may include accessing one or more internal data indexes, an internal database, or a combination thereof. The client device 2320, 2340 may receive the response, including the response data or a portion thereof, and may store, output, or both, the response or a representation thereof, such as a representation of the response data, or a portion thereof, which may include presenting the representation via a user interface on a presentation device of the client device 2320, 2340, such as to a user of the client device 2320, 2340.

The system interface portion 2300, or aspects thereof, such as one or more of the client devices 2320, 2340, may communicate with the internal database analysis portion 2200, or an aspect thereof, such as one or more of the servers 2220, 2240, 2260, and 2280, via an electronic communication medium, which may be a wired or wireless electronic communication medium. For example, the electronic communication medium may include a local area network (LAN), a wide area network (WAN), a fiber channel network, the Internet, or a combination thereof.

Figure 3:
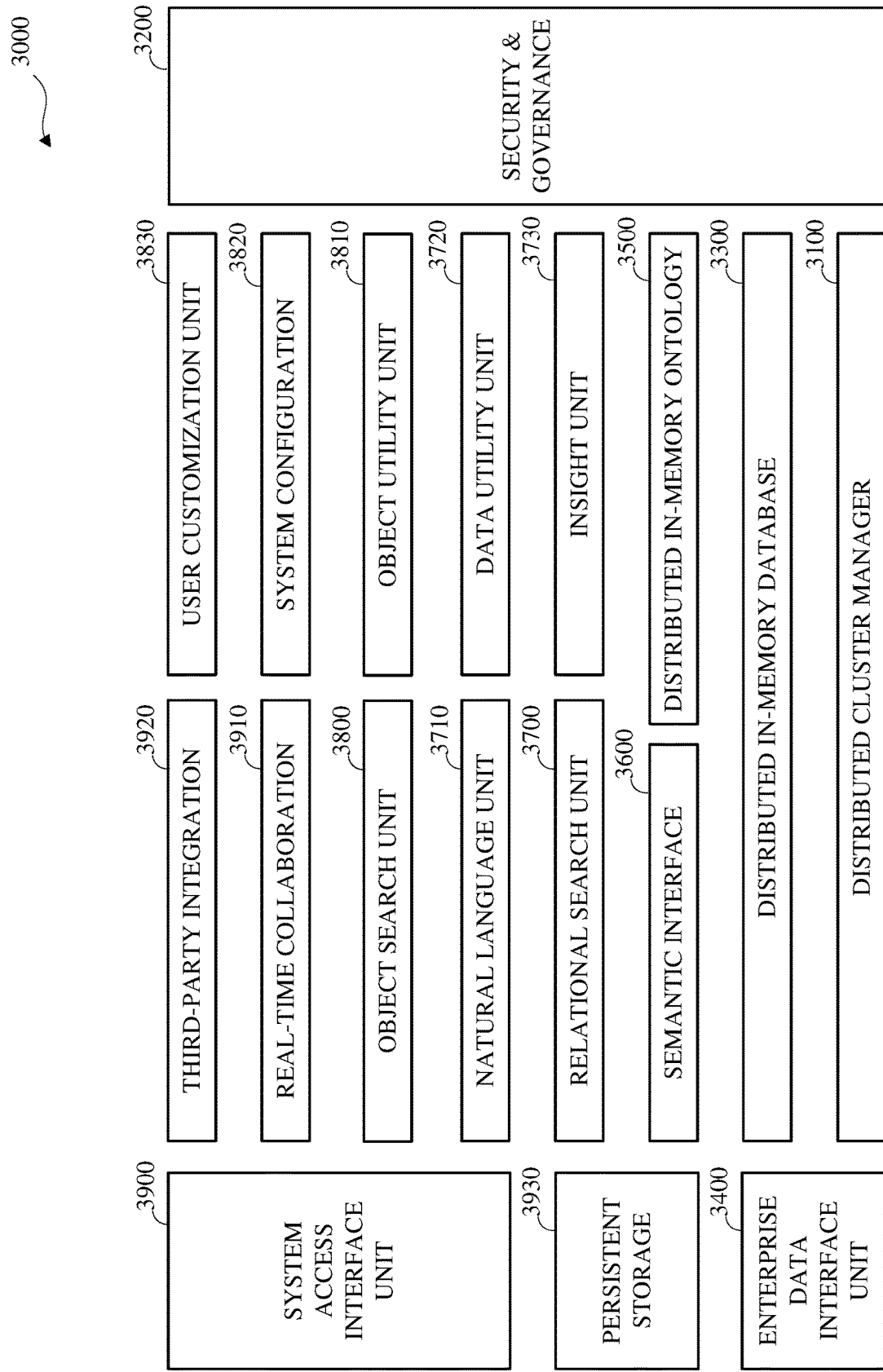
FIG. 3 is a block diagram of an example of a low-latency database analysis system.

FIG. 3 is a block diagram of an example of a low-latency database analysis system 3000. The low-latency database analysis system 3000, or aspects thereof, may be similar to the internal database analysis portion 2200 shown in FIG. 2, except as described herein or otherwise clear from context. The low-latency database analysis system 3000, or aspects thereof, may be implemented on one or more computing devices, such as servers 2220, 2240, 2260, and 2280 shown in FIG. 2, which may be in a clustered or distributed computing configuration.

The low-latency database analysis system 3000 may store and maintain the internal data, or a portion thereof, such as low-latency data, in a low-latency memory device, such as the low-latency memory 1300 shown in FIG. 1, or any other type of data storage medium or combination of data storage devices with relatively fast (low-latency) data access, organized in a low-latency data structure. In some embodiments, the low-latency database analysis system 3000 may be implemented as one or more logical devices in a cloud-based configuration optimized for automatic database analysis.

As shown, the low-latency database analysis system 3000 includes a distributed cluster manager 3100, a security and governance unit 3200, a distributed in-memory database 3300, an enterprise data interface unit 3400, a distributed in-memory ontology unit 3500, a semantic interface unit 3600, a relational search unit 3700, a natural language processing unit 3710, a data utility unit 3720, an insight unit 3730, an object search unit 3800, an object utility unit 3810, a system configuration unit 3820, a user customization unit 3830, a system access interface unit 3900, a real-time collaboration unit 3910, a third-party integration unit 3920, and a persistent storage unit 3930, which may be collectively referred to as the components of the low-latency database analysis system 3000.

Although not expressly shown in FIG. 3, one or more of the components of the low-latency database analysis system 3000 may be implemented on one or more operatively connected physical or logical computing devices, such as in a distributed cluster computing configuration, such as the internal database analysis portion 2200 shown in FIG. 2. Although shown separately in FIG. 3, one or more of the components of the low-latency database analysis system 3000, or respective aspects thereof, may be combined or otherwise organized.

The low-latency database analysis system 3000 may include different, fewer, or additional components not shown in FIG. 3. The aspects or components implemented in an instance of the low-latency database analysis system 3000 may be configurable. For example, the insight unit 3730 may be omitted or disabled. One or more of the components of the low-latency database analysis system 3000 may be implemented in a manner such that aspects thereof are divided or combined into various executable modules or libraries in a manner which may differ from that described herein.

The low-latency database analysis system 3000 may implement an application programming interface (API), which may monitor, receive, or both, input signals or messages from external devices and systems, client systems, process received signals or messages, transmit corresponding signals or messages to one or more of the components of the low-latency database analysis system 3000, and output, such as transmit or send, output messages or signals to respective external devices or systems. The low-latency database analysis system 3000 may be implemented in a distributed computing configuration.

The distributed cluster manager 3100 manages the operative configuration of the low-latency database analysis system 3000. Managing the operative configuration of the low-latency database analysis system 3000 may include controlling the implementation of and distribution of processing and storage across one or more logical devices operating on one or more physical devices, such as the servers 2220, 2240, 2260, and 2280 shown in FIG. 2. The distributed cluster manager 3100 may generate and maintain configuration data for the low-latency database analysis system 3000, such as in one or more tables, identifying the operative configuration of the low-latency database analysis system 3000. For example, the distributed cluster manager 3100 may automatically update the low-latency database analysis system configuration data in response to an operative configuration event, such as a change in availability or performance for a physical or logical unit of the low-latency database analysis system 3000. One or more of the component units of low-latency database analysis system 3000 may access the database analysis system configuration data, such as to identify intercommunication parameters or paths.

The security and governance unit 3200 may describe, implement, enforce, or a combination thereof, rules and procedures for controlling access to aspects of the low-latency database analysis system 3000, such as the internal data of the low-latency database analysis system 3000 and the features and interfaces of the low-latency database analysis system 3000. The security and governance unit 3200 may apply security at an ontological level to control or limit access to the internal data of the low-latency database analysis system 3000, such as to columns, tables, rows, or fields, which may include using row level security.

Although shown as a single unit in FIG. 3, the distributed in-memory database 3300 may be implemented in a distributed configuration, such as distributed among the servers 2220, 2240, 2260, and 2280 shown in FIG. 2, which may include multiple in-memory database instances. Each in-memory database instance may utilize one or more distinct resources, such as processing or low-latency memory resources, that differ from the resources utilized by the other in-memory database instances. In some embodiments, the in-memory database instances may utilize one or more shared resources, such as resources utilized by two or more in-memory database instances.

The distributed in-memory database 3300 may generate, maintain, or both, a low-latency data structure and data stored or maintained therein (low-latency data). The low-latency data may include principal data, which may represent enterprise data, such as enterprise data imported from an external enterprise data source, such as the external data source portion 2100 shown in FIG. 2. In some implementations, the distributed in-memory database 3300 may include system internal data representing one or more aspects, features, or configurations of the low-latency database analysis system 3000. The distributed in-memory database 3300 and the low-latency data stored therein, or a portion thereof, may be accessed using commands, messages, or signals in accordance with a defined structured query language associated with the distributed in-memory database 3300.

The low-latency data, or a portion thereof, may be organized as tables in the distributed in-memory database 3300. A table may be a data structure to organize or group the data or a portion thereof, such as related or similar data. A table may have a defined structure. For example, each table may define or describe a respective set of one or more columns.

A column may define or describe the characteristics of a discrete aspect of the data in the table. For example, the definition or description of a column may include an identifier, such as a name, for the column within the table, and one or more constraints, such as a data type, for the data corresponding to the column in the table. The definition or description of a column may include other information, such as a description of the column. The data in a table may be accessible or partitionable on a per-column basis. The set of tables, including the column definitions therein, and information describing relationships between elements, such as tables and columns, of the database may be defined or described by a database schema or design. The cardinality of columns of a table, and the definition and organization of the columns, may be defined by the database schema or design. Adding, deleting, or modifying a table, a column, the definition thereof, or a relationship or constraint thereon, may be a modification of the database design, schema, model, or structure.

The low-latency data, or a portion thereof, may be stored in the database as one or more rows or records in respective tables. Each record or row of a table may include a respective field or cell corresponding to each column of the table. A field may store a discrete data value. The cardinality of rows of a table, and the values stored therein, may be variable based on the data. Adding, deleting, or modifying rows, or the data stored therein may omit modification of the database design, schema, or structure. The data stored in respective columns may be identified or defined as a measure data, attribute data, or enterprise ontology data (e.g., metadata).

Measure data, or measure values, may include quantifiable or additive numeric values, such as integer or floating-point values, which may include numeric values indicating sizes, amounts, degrees, or the like. A column defined as representing measure values may be referred to herein as a measure or fact. A measure may be a property on which quantitative operations (e.g., sum, count, average, minimum, maximum) may be performed to calculate or determine a result or output.

Attribute data, or attribute values, may include non-quantifiable values, such as text or image data, which may indicate names and descriptions, quantifiable values designated, defined, or identified as attribute data, such as numeric unit identifiers, or a combination thereof. A column defined as including attribute values may be referred to herein as an attribute or dimension. For example, attributes may include text, identifiers, timestamps, or the like.

Enterprise ontology data may include data that defines or describes one or more aspects of the database, such as data that describes one or more aspects of the attributes, measures, rows, columns, tables, relationships, or other aspects of the data or database schema. For example, a portion of the database design, model, or schema may be represented as enterprise ontology data in one or more tables in the database.

Distinctly identifiable data in the low-latency data may be referred to herein as a data portion. For example, the low-latency data stored in the distributed in-memory database 3300 may be referred to herein as a data portion, a table from the low-latency data may be referred to herein as a data portion, a column from the low-latency data may be referred to herein as a data portion, a row or record from the low-latency data may be referred to herein as a data portion, a value from the low-latency data may be referred to herein as a data portion, a relationship defined in the low-latency data may be referred to herein as a data portion, enterprise ontology data describing the low-latency data may be referred to herein as a data portion, or any other distinctly identifiable data, or combination thereof, from the low-latency data may be referred to herein as a data portion.

The distributed in-memory database 3300 may create or add one or more data portions, such as a table, may read from or access one or more data portions, may update or modify one or more data portions, may remove or delete one or more data portions, or a combination thereof. Adding, modifying, or removing data portions may include changes to the data model of the low-latency data. Changing the data model of the low-latency data may include notifying one or more other components of the low-latency database analysis system 3000, such as by sending, or otherwise making available, a message or signal indicating the change. For example, the distributed in-memory database 3300 may create or add a table to the low-latency data and may transmit or send a message or signal indicating the change to the semantic interface unit 3600.

In some implementations, a portion of the low-latency data may represent a data model of an external enterprise database and may omit the data stored in the external enterprise database, or a portion thereof. For example, prioritized data may be cached in the distributed in-memory database 3300 and the other data may be omitted from storage in the distributed in-memory database 3300, which may be stored in the external enterprise database. In some implementations, requesting data from the distributed in-memory database 3300 may include requesting the data, or a portion thereof, from the external enterprise database.

The distributed in-memory database 3300 may receive one or more messages or signals indicating respective data-queries for the low-latency data, or a portion thereof, which may include data-queries for modified, generated, or aggregated data generated based on the low-latency data, or a portion thereof. For example, the distributed in-memory database 3300 may receive a data-query from the semantic interface unit 3600, such as in accordance with a request for data. The data-queries received by the distributed in-memory database 3300 may be agnostic to the distributed configuration of the distributed in-memory database 3300. A data-query, or a portion thereof, may be expressed in accordance with the defined structured query language implemented by the distributed in-memory database 3300. In some implementations, a data-query may be included, such as stored or communicated, in a data-query data structure or container.

The distributed in-memory database 3300 may execute or perform one or more queries to generate or obtain response data responsive to the data-query based on the low-latency data.

The distributed in-memory database 3300 may interpret, evaluate, or otherwise process a data-query to generate one or more distributed-queries, which maybe expressed in accordance with the defined structured query language. For example, an in-memory database instance of the distributed in-memory database 3300 may be identified as a query coordinator. The query coordinator may generate a query plan, which may include generating one or more distributed-queries, based on the received data-query. The query plan may include query execution instructions for executing one or more queries, or one or more portions thereof, based on the received data-query by the one or more of the in-memory database instances. Generating the query plan may include optimizing the query plan. The query coordinator may distribute, or otherwise make available, the respective portions of the query plan, as query execution instructions, to the corresponding in-memory database instances.

The respective in-memory database instances may receive the corresponding query execution instructions from the query coordinator. The respective in-memory database instances may execute the corresponding query execution instructions to obtain, process, or both, data (intermediate results data) from the low-latency data. The respective in-memory database instances may output, or otherwise make available, the intermediate results data, such as to the query coordinator.

The query coordinator may execute a respective portion of query execution instructions (allocated to the query coordinator) to obtain, process, or both, data (intermediate results data) from the low-latency data. The query coordinator may receive, or otherwise access, the intermediate results data from the respective in-memory database instances. The query coordinator may combine, aggregate, or otherwise process, the intermediate results data to obtain results data.

In some embodiments, obtaining the intermediate results data by one or more of the in-memory database instances may include outputting the intermediate results data to, or obtaining intermediate results data from, one or more other in-memory database instances, in addition to, or instead of, obtaining the intermediate results data from the low-latency data.

The distributed in-memory database 3300 may output, or otherwise make available, the results data to the semantic interface unit 3600.

The enterprise data interface unit 3400 may interface with, or communicate with, an external enterprise data system. For example, the enterprise data interface unit 3400 may receive or access enterprise data from or in an external system, such as an external database. The enterprise data interface unit 3400 may import, evaluate, or otherwise process the enterprise data to populate, create, or modify data stored in the low-latency database analysis system 3000. The enterprise data interface unit 3400 may receive, or otherwise access, the enterprise data from one or more external data sources, such as the external data source portion 2100 shown in FIG. 2, and may represent the enterprise data in the low-latency database analysis system 3000 by importing, loading, or populating the enterprise data as principal data in the distributed in-memory database 3300, such as in one or more low-latency data structures. The enterprise data interface unit 3400 may implement one or more data connectors, which may transfer data between, for example, the external data source and the distributed in-memory database 3300, which may include altering, formatting, evaluating, or manipulating the data.

The enterprise data interface unit 3400 may receive, access, or generate metadata that identifies one or more parameters or relationships for the principal data, such as based on the enterprise data, and may include the generated metadata in the low-latency data stored in the distributed in-memory database 3300. For example, the enterprise data interface unit 3400 may identify characteristics of the principal data such as, attributes, measures, values, unique identifiers, tags, links, keys, or the like, and may include metadata representing the identified characteristics in the low-latency data stored in the distributed in-memory database 3300. The characteristics of the data can be automatically determined by receiving, accessing, processing, evaluating, or interpreting the schema in which the enterprise data is stored, which may include automatically identifying links or relationships between columns, classifying columns (e.g., using column names), and analyzing or evaluating the data.

Distinctly identifiable operative data units or structures representing one or more data portions, one or more entities, users, groups, or organizations represented in the internal data, or one or more aggregations, collections, relations, analytical results, visualizations, or groupings thereof, may be represented in the low-latency database analysis system 3000 as objects. An object may include a unique identifier for the object, such as a fully qualified name. An object may include a name, such as a displayable value, for the object.

For example, an object may represent a user, a group, an entity, an organization, a privilege, a role, a table, a column, a data relationship, a worksheet, a view, a context, an answer, an insight, a pinboard, a tag, a comment, a trigger, a defined variable, a data source, an object-level security rule, a row-level security rule, or any other data capable of being distinctly identified and stored or otherwise obtained in the low-latency database analysis system 3000. An object may represent or correspond with a logical entity. Data describing an object may include data operatively or uniquely identifying data corresponding to, or represented by, the object in the low-latency database analysis system. For example, a column in a table in a database in the low-latency database analysis system may be represented in the low-latency database analysis system as an object and the data describing or defining the object may include data operatively or uniquely identifying the column.

A worksheet (worksheet object), or worksheet table, may be a logical table, or a definition thereof, which may be a collection, a sub-set (such as a subset of columns from one or more tables), or both, of data from one or more data sources, such as columns in one or more tables, such as in the distributed in-memory database 3300. A worksheet, or a definition thereof, may include one or more data organization or manipulation definitions, such as join paths or worksheet-column definitions, which may be user defined. A worksheet may be a data structure that may contain one or more rules or definitions that may define or describe how a respective tabular set of data may be obtained, which may include defining one or more sources of data, such as one or more columns from the distributed in-memory database 3300. A worksheet may be a data source. For example, a worksheet may include references to one or more data sources, such as columns in one or more tables, such as in the distributed in-memory database 3300, and a request for data referencing the worksheet may access the data from the data sources referenced in the worksheet. In some implementations, a worksheet may omit aggregations of the data from the data sources referenced in the worksheet.

An answer (answer object), or report, may be a defined, such as previously generated, request for data, such as a resolved-request. An answer may include information describing a visualization of data responsive to the request for data.

A view (view object) may be a logical table, or a definition thereof, which may be a collection, a sub-set, or both, of data from one or more data sources, such as columns in one or more tables, such as in the distributed in-memory database 3300. For example, a view may be generated based on an answer, such as by storing the answer as a view. A view may define or describe a data aggregation. A view may be a data source. For example, a view may include references to one or more data sources, such as columns in one or more tables, such as in the distributed in-memory database 3300, which may include a definition or description of an aggregation of the data from a respective data source, and a request for data referencing the view may access the aggregated data, the data from the unaggregated data sources referenced in the worksheet, or a combination thereof. The unaggregated data from data sources referenced in the view defined or described as aggregated data in the view may be unavailable based on the view. A view may be a materialized view or an unmaterialized view. A request for data referencing a materialized view may obtain data from a set of data previously obtained (view-materialization) in accordance with the definition of the view and the request for data. A request for data referencing an unmaterialized view may obtain data from a set of data currently obtained in accordance with the definition of the view and the request for data.

A pinboard (pinboard object), or dashboard, may be a defined collection or grouping of objects, such as visualizations, answers, or insights. Pinboard data for a pinboard may include information associated with the pinboard, which may be associated with respective objects included in the pinboard.

A context (context object) may be a set or collection of data associated with a request for data or a discretely related sequence or series of requests for data or other interactions with the low-latency database analysis system 3000.

A definition may be a set of data describing the structure or organization of a data portion. For example, in the distributed in-memory database 3300, a column definition may define one or more aspects of a column in a table, such as a name of the column, a description of the column, a datatype for the column, or any other information about the column that may be represented as discrete data.

A data source object may represent a source or repository of data accessible by the low-latency database analysis system 3000. A data source object may include data indicating an electronic communication location, such as an address, of a data source, connection information, such as protocol information, authentication information, or a combination thereof, or any other information about the data source that may be represented as discrete data. For example, a data source object may represent a table in the distributed in-memory database 3300 and include data for accessing the table from the database, such as information identifying the database, information identifying a schema within the database, and information identifying the table within the schema within the database. An external data source object may represent an external data source. For example, an external data source object may include data indicating an electronic communication location, such as an address, of an external data source, connection information, such as protocol information, authentication information, or a combination thereof, or any other information about the external data source that may be represented as discrete data.

A sticker (sticker object) may be a description of a classification, category, tag, subject area, or other information that may be associated with one or more other objects such that objects associated with a sticker may be grouped, sorted, filtered, or otherwise identified based on the sticker. In the distributed in-memory database 3300 a tag may be a discrete data portion that may be associated with other data portions, such that data portions associated with a tag may be grouped, sorted, filtered, or otherwise identified based on the tag.

The distributed in-memory ontology unit 3500 generates, maintains, or both, information (ontological data) defining or describing the operative ontological structure of the objects represented in the low-latency database analysis system 3000, such as in the low-latency data stored in the distributed in-memory database 3300, which may include describing attributes, properties, states, or other information about respective objects and may include describing relationships among respective objects.

Objects may be referred to herein as primary objects, secondary objects, or tertiary objects. Other types of objects may be used.

Primary objects may include objects representing distinctly identifiable operative data units or structures representing one or more data portions in the distributed in-memory database 3300, or another data source in the low-latency database analysis system 3000. For example, primary objects may be data source objects, table objects, column objects, relationship objects, or the like. Primary objects may include worksheets, views, filters, such as row-level-security filters and table filters, variables, or the like. Primary objects may be referred to herein as data-objects or queryable-objects.

Secondary objects may be objects representing distinctly identifiable operative data units or structures representing analytical data aggregations, collections, analytical results, visualizations, or groupings thereof, such as pinboard objects, answer objects, insights, visualization objects, and the like. Secondary objects may be referred to herein as analytical-objects.

Tertiary objects may be objects representing distinctly identifiable operative data units or structures representing operational aspects of the low-latency database analysis system 3000, such as one or more entities, users, groups, or organizations represented in the internal data, such as user objects, user-group objects, role objects, sticker objects, and the like.

The distributed in-memory ontology unit 3500 may represent the ontological structure, which may include the objects therein, as a graph having nodes and edges. A node may be a representation of an object in the graph structure of the distributed in-memory ontology unit 3500. A node object can include one or more component objects. Component objects may be versioned, such as on a per-component object basis. For example, a node can include a header object, a content object, or both. A header object may include information about the node. A content may include the content of the node. An edge may represent a relationship between nodes, which may be directional.

In some implementations, the distributed in-memory ontology unit 3500 graph may include one or more nodes, edges, or both, representing one or more objects, relationships or both, corresponding to a respective internal representation of enterprise data stored in an external enterprise data storage unit, wherein a portion of the data stored in the external enterprise data storage unit represented in the distributed in-memory ontology unit 3500 graph is omitted from the distributed in-memory database 3300.

In some embodiments, the distributed in-memory ontology unit 3500 may generate, modify, or remove a portion of the ontology graph in response to one or more messages, signals, or notifications from one or more of the components of the low-latency database analysis system 3000. For example, the distributed in-memory ontology unit 3500 may generate, modify, or remove a portion of the ontology graph in response to receiving one or more messages, signals, or notifications from the distributed in-memory database 3300 indicating a change to the low-latency data structure. In another example, the distributed in-memory database 3300 may send one or more messages, signals, or notifications indicating a change to the low-latency data structure to the semantic interface unit 3600 and the semantic interface unit 3600 may send one or more messages, signals, or notifications indicating the change to the low-latency data structure to the distributed in-memory ontology unit 3500.

The distributed in-memory ontology unit 3500 may be distributed, in-memory, multi-versioned, transactional, consistent, durable, or a combination thereof. The distributed in-memory ontology unit 3500 is transactional, which may include implementing atomic concurrent, or substantially concurrent, updating of multiple objects. The distributed in-memory ontology unit 3500 is durable, which may include implementing a robust storage that prevents data loss subsequent to or as a result of the completion of an atomic operation. The distributed in-memory ontology unit 3500 is consistent, which may include performing operations associated with a request for data with reference to or using a discrete data set, which may mitigate or eliminate the risk inconsistent results.

The distributed in-memory ontology unit 3500 may generate, output, or both, one or more event notifications. For example, the distributed in-memory ontology unit 3500 may generate, output, or both, a notification, or notifications, in response to a change of the distributed in-memory ontology. The distributed in-memory ontology unit 3500 may identify a portion of the distributed in-memory ontology (graph) associated with a change of the distributed in-memory ontology, such as one or more nodes depending from a changed node, and may generate, output, or both, a notification, or notifications indicating the identified relevant portion of the distributed in-memory ontology (graph). One or more aspects of the low-latency database analysis system 3000 may cache object data and may receive the notifications from the distributed in-memory ontology unit 3500, which may reduce latency and network traffic relative to systems that omit caching object data or omit notifications relevant to changes to portions of the distributed in-memory ontology (graph).

The distributed in-memory ontology unit 3500 may implement prefetching. For example, the distributed in-memory ontology unit 3500 may predictively, such as based on determined probabilistic utility, fetch one or more nodes, such as in response to access to a related node by a component of the low-latency database analysis system 3000.

The distributed in-memory ontology unit 3500 may implement a multi-version concurrency control graph data storage unit. Each node, object, or both, may be versioned. Changes to the distributed in-memory ontology may be reversible. For example, the distributed in-memory ontology may have a first state prior to a change to the distributed in-memory ontology, the distributed in-memory ontology may have a second state subsequent to the change, and the state of the distributed in-memory ontology may be reverted to the first state subsequent to the change, such as in response to the identification of an error or failure associated with the second state.

In some implementations, reverting a node, or a set of nodes, may omit reverting one or more other nodes. In some implementations, the distributed in-memory ontology unit 3500 may maintain a change log indicating a sequential record of changes to the distributed in-memory ontology (graph), such that a change to a node or a set of nodes may be reverted and one or more other changes subsequent to the reverted change may be reverted for consistency.

The distributed in-memory ontology unit 3500 may implement optimistic locking to reduce lock contention times. The use of optimistic locking permits improved throughput of data through the distributed in-memory ontology unit 3500.

The semantic interface unit 3600 may implement procedures and functions to provide a semantic interface between the distributed in-memory database 3300 and one or more of the other components of the low-latency database analysis system 3000.

The semantic interface unit 3600 may implement ontological data management, data-query generation, authentication and access control, object statistical data collection, or a combination thereof.

Ontological data management may include object lifecycle management, object data persistence, ontological modifications, or the like. Object lifecycle management may include creating one or more objects, reading or otherwise accessing one or more objects, updating or modifying one or more objects, deleting or removing one or more objects, or a combination thereof. For example, the semantic interface unit 3600 may interface or communicate with the distributed in-memory ontology unit 3500, which may store the ontological data, object data, or both, to perform object lifecycle management, object data persistence, ontological modifications, or the like.

For example, the semantic interface unit 3600 may receive, or otherwise access, a message, signal, or notification, such as from the distributed in-memory database 3300, indicating the creation or addition of a data portion, such as a table, in the low-latency data stored in the distributed in-memory database 3300, and the semantic interface unit 3600 may communicate with the distributed in-memory ontology unit 3500 to create an object in the ontology representing the added data portion. The semantic interface unit 3600 may transmit, send, or otherwise make available, a notification, message, or signal to the relational search unit 3700 indicating that the ontology has changed.

The semantic interface unit 3600 may receive, or otherwise access, a request message or signal, such as from the relational search unit 3700, indicating a request for information describing changes to the ontology (ontological updates request). The semantic interface unit 3600 may generate and send, or otherwise make available, a response message or signal to the relational search unit 3700 indicating the changes to the ontology (ontological updates response). The semantic interface unit 3600 may identify one or more data portions for indexing based on the changes to the ontology. For example, the changes to the ontology may include adding a table to the ontology, the table including multiple rows, and the semantic interface unit 3600 may identify each row as a data portion for indexing. The semantic interface unit 3600 may include information describing the ontological changes in the ontological updates response. The semantic interface unit 3600 may include one or more data-query definitions, such as data-query definitions for indexing data-queries, for each data portion identified for indexing in the ontological updates response. For example, the data-query definitions may include a sampling data-query, which may be used to query the distributed in-memory database 3300 for sample data from the added data portion, an indexing data-query, which may be used to query the distributed in-memory database 3300 for data from the added data portion, or both.

The semantic interface unit 3600 may receive, or otherwise access, internal signals or messages including data expressing a usage intent, such as data indicating requests to access or modify the low-latency data stored in the distributed in-memory database 3300 (e.g., a request for data). The request to access or modify the low-latency data received by the semantic interface unit 3600 may include a resolved-request. The resolved-request, which may be database and visualization agnostic, may be expressed or communicated as an ordered sequence of tokens, which may represent semantic data. For example, the relational search unit 3700 may tokenize, identify semantics, or both, based on input data, such as input data representing user input, to generate the resolved-request. The resolved-request may include an ordered sequence of tokens that represent the request for data corresponding to the input data, and may transmit, send, or otherwise make accessible, the resolved-request to the semantic interface unit 3600. The semantic interface unit 3600 may process or respond to a received resolved-request.

The semantic interface unit 3600 may process or transform the received resolved-request, which may be, at least in part, incompatible with the distributed in-memory database 3300, to generate one or more corresponding data-queries that are compatible with the distributed in-memory database 3300, which may include generating a proto-query representing the resolved-request, generating a pseudo-query representing the proto-query, and generating the data-query representing the pseudo-query.

The semantic interface unit 3600 may generate a proto-query based on the resolved-request. A proto-query, which may be database agnostic, may be structured or formatted in a form, language, or protocol that differs from the defined structured query language of the distributed in-memory database 3300. Generating the proto-query may include identifying visualization identification data, such as an indication of a type of visualization, associated with the request for data, and generating the proto-query based on the resolved-request and the visualization identification data.

The semantic interface unit 3600 may transform the proto-query to generate a pseudo-query. The pseudo-query, which may be database agnostic, may be structured or formatted in a form, language, or protocol that differs from the defined structured query language of the distributed in-memory database 3300. Generating a pseudo-query may include applying a defined transformation, or an ordered sequence of transformations. Generating a pseudo-query may include incorporating row-level security filters in the pseudo-query.

The semantic interface unit 3600 may generate a data-query based on the pseudo-query, such as by serializing the pseudo-query. The data-query, or a portion thereof, may be structured or formatted using the defined structured query language of the distributed in-memory database 3300. In some implementations, a data-query may be structured or formatted using a defined structured query language of another database, which may differ from the defined structured query language of the distributed in-memory database 3300. Generating the data-query may include using one or more defined rules for expressing respective the structure and content of a pseudo-query in the respective defined structured query language.

The semantic interface unit 3600 may communicate, or issue, the data-query to the distributed in-memory database 3300. In some implementations, processing or responding to a resolved-request may include generating and issuing multiple data-queries to the distributed in-memory database 3300.

The semantic interface unit 3600 may receive results data from the distributed in-memory database 3300 responsive to one or more resolved-requests. The semantic interface unit 3600 may process, format, or transform the results data to obtain visualization data. For example, the semantic interface unit 3600 may identify a visualization for representing or presenting the results data, or a portion thereof, such as based on the results data or a portion thereof. For example, the semantic interface unit 3600 may identifying a bar chart visualization for results data including one measure and attribute.

Although not shown separately in FIG. 3, the semantic interface unit 3600 may include a data visualization unit. In some embodiments, the data visualization unit may be a distinct unit, separate from the semantic interface unit 3600. In some embodiments, the data visualization unit may be included in the system access interface unit 3900. The data visualization unit, the system access interface unit 3900, or a combination thereof, may generate a user interface, or one or more portions thereof. For example, data visualization unit, the system access interface unit 3900, or a combination thereof, may obtain the results data, such as the visualization data, and may generate user interface elements (visualizations) representing the results data.

The semantic interface unit 3600 may implement object-level security, row-level security, or a combination thereof. Object level security may include security associated with an object, such as a table, a column, a worksheet, an answer, or a pinboard. Row-level security may include user-based or group-based access control of rows of data in the low-latency data, the indexes, or both. The semantic interface unit 3600 may implement on or more authentication procedures, access control procedures, or a combination thereof.

The semantic interface unit 3600 may implement one or more user-data integration features. For example, the semantic interface unit 3600 may generate and output a user interface, or a portion thereof, for inputting, uploading, or importing user data, may receive user data, and may import the user data. For example, the user data may be enterprise data.

The semantic interface unit 3600 may implement object statistical data collection. Object statistical data may include, for respective objects, temporal access information, access frequency information, access recency information, access requester information, or the like. For example, the semantic interface unit 3600 may obtain object statistical data as described with respect to the data utility unit 3720, the object utility unit 3810, or both. The semantic interface unit 3600 may send, transmit, or otherwise make available, the object statistical data for data-objects to the data utility unit 3720. The semantic interface unit 3600 may send, transmit, or otherwise make available, the object statistical data for analytical-objects to the object utility unit 3810.

The semantic interface unit 3600 may implement or expose one or more services or application programming interfaces. For example, the semantic interface unit 3600 may implement one or more services for access by the system access interface unit 3900. In some implementations, one or more services or application programming interfaces may be exposed to one or more external devices or systems.

The semantic interface unit 3600 may generate and transmit, send, or otherwise communicate, one or more external communications, such as e-mail messages, such as periodically, in response to one or more events, or both. For example, the semantic interface unit 3600 may generate and transmit, send, or otherwise communicate, one or more external communications including a portable representation, such as a portable document format representation of one or more pinboards in accordance with a defined schedule, period, or interval. In another example, the semantic interface unit 3600 may generate and transmit, send, or otherwise communicate, one or more external communications in response to input data indicating an express request for a communication. In another example, the semantic interface unit 3600 may generate and transmit, send, or otherwise communicate, one or more external communications in response to one or more defined events, such as the expiration of a recency of access period for a user.

Although shown as a single unit in FIG. 3, the relational search unit 3700 may be implemented in a distributed configuration, which may include a primary relational search unit instance and one or more secondary relational search unit instances.

The relational search unit 3700 may generate, maintain, operate, or a combination thereof, one or more indexes, such as one or more of an ontological index, a constituent data index, a control-word index, a numeral index, or a constant index, based on the low-latency data stored in the distributed in-memory database 3300, the low-latency database analysis system 3000, or both. An index may be a defined data structure, or combination of data structures, for storing tokens, terms, or string keys, representing a set of data from one or more defined data sources in a form optimized for searching, data-analytics, or both. For example, an index may be a collection of index shards. In some implementations, an index may be segmented into index segments and the index segments may be sharded into index shards. In some implementations, an index may be partitioned into index partitions, the index partitions may be segmented into index segments and the index segments may be sharded into index shards.

Generating, or building, an index may be performed to create or populate a previously unavailable index, which may be referred to as indexing the corresponding data, and may include regenerating, rebuilding, or reindexing to update or modify a previously available index, such as in response to a change in the indexed data (constituent data).

The ontological index may be an index of data (ontological data) describing the ontological structure or schema of the low-latency database analysis system 3000, the low-latency data stored in the distributed in-memory database 3300, or a combination thereof. For example, the ontological index may include data representing the table and column structure of the distributed in-memory database 3300. The relational search unit 3700 may generate, maintain, or both, the ontological index by communicating with, such as requesting ontological data from, the distributed in-memory ontology unit 3500, the semantic interface unit 3600, or both. Each record in the ontological index may correspond to a respective ontological token, such as a token that identifies a column by name.

The control-word index may be an index of a defined set of control-word tokens. A control-word token may be a character, a symbol, a word, or a defined ordered sequence of characters or symbols, that is identified in one or more grammars of the low-latency database analysis system 3000 as having one or more defined grammatical functions, which may be contextual. For example, the control-word index may include the control-word token "sum", which may be identified in one or more grammars of the low-latency database analysis system 3000 as indicating an additive aggregation. In another example, the control-word index may include the control-word token "top", which may be identified in one or more grammars of the low-latency database analysis system 3000 as indicating a maximal value from an ordered set. In another example, the control-word index may include operator tokens, such as the equality operator token ("="). The constant index may be an index of constant tokens such as "100" or "true". The numeral index may be an index of number word tokens (or named numbers), such as number word tokens for the positive integers between zero and one million, inclusive. For example, "one hundred and twenty eight".

A token may be a word, phrase, character, sequence of characters, symbol, combination of symbols, or the like. A token may represent a data portion in the low-latency data stored in the low-latency data structure. For example, the relational search unit 3700 may automatically generate respective tokens representing the attributes, the measures, the tables, the columns, the values, unique identifiers, tags, links, keys, or any other data portion, or combination of data portions, or a portion thereof. The relational search unit 3700 may classify the tokens, which may include storing token classification data in association with the tokens. For example, a token may be classified as an attribute token, a measure token, a value token, or the like.

The constituent data index may be an index of the constituent data values stored in the low-latency database analysis system 3000, such as in the distributed in-memory database 3300. The relational search unit 3700 may generate, maintain, or both, the constituent data index by communicating with, such as requesting data from, the distributed in-memory database 3300. For example, the relational search unit 3700 may send, or otherwise communicate, a message or signal to the distributed in-memory database 3300 indicating a request to perform an indexing data-query, the relational search unit 3700 may receive response data from the distributed in-memory database 3300 in response to the requested indexing data-query, and the relational search unit 3700 may generate the constituent data index, or a portion thereof, based on the response data. For example, the constituent data index may index data-objects.

An index shard may be used for token searching, such as exact match searching, prefix match searching, substring match searching, or suffix match searching. Exact match searching may include identifying tokens in the index shard that matches a defined target value. Prefix match searching may include identifying tokens in the index shard that include a prefix, or begin with a value, such as a character or string, that matches a defined target value. Substring match searching may include identifying tokens in the index shard that include a value, such as a character or string, that matches a defined target value. Suffix match searching may include identifying tokens in the index shard that include a suffix, or end with a value, such as a character or string, that matches a defined target value. In some implementations, an index shard may include multiple distinct index data structures. For example, an index shard may include a first index data structure optimized for exact match searching, prefix match searching, and suffix match searching, and a second index data structure optimized for substring match searching. Traversing, or otherwise accessing, managing, or using, an index may include identifying one or more of the index shards of the index and traversing the respective index shards. In some implementations, one or more indexes, or index shards, may be distributed, such as replicated on multiple relational search unit instances. For example, the ontological index may be replicated on each relational search unit instance.

The relational search unit 3700 may receive a request for data from the low-latency database analysis system 3000. For example, the relational search unit 3700 may receive data expressing a usage intent indicating the request for data in response to input, such as user input, obtained via a user interface, such as a user interface generated, or partially generated, by the system access interface unit 3900, which may be a user interface operated on an external device, such as one of the client devices 2320, 2340 shown in FIG. 2. In some implementations, the relational search unit 3700 may receive the data expressing the usage intent from the system access interface unit 3900 or from the semantic interface unit 3600. For example, the relational search unit 3700 may receive or access the data expressing the usage intent in a request for data message or signal.

The relational search unit 3700 may process, parse, identify semantics, tokenize, or a combination thereof, the request for data to generate a resolved-request, which may include identifying a database and visualization agnostic ordered sequence of tokens based on the data expressing the usage intent. The data expressing the usage intent, or request for data, may include request data, such as resolved-request data, unresolved request data, or a combination of resolved-request data and unresolved request data. The relational search unit 3700 may identify the resolved-request data. The relational search unit 3700 may identify the unresolved request data and may tokenize the unresolved request data.

Resolved-request data may be request data identified in the data expressing the usage intent as resolved-request data. Each resolved-request data portion may correspond with a respective token in the low-latency database analysis system 3000. The data expressing the usage intent may include information identifying one or more portions of the request data as resolved-request data.

Unresolved request data may be request data identified in the data expressing the usage intent as unresolved request data, or request data for which the data expressing the usage intent omits information identifying the request data as resolved-request data. Unresolved request data may include text or string data, which may include a character, sequence of characters, symbol, combination of symbols, word, sequence of words, phrase, or the like, for which information, such as tokenization binding data, identifying the text or string data as resolved-request data is absent or omitted from the request data. The data expressing the usage intent may include information identifying one or more portions of the request data as unresolved request data. The data expressing the usage intent may omit information identifying whether one or more portions of the request data are resolved-request data. The relational search unit 3700 may identify one or more portions of the request data for which the data expressing the usage intent omits information identifying whether the one or more portions of the request data are resolved-request data as unresolved request data.

For example, the data expressing the usage intent may include a request string and one or more indications that one or more portions of the request string are resolved-request data. One or more portions of the request string that are not identified as resolved-request data in the data expressing the usage intent may be identified as unresolved request data. For example, the data expressing the usage intent may include the request string "example text"; the data expressing the usage intent may include information indicating that the first portion of the request string, "example", is resolved-request data; and the data expressing the usage intent may omit information indicating that the second portion of the request string, "text", is resolved-request data.

The information identifying one or more portions of the request data as resolved-request data may include tokenization binding data indicating a previously identified token corresponding to the respective portion of the request data. The tokenization binding data corresponding to a respective token may include, for example, one or more of a column identifier indicating a column corresponding to the respective token, a data type identifier corresponding to the respective token, a table identifier indicating a table corresponding to the respective token, an indication of an aggregation corresponding to the respective token, or an indication of a join path associated with the respective token. Other tokenization binding data may be used. In some implementations, the data expressing the usage intent may omit the tokenization binding data and may include an identifier that identifies the tokenization binding data.

The relational search unit 3700 may implement or access one or more grammar-specific tokenizers, such as a tokenizer for a defined data-analytics grammar or a tokenizer for a natural-language grammar. For example, the relational search unit 3700 may implement one or more of a formula tokenizer, a row-level-security tokenizer, a data-analytics tokenizer, or a natural language tokenizer. Other tokenizers may be used. In some implementations, the relational search unit 3700 may implement one or more of the grammar-specific tokenizers, or a portion thereof, by accessing another component of the low-latency database analysis system 3000 that implements the respective grammar-specific tokenizer, or a portion thereof. For example, the natural language processing unit 3710 may implement the natural language tokenizer and the relational search unit 3700 may access the natural language processing unit 3710 to implement natural language tokenization.

A tokenizer, such as the data-analytics tokenizer, may parse text or string data (request string), such as string data included in a data expressing the usage intent, in a defined read order, such as from left to right, such as on a character-by-character or symbol-by-symbol basis. For example, a request string may include a single character, symbol, or letter, and tokenization may include identifying one or more tokens matching, or partially matching, the input character.

Tokenization may include parsing the request string to identify one or more words or phrases. For example, the request string may include a sequence of characters, symbols, or letters, and tokenization may include parsing the sequence of characters in a defined order, such as from left to right, to identify distinct words or terms and identifying one or more tokens matching the respective words. In some implementations, word or phrase parsing may be based on one or more of a set of defined delimiters, such as a whitespace character, a punctuation character, or a mathematical operator.

The relational search unit 3700 may traverse one or more of the indexes to identify one or more tokens corresponding to a character, word, or phrase identified in request string. Tokenization may include identifying multiple candidate tokens matching a character, word, or phrase identified in request string. Candidate tokens may be ranked or ordered, such as based on probabilistic utility.

Tokenization may include match-length maximization. Match-length maximization may include ranking or ordering candidate matching tokens in descending magnitude order. For example, the longest candidate token, having the largest cardinality of characters or symbols, matching the request string, or a portion thereof, may be the highest ranked candidate token. For example, the request string may include a sequence of words or a semantic phrase, and tokenization may include identifying one or more tokens matching the input semantic phrase. In another example, the request string may include a sequence of phrases, and tokenization may include identifying one or more tokens matching the input word sequence. In some implementations, tokenization may include identifying the highest ranked candidate token for a portion of the request string as a resolved token for the portion of the request string.

The relational search unit 3700 may implement one or more finite state machines. For example, tokenization may include using one or more finite state machines. A finite state machine may model or represent a defined set of states and a defined set of transitions between the states. A state may represent a condition of the system represented by the finite state machine at a defined temporal point. A finite state machine may transition from a state (current state) to a subsequent state in response to input (e.g., input to the finite state machine). A transition may define one or more actions or operations that the relational search unit 3700 may implement. One or more of the finite state machines may be non-deterministic, such that the finite state machine may transition from a state to zero or more subsequent states.

The relational search unit 3700 may generate, instantiate, or operate a tokenization finite state machine, which may represent the respective tokenization grammar. Generating, instantiating, or operating a finite state machine may include operating a finite state machine traverser for traversing the finite state machine. Instantiating the tokenization finite state machine may include entering an empty state, indicating the absence of received input. The relational search unit 3700 may initiate or execute an operation, such as an entry operation, corresponding to the empty state in response to entering the empty state. Subsequently, the relational search unit 3700 may receive input data, and the tokenization finite state machine may transition from the empty state to a state corresponding to the received input data. In some embodiments, the relational search unit 3700 may initiate one or more data-queries in response to transitioning to or from a respective state of a finite state machine. In the tokenization finite state machine, a state may represent a possible next token in the request string. The tokenization finite state machine may transition between states based on one or more defined transition weights, which may indicate a probability of transiting from a state to a subsequent state.

The tokenization finite state machine may determine tokenization based on probabilistic path utility. Probabilistic path utility may rank or order multiple candidate traversal paths for traversing the tokenization finite state machine based on the request string. The candidate paths may be ranked or ordered based on one or more defined probabilistic path utility metrics, which may be evaluated in a defined sequence. For example, the tokenization finite state machine may determine probabilistic path utility by evaluating the weights of the respective candidate transition paths, the lengths of the respective candidate transition paths, or a combination thereof. In some implementations, the weights of the respective candidate transition paths may be evaluated with high priority relative to the lengths of the respective candidate transition paths.

In some implementations, one or more transition paths evaluated by the tokenization finite state machine may include a bound state such that the candidate tokens available for tokenization of a portion of the request string may be limited based on the tokenization of a previously tokenized portion of the request string.

Tokenization may include matching a portion of the request string to one or more token types, such as a constant token type, a column name token type, a value token type, a control-word token type, a date value token type, a string value token type, or any other token type defined by the low-latency database analysis system 3000. A constant token type may be a fixed, or invariant, token type, such as a numeric value. A column name token type may correspond with a name of a column in the data model. A value token type may correspond with an indexed data value. A control-word token type may correspond with a defined set of control-words. A date value token type may be similar to a control-word token type and may correspond with a defined set of control-words for describing temporal information. A string value token type may correspond with an unindexed value.

Token matching may include ordering or weighting candidate token matches based on one or more token matching metrics. Token matching metrics may include whether a candidate match is within a defined data scope, such as a defined set of tables, wherein a candidate match outside the defined data scope (out-of-scope) may be ordered or weighted lower than a candidate match within the define data scope (in-scope). Token matching metrics may include whether, or the degree to which, a candidate match increases query complexity, such as by spanning multiple roots, wherein a candidate match that increases complexity may be ordered or weighted lower than a candidate match that does not increase complexity or increases complexity to a lesser extent. Token matching metrics may include whether the candidate match is an exact match or a partial match, wherein a candidate match that is a partial may be ordered or weighted lower than a candidate match that is an exact match. In some implementations, the cardinality of the set of partial matches may be limited to a defined value.

Token matching metrics may include a token score (TokenScore), wherein a candidate match with a relatively low token score may be ordered or weighted lower than a candidate match with a relatively high token score. The token score for a candidate match may be determined based one or more token scoring metrics. The token scoring metrics may include a finite state machine transition weight metric (FSMScore), wherein a weight of transitioning from a current state of the tokenization finite state machine to a state indicating a candidate matching token is the finite state machine transition weight metric. The token scoring metrics may include a cardinality penalty metric (CardinalityScore), wherein a cardinality of values (e.g., unique values) corresponding to the candidate matching token is used as a penalty metric (inverse cardinality), which may reduce the token score. The token scoring metrics may include an index utility metric (IndexScore), wherein a defined utility value, such as one, associated with an object, such as a column wherein the matching token represents the column or a value from the column, is the index utility metric. In some implementations, the defined utility values may be configured, such as in response to user input, on a per object (e.g., per column) basis. The token scoring metrics may include a usage metric (UBRScore). The usage metric may be determined based on a usage based ranking index, one or more usage ranking metrics, or a combination thereof. Determining the usage metric (UBRScore) may include determining a usage boost value (UBRBoost). The token score may be determined based on a defined combination of token scoring metrics. For example, determining the token score may be expressed as the following:

$$TokenScore = FSMScore*(IndexScore + UBRScore*UBRBoost) + \text{Min}(CardinalityScore, 1).$$

Token matching may include grouping candidate token matches by match type, ranking or ordering on a per-match type basis based on token score, and ranking or ordering the match types. For example, the match types may include a first match type for exact matches (having the highest match type priority order), a second match type for prefix matches on ontological data (having a match type priority order lower than the first match type), a third match type for substring matches on ontological data and prefix matches on data values (having a match type priority order lower than the second match type), a fourth match type for substring matches on data values (having a match type priority order lower than the third match type), and a fifth match type for matches omitted from the first through fourth match types (having a match type priority order lower than the fourth match type). Other match types and match type orders may be used.

Tokenization may include ambiguity resolution. Ambiguity resolution may include token ambiguity resolution, join-path ambiguity resolution, or both. In some implementations, ambiguity resolution may cease tokenization in response to the identification of an automatic ambiguity resolution error or failure.

Token ambiguity may correspond with identifying two or more exactly matching candidate matching tokens. Token ambiguity resolution may be based on one or more token ambiguity resolution metrics. The token ambiguity resolution metrics may include using available previously resolved token matching or binding data and token ambiguity may be resolved in favor of available previously resolved token matching or binding data, other relevant tokens resolved from the request string, or both. The token ambiguity resolution may include resolving token ambiguity in favor of integer constants. The token ambiguity resolution may include resolving token ambiguity in favor of control-words, such as for tokens at the end of a request for data, such as last, that are not being edited.

Join-path ambiguity may correspond with identifying matching tokens having two or more candidate join paths. Join-path ambiguity resolution may be based on one or more join-path ambiguity resolution metrics. The join-path ambiguity resolution metrics may include using available previously resolved join-path binding data and join-path ambiguity may be resolved in favor of available previously resolved join-paths. The join-path ambiguity resolution may include favoring join paths that include in-scope objects over join paths that include out-of-scope objects. The join-path ambiguity resolution metrics may include a complexity minimization metric, which may favor a join path that omits or avoids increasing complexity over join paths that increase complexity, such as a join path that may introduce a chasm trap.

The relational search unit 3700 may identify a resolved-request based on the request string. The resolved-request, which may be database and visualization agnostic, may be expressed or communicated as an ordered sequence of tokens representing the request for data indicated by the request string. The relational search unit 3700 may instantiate, or generate, one or more resolved-request objects. For example, the relational search unit 3700 may create or store a resolved-request object corresponding to the resolved-request in the distributed in-memory ontology unit 3500. The relational search unit 3700 may transmit, send, or otherwise make available, the resolved-request to the semantic interface unit 3600.

In some implementations, the relational search unit 3700 may transmit, send, or otherwise make available, one or more resolved-requests, or portions thereof, to the semantic interface unit 3600 in response to finite state machine transitions. For example, the relational search unit 3700 may instantiate a search object in response to a first transition of a finite state machine. The relational search unit 3700 may include a first search object instruction in the search object in response to a second transition of the finite state machine. The relational search unit 3700 may send the search object including the first search object instruction to the semantic interface unit 3600 in response to the second transition of the finite state machine. The relational search unit 3700 may include a second search object instruction in the search object in response to a third transition of the finite state machine. The relational search unit 3700 may send the search object including the search object instruction, or a combination of the first search object instruction and the second search object instruction, to the semantic interface unit 3600 in response to the third transition of the finite state machine. The search object instructions may be represented using any annotation, instruction, text, message, list, pseudo-code, comment, or the like, or any combination thereof that may be converted, transcoded, or translated into structured search instructions for retrieving data from the low-latency data.

The relational search unit 3700 may provide an interface to permit the creation of user-defined syntax. For example, a user may associate a string with one or more tokens. Accordingly, when the string is entered, the pre-associated tokens are returned in lieu of searching for tokens to match the input.

The relational search unit 3700 may include a localization unit (not expressly shown). The localization, globalization, regionalization, or internationalization, unit may obtain source data expressed in accordance with a source expressive-form and may output destination data representing the source data, or a portion thereof, and expressed using a destination expressive-form. The data expressive-forms, such as the source expressive-form and the destination expressive-form, may include regional or customary forms of expression, such as numeric expression, temporal expression, currency expression, alphabets, natural-language elements, measurements, or the like. For example, the source expressive-form may be expressed using a canonical-form, which may include using a natural-language, which may be based on English, and the destination expressive-form may be expressed using a locale-specific form, which may include using another natural-language, which may be a natural-language that differs from the canonical-language. In another example, the destination expressive-form and the source expressive-form may be locale-specific expressive-forms and outputting the destination expressive-form representation of the source expressive-form data may include obtaining a canonical-form representation of the source expressive-form data and obtaining the destination expressive-form representation based on the canonical-form representation. Although, for simplicity and clarity, the grammars described herein, such as the data-analytics grammar and the natural language data-analytics grammar, are described with relation to the canonical expressive-form, the implementation of the respective grammars, or portions thereof, described herein may implement locale-specific expressive-forms. For example, the data-analytics tokenizer may include multiple locale-specific data-analytics tokenizers.

The natural language processing unit 3710 may receive input data including a natural language string, such as a natural language string generated in accordance with user input. The natural language string may represent a data request expressed in an unrestricted natural language form, for which data identified or obtained prior to, or in conjunction with, receiving the natural language string by the natural language processing unit 3710 indicating the semantic structure, correlation to the low-latency database analysis system 3000, or both, for at least a portion of the natural language string is unavailable or incomplete. Although not shown separately in FIG. 3, in some implementations, the natural language string may be generated or determined based on processing an analog signal, or a digital representation thereof, such as an audio stream or recording or a video stream or recording, which may include using speech-to-text conversion.

The natural language processing unit 3710 may analyze, process, or evaluate the natural language string, or a portion thereof, to generate or determine the semantic structure, correlation to the low-latency database analysis system 3000, or both, for at least a portion of the natural language string. For example, the natural language processing unit 3710 may identify one or more words or terms in the natural language string and may correlate the identified words to tokens defined in the low-latency database analysis system 3000. In another example, the natural language processing unit 3710 may identify a semantic structure for the natural language string, or a portion thereof. In another example, the natural language processing unit 3710 may identify a probabilistic intent for the natural language string, or a portion thereof, which may correspond to an operative feature of the low-latency database analysis system 3000, such as retrieving data from the internal data, analyzing data the internal data, or modifying the internal data.

The natural language processing unit 3710 may send, transmit, or otherwise communicate request data indicating the tokens, relationships, semantic data, probabilistic intent, or a combination thereof or one or more portions thereof, identified based on a natural language string to the relational search unit 3700.

The data utility unit 3720 may receive, process, and maintain user-agnostic utility data, such as system configuration data, user-specific utility data, such as utilization data, or both user-agnostic and user-specific utility data. The utility data may indicate whether a data portion, such as a column, a record, an insight, or any other data portion, has high utility or low utility within the system, such across all users of the system. For example, the utility data may indicate that a defined column is a high-utility column or a low-utility column. The data utility unit 3720 may store the utility data, such as using the low-latency data structure. For example, in response to a user using, or accessing, a data portion, data utility unit 3720 may store utility data indicating the usage, or access, event for the data portion, which may include incrementing a usage event counter associated with the data portion. In some embodiments, the data utility unit 3720 may receive the information indicating the usage, or access, event for the data portion from the insight unit 3730, and the usage, or access, event for the data portion may indicate that the usage is associated with an insight.

The data utility unit 3720 may receive a signal, message, or other communication, indicating a request for utility information. The request for utility information may indicate an object or data portion. The data utility unit 3720 may determine, identify, or obtain utility data associated with the identified object or data portion. The data utility unit 3720 may generate and send utility response data responsive to the request that may indicate the utility data associated with the identified object or data portion.

The data utility unit 3720 may generate, maintain, operate, or a combination thereof, one or more indexes, such as one or more of a usage (or utility) index, a resolved-request index, or a phrase index, based on the low-latency data stored in the distributed in-memory database 3300, the low-latency database analysis system 3000, or both.

The insight unit 3730 may automatically identify one or more insights, which may be data other than data expressly requested by a user, and which may be identified and prioritized, or both, based on probabilistic utility.

The object search unit 3800 may generate, maintain, operate, or a combination thereof, one or more object-indexes, which may be based on the analytical-objects represented in the low-latency database analysis system 3000, or a portion thereof, such as pinboards, answers, and worksheets. An object-index may be a defined data structure, or combination of data structures, for storing analytical-object data in a form optimized for searching. Although shown as a single unit in FIG. 3, the object search unit 3800 may interface with a distinct, separate, object indexing unit (not expressly shown).

The object search unit 3800 may include an object-index population interface, an object-index search interface, or both. The object-index population interface may obtain and store, load, or populate analytical-object data, or a portion thereof, in the object-indexes. The object-index search interface may efficiently access or retrieve analytical-object data from the object-indexes such as by searching or traversing the object-indexes, or one or more portions thereof. In some implementations, the object-index population interface, or a portion thereof, may be a distinct, independent unit.

The object-index population interface may populate, update, or both the object-indexes, such as periodically, such as in accordance with a defined temporal period, such as thirty minutes. Populating, or updating, the object-indexes may include obtaining object indexing data for indexing the analytical-objects represented in the low-latency database analysis system 3000. For example, the object-index population interface may obtain the analytical-object indexing data, such as from the distributed in-memory ontology unit 3500. Populating, or updating, the object-indexes may include generating or creating an indexing data structure representing an object. The indexing data structure for representing an object may differ from the data structure used for representing the object in other components of the low-latency database analysis system 3000, such as in the distributed in-memory ontology unit 3500.

The object indexing data for an analytical-object may be a subset of the object data for the analytical-object. The object indexing data for an analytical-object may include an object identifier for the analytical-object uniquely identifying the analytical-object in the low-latency database analysis system 3000, or in a defined data-domain within the low-latency database analysis system 3000. The low-latency database analysis system 3000 may uniquely, unambiguously, distinguish an object from other objects based on the object identifier associated with the object. The object indexing data for an analytical-object may include data non-uniquely identifying the object. The low-latency database analysis system 3000 may identify one or more analytical-objects based on the non-uniquely identifying data associated with the respective objects, or one or more portions thereof. In some implementations, an object identifier may be an ordered combination of non-uniquely identifying object data that, as expressed in the ordered combination, is uniquely identifying. The low-latency database analysis system 3000 may enforce the uniqueness of the object identifiers.

Populating, or updating, the object-indexes may include indexing the analytical-object by including or storing the object indexing data in the object-indexes. For example, the object indexing data may include data for an analytical-object, the object-indexes may omit data for the analytical-object, and the object-index population interface may include or store the object indexing data in an object-index. In another example, the object indexing data may include data for an analytical-object, the object-indexes may include data for the analytical-object, and the object-index population interface may update the object indexing data for the analytical-object in the object-indexes in accordance with the object indexing data.

Populating, or updating, the object-indexes may include obtaining object utility data for the analytical-objects represented in the low-latency database analysis system 3000. For example, the object-index population interface may obtain the object utility data, such as from the object utility unit 3810. The object-index population interface may include the object utility data in the object-indexes in association with the corresponding objects.

In some implementations, the object-index population interface may receive, obtain, or otherwise access the object utility data from a distinct, independent, object utility data population unit, which may read, obtain, or otherwise access object utility data from the object utility unit 3810 and may send, transmit, or otherwise provide, the object utility data to the object search unit 3800. The object utility data population unit may send, transmit, or otherwise provide, the object utility data to the object search unit 3800 periodically, such as in accordance with a defined temporal period, such as thirty minutes.

The object-index search interface may receive, access, or otherwise obtain data expressing a usage intent with respect to the low-latency database analysis system 3000, which may represent a request to access data in the low-latency database analysis system 3000, which may represent a request to access one or more analytical-objects represented in the low-latency database analysis system 3000. The object-index search interface may generate one or more object-index queries based on the data expressing the usage intent. The object-index search interface may send, transmit, or otherwise make available the object-index queries to one or more of the object-indexes.

The object-index search interface may receive, obtain, or otherwise access object search results data indicating one or more analytical-objects identified by searching or traversing the object-indexes in accordance with the object-index queries. The object-index search interface may sort or rank the object search results data based on probabilistic utility in accordance with the object utility data for the analytical-objects in the object search results data. In some implementations, the object-index search interface may include one or more object search ranking metrics with the object-index queries and may receive the object search results data sorted or ranked based on probabilistic utility in accordance with the object utility data for the objects in the object search results data and in accordance with the object search ranking metrics.

For example, the data expressing the usage intent may include a user identifier, and the object search results data may include object search results data sorted or ranked based on probabilistic utility for the user. In another example, the data expressing the usage intent may include a user identifier and one or more search terms, and the object search results data may include object search results data sorted or ranked based on probabilistic utility for the user identified by searching or traversing the object-indexes in accordance with the search terms.

The object-index search interface may generate and send, transmit, or otherwise make available the sorted or ranked object search results data to another component of the low-latency database analysis system 3000, such as for further processing and display to the user.

The object utility unit 3810 may receive, process, and maintain user-specific object utility data for objects represented in the low-latency database analysis system 3000. The user-specific object utility data may indicate whether an object has high utility or low utility for the user.

The object utility unit 3810 may store the user-specific object utility data, such as on a per-object basis, a per-activity basis, or both. For example, in response to data indicating an object access activity, such as a user using, viewing, or otherwise accessing, an object, the object utility unit 3810 may store user-specific object utility data indicating the object access activity for the object, which may include incrementing an object access activity counter associated with the object, which may be a user-specific object access activity counter. In another example, in response to data indicating an object storage activity, such as a user storing an object, the object utility unit 3810 may store user-specific object utility data indicating the object storage activity for the object, which may include incrementing a storage activity counter associated with the object, which may be a user-specific object storage activity counter. The user-specific object utility data may include temporal information, such as a temporal location identifier associated with the object activity. Other information associated with the object activity may be included in the object utility data.

The object utility unit 3810 may receive a signal, message, or other communication, indicating a request for object utility information. The request for object utility information may indicate one or more objects, one or more users, one or more activities, temporal information, or a combination thereof. The request for object utility information may indicate a request for object utility data, object utility counter data, or both.

The object utility unit 3810 may determine, identify, or obtain object utility data in accordance with the request for object utility information. The object utility unit 3810 may generate and send object utility response data responsive to the request that may indicate the object utility data, or a portion thereof, in accordance with the request for object utility information.

For example, a request for object utility information may indicate a user, an object, temporal information, such as information indicating a temporal span, and an object activity, such as the object access activity. The request for object utility information may indicate a request for object utility counter data. The object utility unit 3810 may determine, identify, or obtain object utility counter data associated with the user, the object, and the object activity having a temporal location within the temporal span, and the object utility unit 3810 may generate and send object utility response data including the identified object utility counter data.

In some implementations, a request for object utility information may indicate multiple users, or may omit indicating a user, and the object utility unit 3810 may identify user-agnostic object utility data aggregating the user-specific object utility data. In some implementations, a request for object utility information may indicate multiple objects, may omit indicating an object, or may indicate an object type, such as answer, pinboard, or worksheet, and the object utility unit 3810 may identify the object utility data by aggregating the object utility data for multiple objects in accordance with the request. Other object utility aggregations may be used.

The system configuration unit 3820 implement or apply one or more low-latency database analysis system configurations to enable, disable, or configure one or more operative features of the low-latency database analysis system 3000. The system configuration unit 3820 may store data representing or defining the one or more low-latency database analysis system configurations. The system configuration unit 3820 may receive signals or messages indicating input data, such as input data generated via a system access interface, such as a user interface, for accessing or modifying the low-latency database analysis system configurations. The system configuration unit 3820 may generate, modify, delete, or otherwise maintain the low-latency database analysis system configurations, such as in response to the input data. The system configuration unit 3820 may generate or determine output data, and may output the output data, for a system access interface, or a portion or portions thereof, for the low-latency database analysis system configurations, such as for presenting a user interface for the low-latency database analysis system configurations. Although not shown in FIG. 3, the system configuration unit 3820 may communicate with a repository, such as an external centralized repository, of low-latency database analysis system configurations; the system configuration unit 3820 may receive one or more low-latency database analysis system configurations from the repository, and may control or configure one or more operative features of the low-latency database analysis system 3000 in response to receiving one or more low-latency database analysis system configurations from the repository.

The user customization unit 3830 may receive, process, and maintain user-specific utility data, such as user defined configuration data, user defined preference data, or a combination thereof. The user-specific utility data may indicate whether a data portion, such as a column, a record, an insight, or any other data portion or object, has high utility or low utility to an identified user. For example, the user-specific utility data may indicate that a defined column is a high-utility column or a low-utility column. The user customization unit 3830 may store the user-specific utility data, such as using the low-latency data structure. The user customization unit 3830 may store the feedback at an individual level and may include the context in which feedback was received from the user. Feedback may be stored in a disk-based system. In some implementations, feedback may be stored in an in-memory storage.

The system access interface unit 3900 may interface with, or communicate with, a system access unit (not shown in FIG. 3), which may be a client device, a user device, or another external device or system, or a combination thereof, to provide access to the internal data, features of the low-latency database analysis system 3000, or a combination thereof. For example, the system access interface unit 3900 may receive signals, message, or other communications representing interactions with the internal data, such as data expressing a usage intent and may output response messages, signals, or other communications responsive to the received requests.

The system access interface unit 3900 may generate data for presenting a user interface, or one or more portions thereof, for the low-latency database analysis system 3000. For example, the system access interface unit 3900 may generate instructions for rendering, or otherwise presenting, the user interface, or one or more portions thereof and may transmit, or otherwise make available, the instructions for rendering, or otherwise presenting, the user interface, or one or more portions thereof to the system access unit, for presentation to a user of the system access unit. For example, the system access unit may present the user interface via a web browser or a web application and the instructions may be in the form of HTML, JavaScript, or the like.

In an example, the system access interface unit 3900 may include a data-analytics field user interface element in the user interface. The data-analytics field user interface element may be an unstructured string user input element or field. The system access unit may display the unstructured string user input element. The system access unit may receive input data, such as user input data, corresponding to the unstructured string user input element. The system access unit may transmit, or otherwise make available, the unstructured string user input to the system access interface unit 3900. The user interface may include other user interface elements and the system access unit may transmit, or otherwise make available, other user input data to the system access interface unit 3900.

The system access interface unit 3900 may obtain the user input data, such as the unstructured string, from the system access unit. The system access interface unit 3900 may transmit, or otherwise make available, the user input data to one or more of the other components of the low-latency database analysis system 3000.

In some embodiments, the system access interface unit 3900 may obtain the unstructured string user input as a sequence of individual characters or symbols, and the system access interface unit 3900 may sequentially transmit, or otherwise make available, individual or groups of characters or symbols of the user input data to one or more of the other components of the low-latency database analysis system 3000.

In some embodiments, system access interface unit 3900 may obtain the unstructured string user input may as a sequence of individual characters or symbols, the system access interface unit 3900 may aggregate the sequence of individual characters or symbols, and may sequentially transmit, or otherwise make available, a current aggregation of the received user input data to one or more of the other components of the low-latency database analysis system 3000, in response to receiving respective characters or symbols from the sequence, such as on a per-character or per-symbol basis.

The real-time collaboration unit 3910 may receive signals or messages representing input received in accordance with multiple users, or multiple system access devices, associated with a collaboration context or session, may output data, such as visualizations, generated or determined by the low-latency database analysis system 3000 to multiple users associated with the collaboration context or session, or both. The real-time collaboration unit 3910 may receive signals or messages representing input received in accordance with one or more users indicating a request to establish a collaboration context or session, and may generate, maintain, or modify collaboration data representing the collaboration context or session, such as a collaboration session identifier. The real-time collaboration unit 3910 may receive signals or messages representing input received in accordance with one or more users indicating a request to participate in, or otherwise associate with, a currently active collaboration context or session, and may associate the one or more users with the currently active collaboration context or session. In some implementations, the input, output, or both, of the real-time collaboration unit 3910 may include synchronization data, such as temporal data, that may be used to maintain synchronization, with respect to the collaboration context or session, among the low-latency database analysis system 3000 and one or more system access devices associated with, or otherwise accessing, the collaboration context or session.

The third-party integration unit 3920 may include an electronic communication interface, such as an application programming interface (API), for interfacing or communicating between an external, such as third-party, application or system, and the low-latency database analysis system 3000. For example, the third-party integration unit 3920 may include an electronic communication interface to transfer data between the low-latency database analysis system 3000 and one or more external applications or systems, such as by importing data into the low-latency database analysis system 3000 from the external applications or systems or exporting data from the low-latency database analysis system 3000 to the external applications or systems. For example, the third-party integration unit 3920 may include an electronic communication interface for electronic communication with an external exchange, transfer, load (ETL) system, which may import data into the low-latency database analysis system 3000 from an external data source or may export data from the low-latency database analysis system 3000 to an external data repository. In another example, the third-party integration unit 3920 may include an electronic communication interface for electronic communication with external machine learning analysis software, which may export data from the low-latency database analysis system 3000 to the external machine learning analysis software and may import data into the low-latency database analysis system 3000 from the external machine learning analysis software. The third-party integration unit 3920 may transfer data independent of, or in conjunction with, the system access interface unit 3900, the enterprise data interface unit 3400, or both.

The persistent storage unit 3930 may include an interface for storing data on, accessing data from, or both, one or more persistent data storage devices or systems. For example, the persistent storage unit 3930 may include one or more persistent data storage devices, such as the static memory 1200 shown in FIG. 1. Although shown as a single unit in FIG. 3, the persistent storage unit 3930 may include multiple components, such as in a distributed or clustered configuration. The persistent storage unit 3930 may include one or more internal interfaces, such as electronic communication or application programming interfaces, for receiving data from, sending data to, or both other components of the low-latency database analysis system 3000. The persistent storage unit 3930 may include one or more external interfaces, such as electronic communication or application programming interfaces, for receiving data from, sending data to, or both, one or more external systems or devices, such as an external persistent storage system. For example, the persistent storage unit 3930 may include an internal interface for obtaining key-value tuple data from other components of the low-latency database analysis system 3000, an external interface for sending the key-value tuple data to, or storing the key-value tuple data on, an external persistent storage system, an external interface for obtaining, or otherwise accessing, the key-value tuple data from the external persistent storage system, and an internal key-value tuple data for sending, or otherwise making available, the key-value tuple data to other components of the low-latency database analysis system 3000. In another example, the persistent storage unit 3930 may include a first external interface for storing data on, or obtaining data from, a first external persistent storage system, and a second external interface for storing data on, or obtaining data from, a second external persistent storage system.

Figure 4:
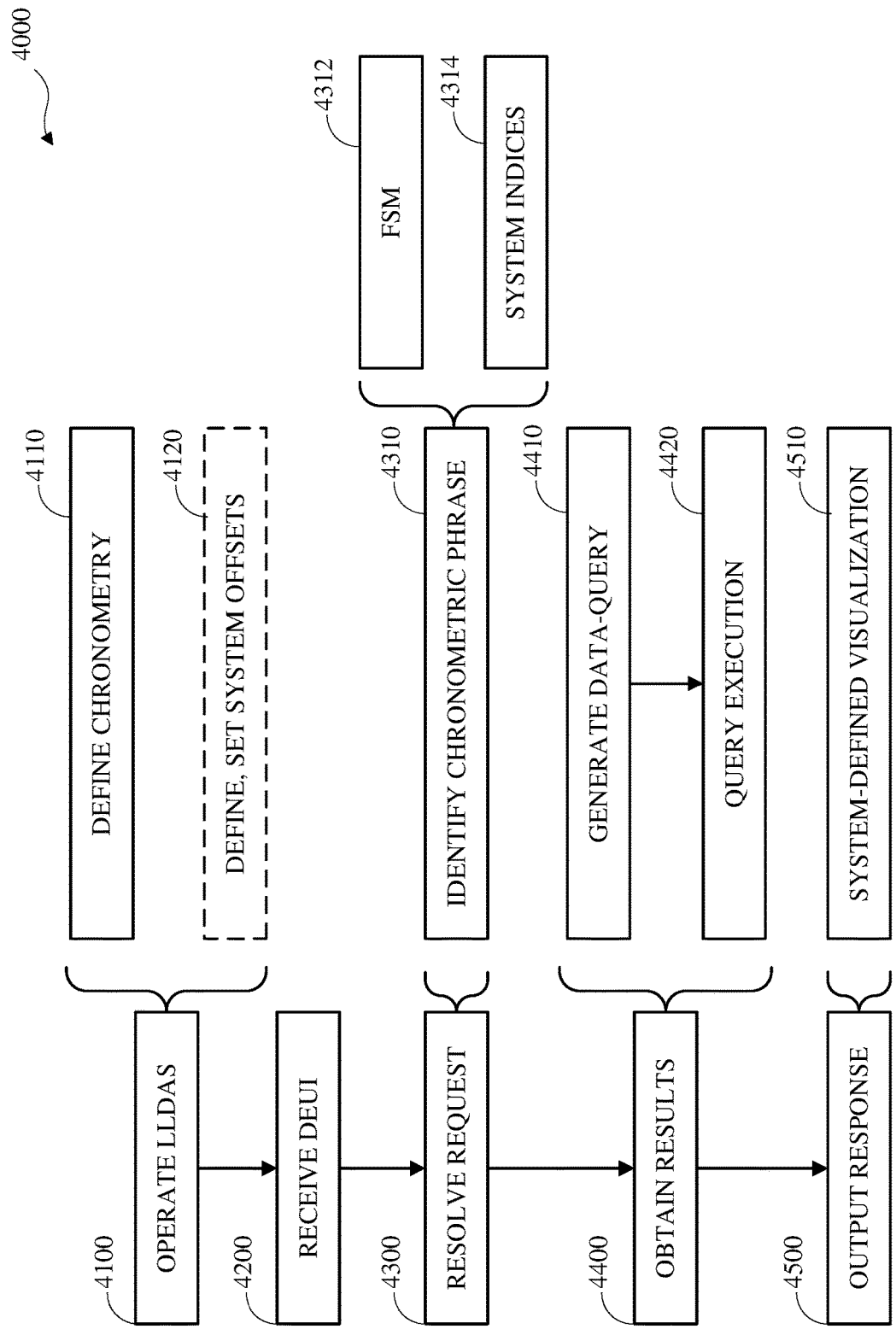
FIG. 4 is a flow diagram of a method of analytical data access with system-defined chronometry in a low-latency database analysis system.

FIG. 4 is a flow diagram of a method of analytical data access with system-defined chronometry 4000 in a low-latency database analysis system. Analytical data access with system-defined chronometry 4000 may be implemented in one or more components of a low-latency database analysis system, such as the low-latency database analysis system 3000 shown in FIG. 3, such as in a distributed in-memory database, such as the distributed in-memory database 3300 shown in FIG. 3, a relational search unit, such as the relational search unit 3700 shown in FIG. 3, a natural language processing unit, such as the natural language processing unit 3710 shown in FIG. 3, and a system access interface unit, such as the system access interface unit 3900 shown in FIG. 3.

Analytical data access in a low-latency database analysis system with system-defined chronometry 4000 includes operating the low-latency database analysis system (LL-DAS) at 4100, receiving data expressing a usage intent (DEUI) at 4200, generating a resolved-request at 4300, obtaining response data at 4400, and outputting a response at 4500.

Operating the low-latency database analysis system at 4100 may include generating the low-latency database analysis system. Generating the low-latency database analysis system may include defining chronometry (system-defined chronometry) for the low-latency database analysis system at 4110.

The data of the low-latency database analysis system, such as the data stored in or accessed by the low-latency database analysis system, may include temporal data indicating or representing one or more points, locations, or intervals, in a temporal continuum. A temporal point represents a discrete, or unique, point in the temporal continuum, such that the ordered contiguous sequence of temporal points comprises the temporal continuum. A temporal location represents a discrete, or unique, point, or a defined ordered contiguous sequence of points, in the temporal continuum. A temporal interval represents a defined cardinality of sequential contiguous temporal points or locations.

The system-defined chronometry defines the measurement, storage, processing, organization, scale, expression, and representation of time and temporal data in the low-latency database analysis system. For example, the temporal continuum may correspond with natural time, or an approximation thereof, and the system-defined chronometry may correspond with a Gregorian calendar, or a defined variant thereof. The system-defined chronometry defines one or more chronometric units, which may be nominal, or named, representations of respective temporal intervals. A reference chronometric unit, such as a 'second' chronometric unit, may represent a minimal temporal interval in the low-latency database analysis system.

The low-latency database analysis system may define or describe one or more chronometric unit types, such as a 'second' chronometric unit type, a 'minute' chronometric unit type, an 'hour' chronometric unit type, a 'day' chronometric unit type, a 'week' chronometric unit type, a 'month' chronometric unit type, a 'quarter' chronometric unit type, a 'year' chronometric unit type, or any other type of chronometric unit.

A temporal point may be represented, such as stored or processed, in the low-latency database analysis system as an epoch value, which may be an integer value, such that each temporal point from the contiguous sequence of temporal points that comprises the temporal continuum corresponds with a respective epoch value. A temporal location may be represented in the low-latency database analysis system as an epoch value and may be expressed in the low-latency database analysis system using one or more chronometric units, or respective values thereof.

Generating or defining the system-defined chronometry may include, for example, generating, such as by writing and storing, program instructions (code) describing the chronometry, or aspects thereof. In some implementations, the system-defined chronometry, or a portion thereof, may be compiled. Aspects of the system-defined chronometry may be defined in one or more of the components of the low-latency database analysis system, such as one or more of the components 3100-3920 of the low-latency database analysis system 3000 shown in FIG. 3.

One or more aspects of the system-defined chronometry may be defined by the operating environment of the low-latency database analysis system, such as by a hardware component, an operating system, or a combination thereof. For example, a hardware component, such as a system clock (clock circuit) may define the temporal interval of the reference chronometric unit and an operating system may define one or more other chronometric units with reference to the reference chronometric unit.

The system-defined chronometry defines a minute chronometric unit as an ordered contiguous sequence of sixty (60) minimal chronometric units (seconds). The system-defined chronometry defines an hour chronometric unit as an ordered contiguous sequence of sixty (60) minute chronometric units. The system-defined chronometry defines a day chronometric unit as an ordered contiguous sequence of twenty-four (24) hour chronometric units. The system-defined chronometry defines a week chronometric unit as an ordered contiguous sequence of seven (7) day chronometric units. The system-defined chronometry defines a month chronometric unit as an ordered contiguous sequence of twenty-eight (28), twenty-nine (29), thirty (30), or thirty-one (31) day chronometric units. The system-defined chronometry defines a quarter chronometric unit as an ordered contiguous sequence of three (3) month chronometric units. The system-defined chronometry defines a year chronometric unit as an ordered contiguous sequence of twelve (12) month chronometric units. The system-defined chronometry defines the year chronometric unit as an ordered contiguous sequence of four (4) quarter chronometric units.

The system-defined chronometry defines respective descriptors, such as a day-of-week-name, for instances of the day chronometric unit with respect to the ordered contiguous sequence of day chronometric units corresponding to, or within, an instance of a week chronometric unit of the canonical chronometry. The respective descriptors for the instances of the day chronometric unit with respect to the ordered contiguous sequence of day chronometric units corresponding to, or within, an instance of a week chronometric unit of the canonical chronometry are "Monday", "Tuesday", "Wednesday", "Thursday", "Friday", "Saturday", and "Sunday".

The system-defined chronometry defines respective descriptors, such as a month-name, for instances of the month chronometric unit with respect to the ordered contiguous sequence of month chronometric units corresponding to, or within, an instance of a year chronometric unit of the canonical chronometry. The respective descriptors for the instances of the month chronometric unit with respect to the ordered contiguous sequence of month chronometric units corresponding to, or within, an instance of a year chronometric unit of the canonical chronometry are "January", "February", "March", "April", "May", "June", "July", "August", "September", "October", "November", and "December".

Defined ordinals may be defined for the respective defined ordered contiguous sequences of chronometric units, such as integer value ordinals. For example, for the ordered contiguous sequence of four (4) quarter chronometric units of the year chronometric unit, the ordinal (quarter-ordinal) of the first quarter chronometric unit may be one (1), the ordinal of the second quarter chronometric unit may be two (2), the ordinal of the third quarter chronometric unit may be three (3), and the ordinal for the fourth quarter chronometric unit may be four (4). Other ordinals may be used, such as day-ordinals, for the ordered contiguous sequence of day chronometric units of the week chronometric unit, and month-ordinals, for the ordered contiguous sequence of month chronometric units of the year chronometric unit.

The system-defined chronometry may define or describe one or more nominal values, descriptors, or display attributes, such a system-defined display name, for respective chronometric units of the respective defined ordered contiguous sequences of chronometric units. For example, defining the system access interface unit may include defining one or more system-defined temporal or chronometric data visualizations, which may include the display attributes, for output or presentation of the temporal data. For example, for the ordered contiguous sequence of four (4) quarter chronometric units of the year chronometric unit, the defined display value of the first quarter chronometric unit may be "Q1", the defined display value of the second quarter chronometric unit may be "Q2", the defined display value of the third quarter chronometric unit may be "Q3", and the defined display value of the fourth quarter chronometric unit may be "Q4". The system access interface unit may generate output or presentation data representing date values with reference to the ordered contiguous sequence of four (4) quarter chronometric units of the year chronometric unit by determining a chronometric quarter corresponding to the date value and outputting the corresponding display value.

Generating the low-latency database analysis system may include defining and configuring one or more configurable chronometric ordinal offsets (system offsets) for the low-latency database analysis system at 4120. The configurable chronometric ordinal offsets, or other aspects of the low-latency database analysis system, may be defined on a domain-agnostic basis and may be configurable on a domain-specific basis. Domains may be hierarchical. For example, the low-latency database analysis system (system-domain) may include data associated with one or more organizations (organization-domain). Aspects of the low-latency database analysis system-defined for or associated with a domain may be domain-agnostic with respect to sub-domains of the domain. For example, a chronometric ordinal offset defined for the system-domain may be domain-agnostic with respect to sub-domains of the system-domain, such as the organization-domains. Aspects of the low-latency database analysis system-defined for or associated with a domain may be domain-specific with respect to peer-domains and super-domains of the domain. For example, a chronometric ordinal offset defined for an organization-domain may be domain-specific with respect other organization-domains and with respect to the system-domain. A sub-domain for which a value of a configurable chronometric offset is unconfigured may inherit the value of the configurable chronometric offset configured for the super-domain of the sub-domain (cascading). For example, the value of a configurable chronometric ordinal offset that is unconfigured for an organization-domain may be the value of the corresponding configurable chronometric ordinal offset that is configured for the system-domain. In some implementations, defining, configuring, or both, the system offsets may be omitted, as indicated by the broken line border at 4120.

The configurable chronometric ordinal offsets may be defined for the respective defined ordered contiguous sequences of chronometric units. For example, generating the low-latency database analysis system may include defining a first-month-of-year configurable chronometric ordinal offset for the low-latency database analysis system with respect to the ordered contiguous sequence of twelve (12) month chronometric units of the year chronometric unit. The first-month-of-year configurable chronometric ordinal offset may be defined as an integer value in a defined range, such as [0-11], which may be based on the ordinal values of the ordered contiguous sequence of twelve (12) month chronometric units of the year chronometric unit. The value of the first-month-of-year configurable chronometric ordinal offset may be configurable on a domain-specific specific basis. A domain-agnostic value for the first-month-of-year configurable chronometric offset may be configured for the low-latency database analysis system. In another example, generating the low-latency database analysis system may include defining a first-day-of-week configurable chronometric ordinal offset for the low-latency database analysis system with respect to the ordered contiguous sequence of seven (7) day chronometric units of the week chronometric unit. The first-day-of-week configurable chronometric ordinal offset may be defined as an integer value in a defined range, such as [0-6], which may be based on the ordinal values of the ordered contiguous sequence of seven (7) day chronometric units of the week chronometric unit. The value of the first-day-of-week configurable chronometric ordinal offset may be configurable on a domain-specific specific basis. A domain-agnostic value for the first-day-of-week configurable chronometric offset may be configured for the low-latency database analysis system. In some implementations, domain-specific configurable chronometric ordinal offsets, other than the first-month-of-year configurable chronometric ordinal offset and the first-day-of-week configurable chronometric ordinal offset, may be undefined, unavailable, or otherwise omitted.

Generating the low-latency database analysis system at 4100 may include generating a system-defined ontological index, such as the control-word index. Generating the system-defined ontological index may include including one or more chronometric tokens for the system-defined chronometry in the system-defined ontological index. For example, tokens corresponding to the chronometric units for the system-defined chronometry, such as "date", "day", "days", "daily", "week", "weeks", "weekly", "month", "months", "monthly", "quarter", "quarters", "quarterly", "year", "years", "yearly", and the like, may be included in the system-defined ontological index.

Generating the low-latency database analysis system at 4100 may include defining a finite state machine (FSM) for the low-latency database analysis system, such as the finite state machine implemented by the relational search unit 3700 shown in FIG. 3. Generating the finite state machine includes identifying the names or descriptors for chronometric units for the system-defined chronometry, such as day-of-week name, month-of-year name, quarter-of-year name, or year names and including the names or descriptors for chronometric units for the system-defined chronometry in the finite state machine as state transition identifiers.

Generating the low-latency database analysis system at 4100 may include defining one or more chronometric phrase patterns for the system-defined chronometry. For example, generating the low-latency database analysis system at 4100 may include generating a relational search unit of the low-latency database analysis system, such as the relational search unit 3700 shown in FIG. 3, which may include defining the chronometric phrase patterns for the system-defined chronometry. A phrase pattern may indicate an ordered sequence of one or more phrase parts. The phrase parts may be defined tokens or token types. The respective phrase parts in a phrase pattern may have corresponding positions in the sequence of the phrase pattern. A chronometric phrase pattern is a phrase pattern that includes one or more chronometric tokens or token types.

Generating the low-latency database analysis system at 4100 may include defining one or more chronometric transforms for the system-defined chronometry. For example, generating the low-latency database analysis system at 4100 may include generating a semantic interface unit of the low-latency database analysis system, such as the semantic interface unit 3600 shown in FIG. 3, which may include defining the chronometric transforms for the system-defined chronometry. A chronometric transform for the system-defined chronometry may generate chronometric criteria based on the resolved-request and the system-defined chronometry.

Data expressing a usage intent may be received at 4200. A system access interface unit of the low-latency database analysis system, such as the system access interface unit 3900 shown in FIG. 3, may receive data, such as user input data, including the data expressing the usage intent. The system access interface unit may send, or otherwise make available, the data expressing the usage intent, or a portion thereof, to a relational search unit of the low-latency database analysis system, such as the relational search unit 3700 shown in FIG. 3.

A resolved-request may be generated at 4300. The relational search unit may receive, or otherwise access, the data expressing the usage intent. The relational search unit may process, parse, identify semantics, tokenize, or a combination thereof, the request for data to generate a resolved-request, which may include identifying a database and visualization agnostic ordered sequence of tokens based on the data expressing the usage intent. In some implementations, the data expressing the usage intent obtained at 4200 may identify a previously resolved-request and obtaining the resolved-request at 4300 may include obtaining, such as by reading, or otherwise accessing, previously stored data representing the resolved-request.

Obtaining the resolved-request at 4300 may include identifying one or more chronometric phrases at 4310. Identifying the chronometric phrases may include traversing a finite state machine at 4312. Identifying the chronometric phrases may include identifying one or more chronometric tokens by traversing one or more system-defined indices, such as the system-defined ontological index, at 4314. The finite state machine may include criteria for identifying a transition based on chronometric types, chronometric unit names or descriptors, or a combination of chronometric types and chronometric descriptors.

For example, the data expressing the usage intent may include the string "precipitation last year" (request string). Obtaining the resolved-request at 4300 may include traversing the finite state machine at 4312 to identify one or more indices for identifying respective tokens corresponding to respective portions, such as words, of the request string, such as a 'precipitation' token, a 'last' token, and a 'year' token. The request string portion "precipitation" may be tokenized by traversing the ontological index, and a 'precipitation' column in a table in the distributed in-memory database of the low-latency database analysis system, such as the distributed in-memory database 3300, may be identified. The portion of the resolved-request corresponding to the request string portion "precipitation", the 'precipitation' token, and the 'precipitation' column, may be identified as indicating an aggregation, such as a summation, of the data from the 'precipitation' column in the table in the constituent data. The 'precipitation' token may be identified as a phrase. Data indicating the identified column and the identified aggregation may be included in the resolved-request. Traversing the finite state machine may include identifying the system-defined keyword index as a candidate index for tokenizing the request string portion "last". The system-defined token corresponding to the request string portion "last" may be identified by traversing the system-defined keyword index. The request string portion "last" may be identified as corresponding to a first part of a phrase, such as based on the chronometric phrase patterns defined at 4100. Traversing the finite state machine may include identifying the system-defined keyword index as a candidate index for tokenizing the request string portion "year". The system-defined token corresponding to the request string portion "year" may be identified by traversing the system-defined keyword index. A 'date' column may be identified from one or more candidate tables, such as the table identified for the 'precipitation' token, as corresponding to the request string portion "year", or the 'year' token. The token sequence 'last' followed by 'year' may be identified as a chronometric phrase, such as a phrase defined for the system-defined chronometry at 4110, such as based on the chronometric phrase patterns defined at 4100. Data indicating a chronometric filter, or condition, for the resolved-request, corresponding to the chronometric phrase and the respective 'date' column, may be included in the resolved-request. The chronometric filter, or condition, may be a chronometric filter defined at 4110. Chronometric filters, or conditions, other than the chronometric filter defined at 4110 may be unavailable.

In another example, the data expressing the usage intent may include the string "precipitation January" (request string). Obtaining the resolved-request at 4300 may include traversing the finite state machine at 4312 to identify one or more indices for identifying respective tokens corresponding to respective portions, such as words, of the request string, such as a 'precipitation' token and a 'January' token. The request string portion "precipitation" may be tokenized by traversing the ontological index, and a 'precipitation' column in a table in the distributed in-memory database of the low-latency database analysis system, such as the distributed in-memory database 3300, may be identified. The portion of the resolved-request corresponding to the request string portion "precipitation", the 'precipitation' token, and the 'precipitation' column, may be identified as indicating an aggregation, such as a summation, of the data from the 'precipitation' column in the table in the constituent data. The 'precipitation' token may be identified as a phrase. Data indicating the identified column and the identified aggregation may be included in the resolved-request. Traversing the finite state machine may include identifying a finite state machine transition, tokenizing, or both, the request string portion "January", such as based on the names or descriptors for chronometric units for the system-defined chronometry defined in the finite state machine as transition criteria. Traversing the system-defined keyword index may include filtering the system-defined keyword index based on one or more candidate edges in the current state of the finite state machine. In some implementations, tokenizing the request string portion "January" may omit traversing an index. The request string portion "January" may be identified as corresponding to a phrase, such as based on the chronometric phrase patterns defined at 4100. A 'date' column may be identified from one or more candidate tables, such as the table identified for the 'precipitation' token, as corresponding to the request string portion "January", or the 'January' token. Data indicating a chronometric filter for the system-defined chronometry, or condition, for the resolved-request, corresponding to the 'January' token and the respective 'date' column, may be included in the resolved-request. The chronometric filter, or condition, may be a chronometric filter defined at 4110. Chronometric filters, or conditions, other than the chronometric filter defined at 4110 may be unavailable.

In some implementations, obtaining the resolved-request at 4300 may include identifying one or more portions of the input string as unresolved (unresolved-request). For example, the data expressing the usage intent may include a string portion indicating a chronometric unit other than the chronometric units defined at 4100, which may be otherwise omitted from the indices of the low-latency database analysis system, that may be identified as unresolved. For example, the data expressing the usage intent may include the string "precipitation last decade", the system-defined ontological index may omit a token corresponding to the string "decade", and the string portion "decade" may be identified as unresolved. Obtaining data at 4400 may be omitted for an unresolved-request and outputting the response at 4500 may include outputting a response indicating the unresolved-request.

Results data may be obtained at 4400. The relational search unit may send, or otherwise make available, the resolved-request to a semantic interface of the low-latency database analysis system, such as the semantic interface unit 3600 shown in FIG. 3. The semantic interface may receive, or otherwise access, the resolved-request.

The semantic interface unit may process or transform the received resolved-request to generate one or more corresponding data-queries, at 4410, that are compatible with a distributed in-memory database of the low-latency database analysis system, such as the distributed in-memory database 3300. The semantic interface may determine that the resolved-request includes one or more chronometric filters and may generate chronometric criteria based on the resolved-request, the system-defined chronometry, or both, using one or more chronometric transforms.

For example, the resolved-request may include data indicating a chronometric filter, which may correspond to a chronometric phrase identified at 4310 based on a chronometric phrase pattern defined at 4100, and the semantic interface unit in accordance with a chronometric transform may generate chronometric criteria corresponding to the data indicating a chronometric filter, which may include determining, or otherwise obtaining, data indicating one or more temporal segments. For example, the resolved-request may include data indicating a chronometric filter corresponding to the phrase 'last year', and the semantic interface unit, in accordance with the chronometric transform corresponding to the phrase 'last year', may determine, or otherwise obtain, data representing a temporal segment corresponding to the year chronometric unit prior to a current year chronometric unit as described in the system-defined chronometry, which may be expressed as a range of epoch values from, such as equal to or greater than, a minimum epoch value corresponding to the first day chronometric unit of the first month chronometric unit, defined in the system-defined chronometry as the first of January, of the year chronometric unit immediately preceding the current year chronometric unit to, such as less than, a minimum epoch value corresponding to the first day chronometric unit of the first month chronometric unit, defined in the system-defined chronometry as the first of January, of the current year chronometric unit.

The semantic interface unit, such as in accordance with the chronometric transform corresponding to the phrase 'last year', may obtain, or otherwise access, one or more of the configurable chronometric ordinal offsets defined at 4120. For example, the semantic interface unit may determine whether a value of a configurable chronometric ordinal offset is available for the domain corresponding to the resolved-request. The semantic interface unit may determine that a value of the configurable chronometric ordinal offset is available for the domain corresponding to the resolved-request and may offset one or more of the chronometric criteria responsive to the value of the corresponding configurable chronometric ordinal offset.

For example, offsetting the chronometric criteria in accordance with the first-month-of-year configurable chronometric ordinal offset may include determining the range of epoch values for a temporal segment corresponding to a year chronometric unit by obtaining the value of the first-month-of-year configurable chronometric ordinal offset and determining a sum of an ordinal value of a first month chronometric unit of the year chronometric unit, as defined in the system-defined chronometry, and the value of the first-month-of-year configurable chronometric ordinal offset. For example, the ordinal value of a first month chronometric unit of the year chronometric unit defined in the system-defined chronometry may be zero (0), corresponding to the month chronometric unit January, the value of the first-month-of-year configurable chronometric ordinal offset may be one (1), indicating an offset of one month chronometric unit, indicating that the first month chronometric unit of the year chronometric unit for the corresponding domain is the second month chronometric unit, February.

For example, the resolved-request may include data indicating a chronometric filter corresponding to the phrase 'last year', a value of the first-month-of-year configurable chronometric ordinal offset may be unavailable for the domain corresponding to the data-query, or the semantic interface unit may obtain a value of zero (0), and the semantic interface unit, in accordance with the chronometric transform corresponding to the phrase 'last year', may determine, or otherwise obtain, the chronometric criteria including data representing a temporal segment corresponding to the year chronometric unit sequentially immediately preceding a current year chronometric unit as described in the system-defined chronometry, which may be expressed as a range of epoch values from, such as equal to or greater than, a minimum epoch value corresponding to the first day chronometric unit of the first month chronometric unit, defined in the system-defined chronometry as the first of January, of the year chronometric unit immediately preceding the current year chronometric unit to, such as less than, a minimum epoch value corresponding to the first day chronometric unit of the first month chronometric unit, defined in the system-defined chronometry as the first of January, of the current year chronometric unit.

In another example, the resolved-request may include data indicating a chronometric filter corresponding to the phrase 'last year', the semantic interface unit may obtain a value, such as one (1), of the first-month-of-year configurable chronometric ordinal offset for the domain corresponding to the data-query, and the semantic interface unit, in accordance with the chronometric transform corresponding to the phrase 'last year', may determine, or otherwise obtain, data representing the temporal segment corresponding to the year chronometric unit sequentially immediately preceding a current year chronometric unit as described in the chronometric offset in accordance with the value (1) of the first-month-of-year configurable chronometric ordinal offset, which may be expressed as a range of epoch values from, such as equal to or greater than, a minimum epoch value corresponding to the first day chronometric unit of the second month chronometric unit, defined in the system-defined chronometry as the first of February, of the year chronometric unit immediately preceding the current year chronometric unit (lower bound) to, such as less than, a minimum epoch value corresponding to the first day chronometric unit of the second month chronometric unit, defined in the system-defined chronometry as the first of February, of the current year chronometric unit (upper bound).

In some implementations, the data indicating the temporal segments may be omitted, and the semantic interface unit may include data compatible with the distributed in-memory database indicating the chronometric filter or condition in the data-query as the chronometric criteria. For example, the resolved-request may include data indicating a chronometric condition for the system-defined chronometry corresponding to the phrase 'month of year', the semantic interface unit may obtain a value, such as one (1), of the first-month-of-year configurable chronometric ordinal offset for the domain corresponding to the data-query, and the semantic interface unit, in accordance with the chronometric transform corresponding to the phrase 'month of year', may include data indicating the chronometric condition and the value of the first-month-of-year configurable chronometric ordinal offset as the chronometric criteria.

The semantic interface unit may send, or otherwise make available, the data-queries to the distributed in-memory database of the low-latency database analysis system, such as the distributed in-memory database 3300 shown in FIG. 3. The distributed in-memory database may receive, or otherwise access, the data-queries. The distributed in-memory database may execute or perform one or more queries to generate or obtain response data responsive to the data-query based on the low-latency data at 4420.

In some implementations, the data-query may include a chronometric criterion indicating a temporal segment and executing the corresponding queries may include obtaining the response data in accordance with the defined temporal segment. For example, the data-query may include a request for a summation of values from a 'precipitation' column from a table in the distributed in-memory database subject to a chronometric criterion indicating a temporal segment and indicating a corresponding 'date' column in the distributed in-memory database that includes temporal location values corresponding to respective values from the 'precipitation' column and executing the corresponding queries may include obtaining the response data in accordance with the defined temporal segment by aggregating values from the 'precipitation' column that correspond with epoch values from the corresponding 'date' column that are greater than or equal to the lower bound epoch value and are less than the upper bound epoch value.

In some implementations, the data-query may include a chronometric criterion indicating the chronometric filter or condition and executing the corresponding queries may include obtaining the response data in accordance with the chronometric filter or condition. For example, the distributed in-memory database may include one or more system-defined formulas, functions, or algorithms, defining the execution of respective chronometric filters or conditions. For example, the chronometric criterion may include an indication of the chronometric condition corresponding to the phase 'month of year', an indication of a data portion, such as a 'date' column of a table in the distributed in-memory database, including temporal location values corresponding to the chronometric condition, and the value of the first-month-of-year configurable chronometric ordinal offset, and the distributed in-memory database may include a system-defined formula, function, or algorithm, defining the execution of the chronometric conditions as including obtaining an offset, or domain specific, ordinal value by determining a result, remainder, or modulus, of the Euclidean division of a result of subtracting the value of the first-month-of-year configurable chronometric ordinal offset from a sum of the system-defined ordinal value and the cardinality (12) of the ordered contiguous sequence of month chronometric units of the year chronometric unit and a system-defined ordinal value (date ordinal) for the month chronometric unit corresponding to respective values from the 'date' column obtained by executing a system-defined 'month' formula, function, or algorithm, (the dividend), by the cardinality (12) of the ordered contiguous sequence of month chronometric units of the year chronometric unit (the divisor).

The semantic interface unit may send, or otherwise make available, the data-queries to the distributed in-memory database of the low-latency database analysis system, such as the distributed in-memory database 3300 shown in FIG. 3. The distributed in-memory database may receive, or otherwise access, the data-queries. The distributed in-memory database may execute or perform one or more queries to generate or obtain response data responsive to the data-query based on the low-latency data at 4420.

The distributed in-memory database may output, or otherwise make available, the results data, or a portion thereof, such as to the semantic interface unit. The semantic interface unit may receive, or otherwise access, the results data, or a portion thereof, and may output, or otherwise make available, the results data, or a portion thereof, such as to the relational search unit. The relational search unit may receive, or otherwise access, the results data, or a portion thereof, and may output, or otherwise make available, the results data, or a portion thereof, such as to the system access interface unit. The system access interface unit may receive, or otherwise access, the results data, or a portion thereof.

The system access interface unit may output a response including data representing the results data, or a portion thereof, at 4500. The system access interface unit may generate data for presenting a user interface, or one or more portions thereof, representing the results data. For example, the system access interface unit may generate instructions for rendering, or otherwise presenting, the user interface, or one or more portions thereof and may transmit, or otherwise make available, the instructions for rendering, or otherwise presenting, the user interface, or one or more portions thereof to the system access unit, for presentation to a user of a system access unit. For example, the results data may include an epoch value and outputting the response may include outputting data representing the epoch value in accordance with a chronometric data visualization for the system-defined chronometry at 4510, such as in accordance with the display attributes defined at 4110.

Figure 5:
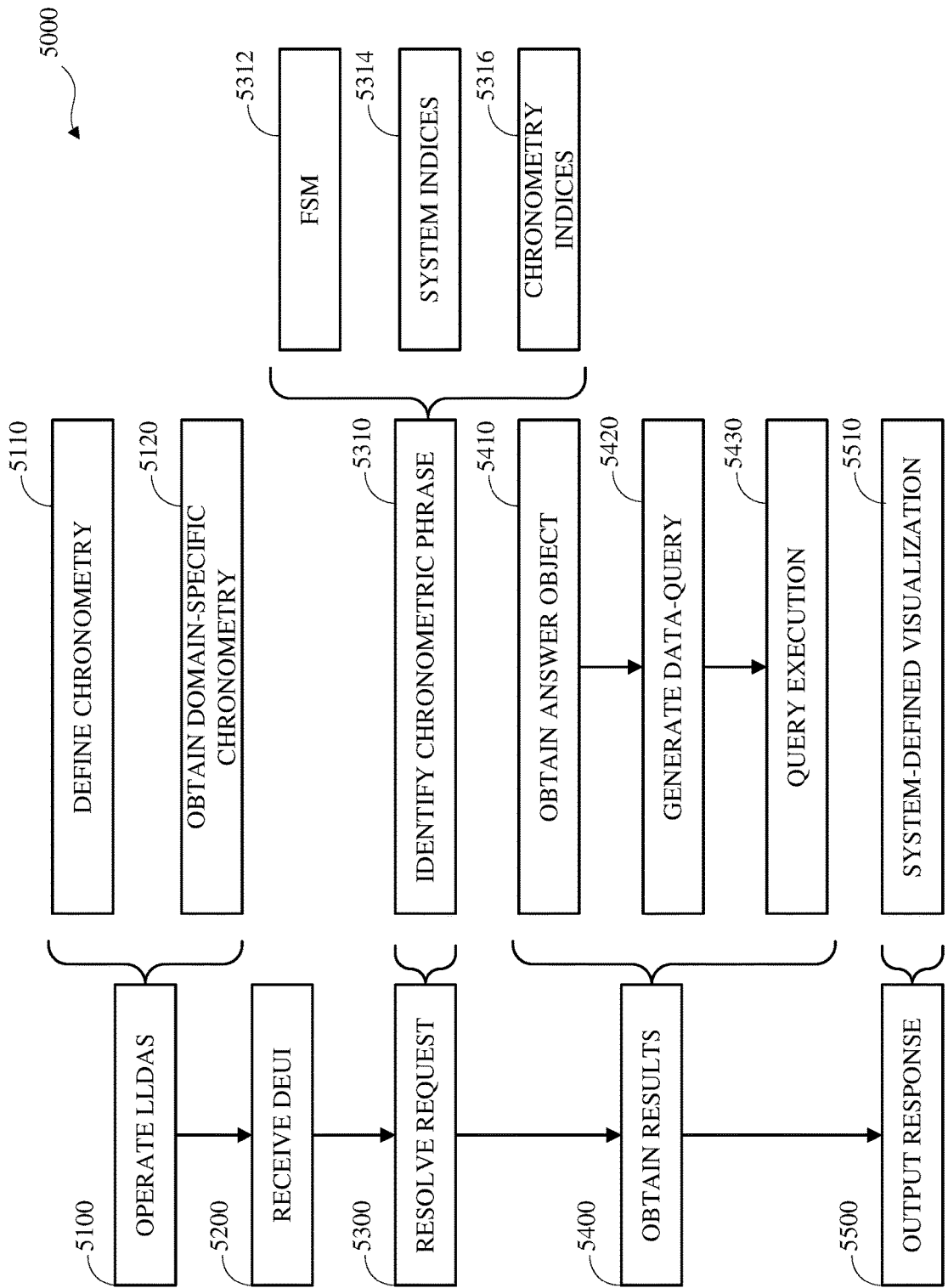
FIG. 5 is a flow diagram of a method of analytical data access with domain-specific chronometry in a low-latency database analysis system.

FIG. 5 is a flow diagram of a method of analytical data access with domain-specific chronometry 5000 in a low-latency database analysis system. Analytical data access with domain-specific chronometry 5000 may be implemented in one or more components of a low-latency database analysis system, such as the low-latency database analysis system 3000 shown in FIG. 3, such as in a distributed in-memory database, such as the distributed in-memory database 3300 shown in FIG. 3, a relational search unit, such as the relational search unit 3700 shown in FIG. 3, a natural language processing unit, such as the natural language processing unit 3710 shown in FIG. 3, and a system access interface unit, such as the system access interface unit 3900 shown in FIG. 3. Analytical data access with domain-specific chronometry 5000 may be similar to the analytical data access with system-defined chronometry 4000 shown in FIG. 4, except as described herein or otherwise clear from context.

Analytical data access with domain-specific chronometry 5000 includes operating the low-latency database analysis system (LLDAS) at 5100, receiving data expressing a usage intent (DEUI) at 5200, generating a resolved-request at 5300, obtaining response data at 5400, and outputting a response at 5500.

Operating the low-latency database analysis system at 5100 may include generating the low-latency database analysis system. Generating the low-latency database analysis system may include defining canonical chronometry (system-defined chronometry) for the low-latency database analysis system at 5110.

Although not shown separately in FIG. 5, generating the low-latency database analysis system may include defining, generating, operating, or a combination thereof, a finite state machine (FSM) for the low-latency database analysis system, such as the finite state machine implemented by the relational search unit 3700 shown in FIG. 3. Generating the finite state machine may omit including names or descriptors for chronometric units for the system-defined chronometry, such as day-of-week name, month-of-year name, quarter-of-year name, or year names as keywords in the finite state machine. Although not shown separately in FIG. 5, generating the low-latency database analysis system at 5100 may include defining one or more chronometric phrase patterns. For example, a chronometric phrase pattern may indicate a domain-specific chronometry.

Defining the canonical chronometry for the low-latency database analysis system at 5110 may be similar to defining system-defined chronometry as shown at 4110 in FIG. 4, except as described herein or otherwise clear from context. Defining the canonical chronometry may include generating a canonical chronometry dataset. Generating the canonical chronometry dataset may include generating, populating, or both, a chronometry table for the canonical chronometry, such as in the distributed in-memory database of the low-latency database analysis system.

The chronometry table for the canonical chronometry includes a date column for storing respective epoch values. For example, the canonical chronometry dataset may describe an era corresponding to a duration from a minimum temporal location to a maximum temporal location, and the chronometry table may include an epoch values corresponding the days from the minimum temporal location to the maximum temporal location. For example, the canonical chronometry may correspond with a Gregorian calendar, or a defined variant thereof. An epoch value in the chronometry table for the canonical chronometry may be unique within the chronometry table for the canonical chronometry.

The chronometry table for the canonical chronometry may include one or more chronometric data columns. A value of a chronometric data column may indicate chronometric data describing a respective corresponding epoch value. For example, the chronometry table for the canonical chronometry may include a 'Month' column and a value of the 'Month' column may indicate a name of a 'Month' chronometric unit corresponding to a respective epoch value. The chronometric data columns may be identified based on a defined set of chronometric data columns for the system-defined chronometry. An example of the chronometric data columns of the chronometry table for the canonical chronometry is shown in Table 1. Other system-defined columns may be used.

TABLE 1

| Column Name | Datatype |
| --- | --- |
| Date | Date |
| day_of_week | String |
| month | String |
| monthly | String |
| quarter | String |
| quarterly | String |
| year | String |
| day_number_of_week | Int64 |
| day_number_of_month | Int64 |
| day_number_of_quarter | Int64 |
| day_number_of_year | Int64 |
| week_number_of_month | Int64 |
| week_number_of_quarter | Int64 |
| week_number_of_year | Int64 |
| month_number_of_quarter | Int64 |
| month_number_of_year | Int64 |
| quarter_number_of_year | Int64 |
| absolute_week_number | Int64 |
| start_of_week_epoch | Date |
| end_of_week_epoch | Date |
| absolute_month_number | Int64 |
| start_of_month_epoch | Date |
| end_of_month_epoch | Date |
| absolute_quarter_number | Int64 |
| start_of_quarter_epoch | Date |
| end_of_quarter_epoch | Date |
| absolute_year_number | Int64 |
| start_of_year_epoch | Date |
| end_of_year_epoch | Date |
| is_weekend | Boolean |

Defining the canonical chronometry may include generating one or more chronometric objects for the canonical chronometry. For example, a chronometric object may be a chronometry table type object and may represent the chronometry table for the canonical chronometry. The chronometric objects may be included in a distributed in-memory ontology of the low-latency database analysis system, such as by a distributed in-memory ontology unit of the low-latency database analysis system, such as the distributed in-memory ontology unit 3500 shown in FIG. 3. One or more edges may be included in the distributed in-memory ontology representing relationships for the chronometric objects. For example, an edge in the distributed in-memory ontology may represent a relationship between a date column and the chronometric table. In some implementations, the distributed in-memory ontology may omit an edge representing a relationship between a date column and a chronometric table, and the domain-specific chronometry associated with the domain corresponding to the respective date column, which may be a sub-domain of the system-domain, such as an organization-domain, may be identified for the respective date column.

Generating the low-latency database analysis system at 5110 may include generating a token type representing chronometry. For example, the relational search unit of the low-latency database analysis system may generate data representing a chronometry token type. The relational search unit include the data representing a chronometry token type in one or more indexes, such as in the keyword index of the low-latency database analysis system. A unique identifier associated with the chronometry token type may be included in a data structure for interfacing with the relational search unit.

Although not shown separately in FIG. 5, generating the low-latency database analysis system may include generating one or more chronometry indices for indexing the canonical chronometry, or a portion thereof. The relational search unit may generate respective chronometry indices on a per-chronometric unit basis for one or more of the chronometric units defined by the canonical chronometry. For example, the relational search unit may generate a respective chronometry index for defined day-of-week descriptors or names for the instances of the day chronometric unit with respect to the ordered contiguous sequence of day chronometric units corresponding to, or within, an instance of a week chronometric unit of the canonical chronometry (canonical chronometry days index). In another example, the relational search unit may generate a respective chronometry index for defined month descriptors or names for the instances of the month chronometric unit with respect to the ordered contiguous sequence of month chronometric units corresponding to, or within, an instance of a year chronometric unit of the canonical chronometry (canonical chronometry months index). In another example, the relational search unit may generate a respective chronometry index for defined quarter descriptors or names for the instances of the quarter chronometric unit with respect to the ordered contiguous sequence of quarter chronometric units corresponding to, or within, an instance of a year chronometric unit of the canonical chronometry (canonical chronometry quarters index). In another example, the relational search unit may generate a respective chronometry index for defined year descriptors or names, such as 1999, 2000, or 2019, for the instances of the year chronometric unit with respect to the ordered contiguous sequence of year chronometric units corresponding to, or within, the era defined by the canonical chronometry (canonical chronometry years index). In some implementations, the canonical chronometry days index, the canonical chronometry months index, the canonical chronometry quarters index, and the canonical chronometry years index may be implemented as a combined canonical chronometry index.

The relational search unit may obtain a descriptor value for a chronometric unit from the domain-specific chronometry dataset. The chronometric unit may be associated with a chronometric unit type. The relational search unit may generate a chronometry index for indexing descriptor values for chronometric units from the domain-specific chronometry dataset associated with the chronometric unit type. The relational search unit may include the chronometry index for indexing descriptor values for chronometric units from the domain-specific chronometry dataset associated with the chronometric unit type in the chronometry index.

Although not shown separately in FIG. 5, operating the low-latency database analysis system at 5100, such as generating the low-latency database analysis system, may include defining one or more data-query chronometric operators. The data-query chronometric operator, or data-query chronometric operators, may be included as data-query chronometric operators in the distributed in-memory database of the low-latency database analysis system.

A data-query chronometric operator may obtain an indication of a chronometry, such as the system-defined chronometry or a domain-specific chronometry. The indication of the chronometry may be a unique identifier for a chronometry table corresponding to the chronometry. For example, a request indicating the data-query chronometric operator may include data identifying the chronometry. In some implementations, the data identifying the chronometry may include a unique identifier for a chronometry table corresponding to the chronometry and identification of a schema version. In some implementations, the data identifying the chronometry may include string data indicating a name or descriptor for the chronometry.

A data-query chronometric operator may obtain an indication of a chronometry column from the chronometry table, which may correspond with a respective chronometric unit described in the chronometry. The indication of the chronometry column from the chronometry table may be a unique identifier for the chronometry column from the chronometry table. For example, a request indicating the data-query chronometric operator may include data identifying the chronometry column.

A data-query chronometric operator may obtain an indication of a 'date' column of a table in the distributed in-memory database. The indication of the 'date' column of a table in the distributed in-memory database may be a unique identifier for the 'date' column of a table in the distributed in-memory database. For example, a request indicating the data-query chronometric operator may include data identifying the 'date' column of a table in the distributed in-memory database.

Although not shown separately in FIG. 5, operating the low-latency database analysis system at 5100, such as generating the low-latency database analysis system, may include defining one or more query-transformation chronometric operators. The query-transformation chronometric operator, or query-transformation chronometric operators, may be included as query-transformation chronometric operators in a semantic interface of the low-latency database analysis system, such as the semantic interface unit 3600 shown in FIG. 3.

Although not shown separately in FIG. 5, generating the low-latency database analysis system may include defining one or more chronometric transformations for generating a data-query, or data-queries, based on a resolved-request. For example, the chronometric transformation, or chronometric transformations, may be included in a semantic interface of the low-latency database analysis system, such as the semantic interface unit 3600 shown in FIG. 3.

The chronometric transformation, or chronometric transformations, may generate a portion of a data-query corresponding to a portion of a resolved-request that includes a chronometric phrase. For example, a chronometric transformation may identify a data-query chronometric operator corresponding to the respective chronometric phrase and may include data indicating the data-query chronometric operator in the data-query to express the portion of a resolved-request that includes a chronometric phrase, or a portion thereof. The chronometric transformation, or chronometric transformations, may include generating an expression tree, which may be distinct from the representation of the resolved-request. The expression tree may include one or more chronometric operators.

Although not shown separately in FIG. 5, generating the low-latency database analysis system may include generating and including an interface (or interfaces), such as an applications programming interface, a command-line interface, or both, for creating, accessing, modifying, deleting, or a combination thereof, a domain-specific chronometry. For example, the semantic interface unit may include an applications programming interface for creating, accessing, modifying, deleting, or a combination thereof, a domain-specific chronometry. One or more other components of the low-latency database analysis system, such as an enterprise data interface unit of the low-latency database analysis system, such as the enterprise data interface unit 3400 shown in FIG. 3, a system configuration unit of the low-latency database analysis system, such as the system configuration unit 3820 shown in FIG. 3, a user customization unit of the low-latency database analysis system, such as the user customization unit 3830 shown in FIG. 3, a system access interface unit of the low-latency database analysis system, such as the system access interface unit 3900 shown in FIG. 3, or a combination thereof may include one or more interfaces for creating, accessing, modifying, deleting, or a combination thereof, a domain-specific chronometry.

Although not shown separately in FIG. 5, generating the low-latency database analysis system may include generating and including one or more components of the low-latency database analysis system for managing a domain-specific chronometry, such as a component of the low-latency database analysis system for managing ontological data for domain-specific chronometry (chronometry-manager) and a component of the low-latency database analysis system for managing chronometric data of the domain-specific chronometry (chronometry-data-manager). One or more other components of the low-latency database analysis system may access or interface with the chronometry-manager, the chronometry-data-manager, or both.

Figure 6:
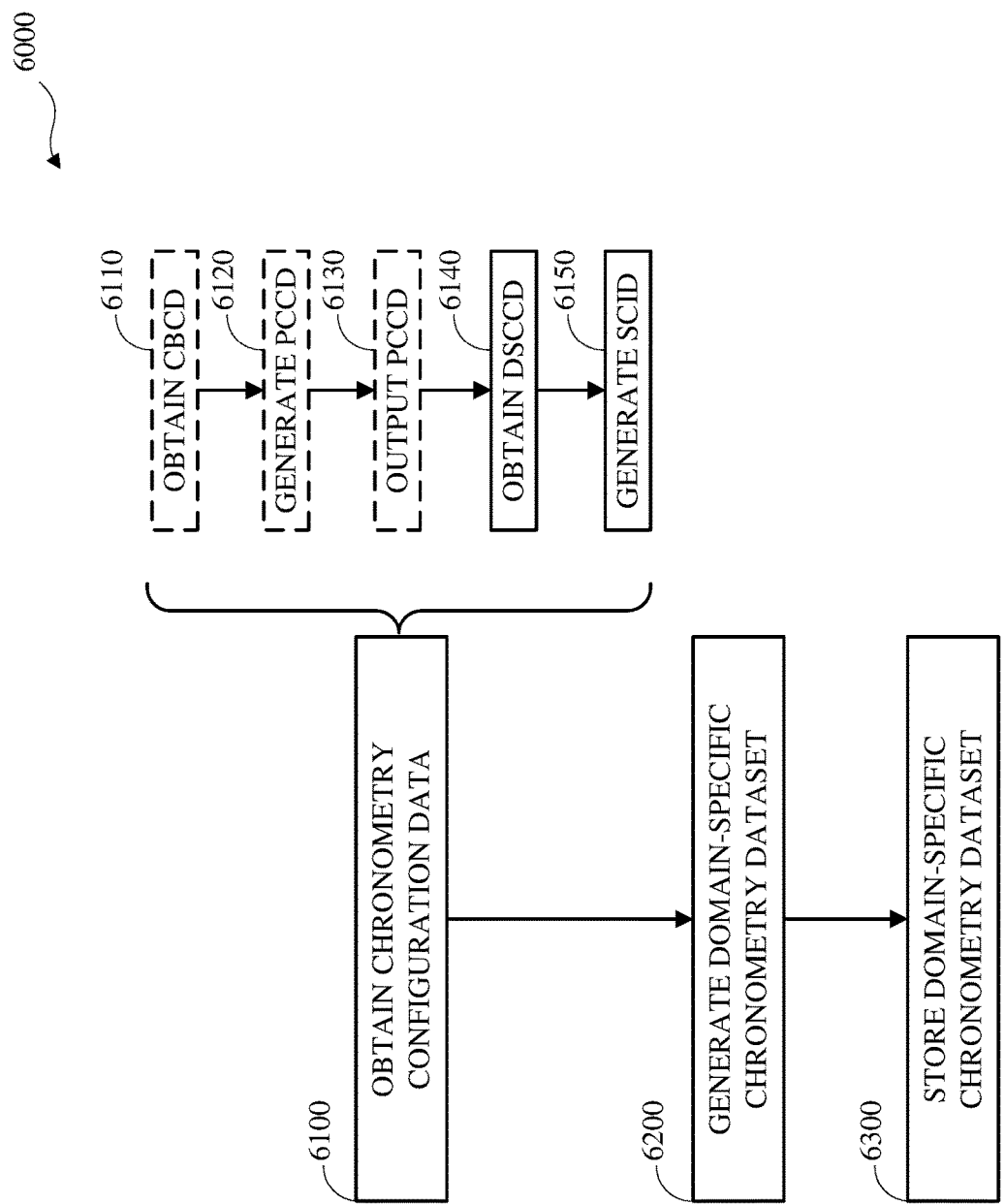
FIG. 6 is a flow diagram of a method of obtaining domain-specific chronometry in a low-latency database analysis system.

Operating the low-latency database analysis system at 5100 may include obtaining domain-specific chronometry at 5120. An example of obtaining domain-specific chronometry is shown in FIG. 6. As described in FIG. 6, obtaining the domain-specific chronometry at 5120 may include generating, or otherwise identifying, one or more chronometric objects, such as a table object, corresponding to the domain-specific chronometry, generating, or otherwise identifying, one or more chronometry indices corresponding to the domain-specific chronometry, modifying the finite state machine in accordance with the domain-specific chronometry, or a combination thereof. Although not shown separately in FIG. 5, operating the low-latency database analysis system at 5100 may include obtaining one or more previously generated domain-specific chronometry datasets.

Although not shown separately in FIG. 5, operating the low-latency database analysis system at 5100 may include generating, storing, or both, data identifying a primary chronometry for a respective domain. The primary chronometry may be identified as the canonical chronometry or a domain-specific chronometry.

Although not shown separately in FIG. 5, operating the low-latency database analysis system at 5100 may include generating, storing, or both, data associating a respective temporal data object, such as an object representing a date column in a table other than a chronometry table, with a respective chronometry, such as the canonical chronometry or a domain-specific chronometry. For example, the data associating the respective temporal data object with a respective chronometry may be identified in response to input, such as user input, indicating the association. Data, such as a Boolean flag or bit, identifying a data structure as representing chronometric data may be included in a data structure for interfacing with the distributed in-memory database.

Data expressing a usage intent (DEUI) may be received at 5200. A system access interface unit of the low-latency database analysis system, such as the system access interface unit 3900 shown in FIG. 3, may receive data, such as user input data, including the data expressing the usage intent. The system access interface unit may send, or otherwise make available, the data expressing the usage intent, or a portion thereof, to a relational search unit of the low-latency database analysis system, such as the relational search unit 3700 shown in FIG. 3. Receiving the data expressing the usage intent may be similar to receiving data expressing a usage intent as shown at 4200 in FIG. 4, except as described herein or otherwise clear from context. For example, the data expressing the usage intent received at 5200 may include data expressly indicating a chronometry, such as string data including the name or descriptor of the chronometry.

A resolved-request may be obtained at 5300. Obtaining the resolved-request may be similar to generating a resolved-request as described with respect to the relational search unit 3700 shown in FIG. 3, except as described herein or otherwise clear from context. The relational search unit may receive, or otherwise access, the data expressing the usage intent. The relational search unit may process, parse, identify semantics, tokenize, or a combination thereof, the request for data to generate a resolved-request, which may include identifying a database and visualization agnostic ordered sequence of tokens based on the data expressing the usage intent. In some implementations, the data expressing the usage intent obtained at 5200 may indicate a previously generated resolved-request and obtaining the resolved-request at 5300 may include obtaining, such as by reading, or otherwise accessing, previously stored data representing the previously generated resolved-request.

Obtaining the resolved-request at 5300 may include identifying one or more chronometric phrases at 5310. Identifying the chronometric phrase, or phrases, at 5310 may be similar to identifying one or more chronometric phrases as shown at 4310 in FIG. 4, except as described herein or otherwise clear from context. Identifying the chronometric phrases may include traversing the finite state machine at 5312. Identifying the chronometric phrases may include identifying one or more chronometric tokens by traversing one or more indices, such as system-defined indices at 5314 (system indices), chronometry indices at 5316, or a combination thereof. The chronometry indices at 5316 may include one or more chronometry indices for the canonical chronometry, one or more chronometry indices for the domain-specific chronometry, or one or more chronometry indices for the canonical chronometry and one or more chronometry indices for the domain-specific chronometry.

For example (Example 1), the data expressing the usage intent may include the string "precipitation last year" (request string). Obtaining the resolved-request at 5300 may include traversing the finite state machine at 5312 to identify one or more indices for identifying respective tokens corresponding to respective portions, such as words, of the request string, such as a 'precipitation' token, a 'last' token, and a 'year' token. For example, the finite state machine may identify the ontological index as an available index for tokenizing the request string portion "precipitation", the request string portion "precipitation" may be tokenized by traversing the ontological index, and a 'precipitation' column in a table in the distributed in-memory database of the low-latency database analysis system may be identified. The portion of the resolved-request corresponding to the request string portion "precipitation", the 'precipitation' token, and the 'precipitation' column, may be identified as indicating an aggregation, such as a summation, of the data from the 'precipitation' column in the table in the constituent data. The 'precipitation' token may be identified as a phrase (non-chronometric). Data indicating the identified column and the identified aggregation may be included in the resolved-request. The system-defined token corresponding to the request string portion "last" may be identified by traversing the system-defined keyword index. Traversing the finite state machine may include identifying the request string portion "last" as corresponding to a first part of a phrase, such as based on the chronometric phrase patterns defined at 5100. Traversing the finite state machine may include identifying the system-defined keyword index as a candidate index for tokenizing the request string portion "year". The system-defined token corresponding to the request string portion "year" may be identified by traversing the system-defined keyword index. The token sequence 'last' followed by 'year' may be identified as a chronometric phrase, such as a phrase defined for the system-defined chronometry at 5110, such as based on the chronometric phrase patterns defined at 5100. A 'date' column may be identified from one or more candidate tables, such as the table identified for the 'precipitation' token, as corresponding to the request string portion "year", or the 'year' token. Data indicating a chronometric filter, or condition, for the resolved-request, corresponding to the chronometric phrase and the respective 'date' column, may be included in the resolved-request. The chronometric filter, or condition, may be a chronometric filter defined at 5110. Chronometric filters, or conditions, other than the chronometric filter defined at 5110 may be unavailable.

Obtaining the resolved-request at 5300 may include identifying one or more chronometric tokens. For example (Example 2), a domain-specific chronometry may be obtained at 5120. The canonical chronometry may define a year chronometric unit and a month chronometric unit. The canonical chronometry may define respective descriptors for instances of the month chronometric unit with respect to an ordered contiguous sequence of month chronometric units corresponding to, or within, an instance of a year chronometric unit of the canonical chronometry, as "January", "February", "March", "April", "May", "June", "July", "August", "September", "October", "November", and "December". The domain-specific chronometry may define a 'month' chronometric unit and a 'year' chronometric unit. Although described using the word 'month' and the word 'year' for simplicity, the 'month' chronometric unit of the domain-specific chronometry and the 'year' chronometric unit of the domain-specific chronometry may differ from the month chronometric unit of the canonical chronometry and the year chronometric unit of the canonical chronometry respectively. The domain-specific chronometry may define descriptors for respective instances of the 'month' chronometric unit with respect to an ordered contiguous sequence of 'month' chronometric units corresponding to, or within, an instance of the 'year' chronometric unit of the domain-specific chronometry as "M1", "M2", "M3", "M4", "M5", "M6", "M7", "M8", "M9", "M10", "M11", and "M12". The data expressing the usage intent may include the string "precipitation M1" (request string). Obtaining the resolved-request at 5300 with respect to the request string portion "precipitation" in Example 2 may be similar to Example 1, and Example 2 may be otherwise similar to Example 1, except as described herein or otherwise clear from context. Traversing the finite state machine may include identifying one or more candidate chronometry token types. The candidate chronometry token types may include one or more chronometry token types corresponding to respective chronometric units defined in the chronometry data. Traversing the finite state machine may include identifying one or more chronometry indices as candidate indices for tokenizing the request string portion "M1". The chronometry indices identified as candidate indices may respectively correspond with the candidate chronometry token types. For example, the candidate chronometry token types may include a 'month' chronometry token type and the chronometry indices identified as candidate indices may include a 'month' chronometry index. One or more of the chronometry indices for the canonical chronometry may be included in the candidate indices. One or more of the chronometry indices for the domain-specific chronometry may be included in the candidate indices. A token corresponding to the request string portion "M1" may be identified by traversing a 'month' chronometry index for the domain-specific chronometry. The token 'M1' may be identified as a chronometric phrase. A 'date' column may be identified from one or more candidate tables, such as the table identified for the 'precipitation' token, as corresponding to the request string portion "M1", or the 'M1' token. Data indicating a chronometric filter, or condition, for the resolved-request, corresponding to the chronometric phrase and the respective 'date' column, may be included in the resolved-request. The data indicating a chronometric filter may include data identifying, such as a unique identifier, the domain-specific chronometry.

Obtaining the resolved-request at 5300 may include identifying a chronometry dataset for the resolved-request. For example (Example 3), a domain-specific chronometry having the name or descriptor "Meteorological" may be obtained at 5120. The data expressing the usage intent may include the string "precipitation last year Meteorological" (request string). Obtaining the resolved-request at 5300 with respect to the request string portions "precipitation", "last", and "year" in Example 3 may be similar to Example 1, and Example 3 may be otherwise similar to Example 1, except as described herein or otherwise clear from context. Traversing the finite state machine may include identifying an index of chronometry, which may include the names or descriptors of respective domain-specific chronometry datasets, for tokenizing the request string portion "Meteorological". The domain-specific chronometry having the name or descriptor "Meteorological" may be identified as the chronometry for the resolved-request. Data indicating a chronometric filter, or condition, for the resolved-request, corresponding to the chronometric phrase, the respective 'date' column, and the domain-specific chronometry, may be included in the resolved-request.

The resolved-request may include data indicating, such as identifying, one or more objects in the low-latency database analysis system, such as one or more columns, one or more tables, one or more join paths for joining respective tables, one or more filters, or a combination thereof.

Although not shown separately in FIG. 5, obtaining the resolved-request at 5300 may include ambiguity resolution, such as token ambiguity resolution, phrase ambiguity resolution, request ambiguity resolution, or a combination thereof. Ambiguity resolution may include identifying a candidate ambiguity resolution token, or candidate ambiguity resolution tokens, for the data expressing the usage intent. In some implementations, a candidate ambiguity resolution token having a maximal probabilistic utility may be identified as a resolved token of the resolved-request. Data representing a candidate ambiguity resolution token, or candidate ambiguity resolution tokens, may be included in the response output at 5500.

Token ambiguity resolution, which may be referred to as automatic token completion or automatic token suggestion, may include identifying one or more candidate token resolution tokens. A candidate token resolution token may be a token identified as corresponding to a portion of a request string for the data expressing the usage intent, wherein the value, such as string value, of the candidate token resolution token differs from the respective portion of the request string. The data expressing the usage intent omits data corresponding to the candidate token resolution token, or tokens, such as data expressly indicating the candidate token resolution token. The relational search unit may identify a candidate token resolution token, or tokens, in response to identifying a request string portion from the data expressing the usage intent as ambiguous. Token ambiguity resolution may include traversing the finite state machine to identify one or more candidate token resolution tokens. The candidate token resolution tokens may include chronometric tokens, corresponding to chronometric objects represented in the low-latency database analysis system. The candidate token resolution tokens may be identified, sorted, ordered, ranked, weighted, or filtered based on probabilistic utility. Generating the resolved-request may include determining that the request string, or the data expressing the usage intent, omits request string data corresponding to a portion of a candidate token resolution token. Token ambiguity resolution may be chronometry dataset specific. Obtaining the resolved-request at 5100 may include obtaining a probable, such as identified based on probabilistic utility, chronometric object, such as corresponding to a candidate token resolution token, by traversing the finite state machine. The finite state machine may represent an identified chronometry dataset. Data representing a defined cardinality of the candidate token resolution tokens, such as five, which may be in probabilistic utility order, may be included in the response data output at 5500. Data representing probable chronometric object may be included in the response data output at 5500.

An example (Example 4), of token ambiguity resolution may be similar to Example 3, except as described herein or otherwise clear from context. A domain-specific chronometry having the name or descriptor "Meteorological" may be obtained at 5120. The domain-specific chronometry may define descriptors for respective instances of the 'month' chronometric unit with respect to an ordered contiguous sequence of 'month' chronometric units corresponding to, or within, an instance of the 'year' chronometric unit of the domain-specific chronometry as "M1", "M2", "M3", "M4", "M5", "M6", "M7", "M8", "M9", "M10", "M11", and "M12". The data expressing the usage intent may include the string "precipitation M" (request string). Request string data subsequent to "precipitation M" may be omitted from the data expressing the usage intent. Obtaining the resolved-request at 5300 with respect to the request string portion "precipitation" in Example 4 may be similar to Example 3. Ontological object data corresponding to a "precipitation" token may indicate that a "precipitation" column corresponding to the "precipitation" token is associated with the domain-specific chronometry having the name or descriptor "Meteorological", which may be identified as a chronometry for the resolved-request. The request string portion "M" may be identified as ambiguous. A keyword token corresponding to the 'month' chronometric unit may be identified as a candidate token resolution token corresponding to the request string portion "M". Respective tokens corresponding to the respective 'month' chronometric units from the ordered contiguous sequence of 'month' chronometric units defined by the "Meteorological" domain-specific chronometry may be identified as candidate token resolution tokens. Generating the resolved-request may omit identifying tokens from chronometry datasets other than the chronometry dataset, or datasets, identified for the resolved-request. For example, the canonical chronometry may define respective descriptors for instances of the month chronometric unit, which may include "March" and "May". The resolved-request may omit a token associated with the canonical chronometry, and token ambiguity resolution for the request string portion "M" may omit identifying "March" and "May".

Phrase ambiguity resolution, or automatic phrase completion, may include identifying one or more candidate phrase completion tokens. A candidate phrase completion token may be a token other than previously resolved tokens for the resolved-request, the tokens identified as corresponding to a portion of the request string, or both. The data expressing the usage intent omits data corresponding to the candidate phrase completion tokens, such as data expressly indicating the candidate phrase completion tokens. The relational search unit may identify a candidate phrase completion token, or tokens, in response to identifying a token, corresponding to a request string portion from the data expressing the usage intent as corresponding to a phrase part, wherein the phrase pattern corresponding to the phrase includes a subsequent phrase part, or phrase parts, and determining that the request string omits request string data, subsequent to the request string portion corresponding to the phrase part, corresponding to the subsequent phrase part, or phrase parts. Phrase ambiguity resolution may include traversing the finite state machine to identify one or more candidate phrase completion tokens. The candidate phrase completion tokens may include chronometric tokens, corresponding to chronometric objects represented in the low-latency database analysis system. The candidate phrase completion tokens may be identified, sorted, ordered, ranked, weighted, or filtered based on probabilistic utility. Generating the resolved-request may include determining that the request string, or the data expressing the usage intent, omits request string data corresponding to a subsequent phrase part, or respective subsequent phrase parts, indicated by the candidate phrase pattern, or patterns, or that omits request string data corresponding to a subsequent phrase part, or respective subsequent phrase parts, indicated by the candidate phrase pattern, or patterns is otherwise unavailable. Obtaining the resolved-request at 5100 may include obtaining a probable, such as identified based on probabilistic utility, chronometric object, such as corresponding to a candidate phrase completion token, by traversing the finite state machine. Data representing a defined cardinality of the candidate phrase completion tokens, such as five, which may be in probabilistic utility order, may be included in the response data output at 5500. Data representing probable chronometric object may be included in the response data output at 5500. Phrase ambiguity resolution may be chronometry dataset agnostic.

For example, the data expressing the usage intent may include the string "precipitation last" (request string). Request string data subsequent to "precipitation last" may be omitted from the data expressing the usage intent. Traversing the finite state machine may include identifying the request string portion "last" as corresponding to a first part of one or more candidate phrases, such as based on the chronometric phrase patterns defined at 5100. For example, a chronometric phrase pattern may indicate a sequence of a chronometric keyword token, such as "last", followed by a chronometric unit token type. Generating the resolved-request may include identifying one or more tokens in accordance with the subsequent phrase part, or respective subsequent phrase parts, indicated by the candidate phrase pattern, or patterns as candidate phrase completion tokens. For example, the finite state machine may include a candidate transition, or respective candidate transitions, from a state corresponding to the request string portion "last" to the token, or respective tokens, and the candidate phrase completion tokens may be identified in accordance with the identified candidate transitions. Generating the resolved-request may include identifying a chronometric token, or tokens, corresponding to the chronometric unit token type as a candidate phrase completion token, or respective a candidate phrase completion tokens, such as an "hour" token, a "day" token, a "month" token, a "quarter" token, or a "year" token. The probabilistic utility for the "year" token may be identified as the maximal probity candidate phrase completion token and the request may be resolved as corresponding to a request for data indicating precipitation for last year.

Request ambiguity resolution may include identifying one or more candidate resolved-requests. A candidate resolved-requests may be a previously generated, or previously resolved, resolved-request. The data expressing the usage intent omits data corresponding to at least a portion of the candidate resolved-request, such as data expressly indicating the candidate resolved-request. The relational search unit may identify a candidate resolved-request, or candidate resolved-requests, in response to identifying a token, or a sequence of tokens, corresponding to a request string portion, or respective request string portions in sequence, from the data expressing the usage intent, as corresponding to a portion of a candidate resolved-request (referred to herein as a resolved portion of the resolved-request), wherein the candidate resolved-request includes a subsequent portion, and determining that the request string omits request string data, subsequent to the request string portion corresponding to the resolved portion of the resolved-request, corresponding to the subsequent portion of the candidate resolved request. Request ambiguity resolution may include traversing the finite state machine to identify one or more candidate resolved-requests. The resolved-requests may be identified, sorted, ordered, ranked, weighted, or filtered based on probabilistic utility. Data representing a defined cardinality of the candidate resolved-requests, such as five, which may be in probabilistic utility order, may be included in the response data output at 5500. Request ambiguity resolution may be chronometry dataset agnostic. A candidate resolved-request may be chronometry dataset specific.

Results data may be obtained at 5400. The relational search unit may send, or otherwise make available, the resolved-request to a semantic interface of the low-latency database analysis system, such as the semantic interface unit 3600 shown in FIG. 3. The semantic interface may receive, or otherwise access, the resolved-request. Obtaining the results data at 5400 may be similar to obtaining results data at 4400 as shown in FIG. 4, except as described herein or otherwise clear from context.

An answer object is obtained at 5410. For example, the semantic interface unit may process or transform the received resolved-request to obtain the answer object. In some implementations, the resolved-request, or the data expressing the usage intent obtained at 5200, may identify a previously generated answer object and obtaining the answer object may include obtaining data representing the answer object, such as from the distributed in-memory ontology unit. In some implementations, obtaining the answer object may include generating the answer object, such as based on the resolved-request.

The answer object may include a definition or description of the ontological structure of response data for responding to the resolved-request. The ontological structure of the results data responsive to the resolved-request may include one or more ontological elements, which may describe respective portions of the results data responsive to the resolved-request. The ontological structure of the response data may differ from the structure or organization of a visualization output responsive to the resolved-request. The answer object may be a data structure, which may be hierarchical. A respective portion, or node, of the answer object may include a definition or description of an ontological element of the answer object which may represent a distinct structural portion of the results data responsive to the resolved-request. For example, the results data may be organized as a tabular data structure and an ontological element of the answer object may correspond with a respective column of the results data.

The ontological structure of the results data responsive to the resolved-request may include one or more display-data ontological elements for including data that may be included for display in a visualization.

The ontological structure of the results data responsive to the resolved-request may include one or more control-data (hidden or non-display) ontological elements, such as a minimal temporal location (min) for a temporal interval corresponding to a respective chronometric ontological element, which may be expressed as an epoch value, a maximal temporal location (max) for the temporal interval corresponding to the respective chronometric ontological element, which may be expressed as an epoch value, or both. In some implementations, the maximal temporal location may be the minimal temporal location immediately temporally subsequent to the temporal interval such that a temporal location (X) in the temporal interval may be expressed as min <=X<max.

The data for the control-data ontological elements may include respective deterministic, or contextually-unique, identifiers to indicate respective associations between the control-data ontological elements and chronometric display-data ontological elements. The deterministic identifier for a control-data ontological element may be generated based on the identifier for the corresponding chronometric display-data ontological element.

For example, the resolved-request may represent the request string "precipitation last year", which may be a request for precipitation values aggregated for a 'year' chronometric unit immediately preceding a current 'year' chronometric unit. The resolved-request may include data representing a measure token, such as the 'precipitation' token, which may include a unique identifier for a data source, such as a column, such as the 'precipitation' column, in the distributed in-memory database, and data indicating an aggregation, such as a summation, for the measure token. The resolved-request may include data representing a chronometric filter, such as a 'LAST_YEAR' filter, which may include a unique identifier for a data source, such as a date column, corresponding to the 'last year' phrase from the request string (date source identifier). The ontological structure of the results data responsive to the resolved-request may include one or more display-data ontological elements, such as a 'precipitation' results ontological element for including aggregated precipitation values.

In another example, the resolved-request may represent the request string "precipitation yearly meteorological", which may be a request for precipitation values aggregated on a yearly, or per-year, basis with respect to a meteorological domain-specific chronometry. The resolved-request may include data representing a measure token, such as the 'precipitation' token, which may include a unique identifier for a data source, such as a column, such as the 'precipitation' column, in the distributed in-memory database, and data indicating an aggregation, such as a summation, for the measure token. The resolved-request may include data representing a key-word token, such as the 'yearly' token, which may include a unique identifier for a data source, such as a date column, corresponding to the 'yearly' token. The resolved-request may include data representing the meteorological domain-specific chronometry. The ontological structure of the results data responsive to the resolved-request may include one or more display-data ontological elements, such as a 'precipitation' results ontological element for including aggregated precipitation values, and a 'yearly' results chronometric ontological element for including data representing respective descriptors for year-wise date values. The ontological structure of the results data responsive to the resolved-request may include one or more control-data ontological elements, such as a minimal temporal location (min) for a temporal interval corresponding to the 'yearly' results ontological element and a maximal temporal location (max) for the temporal interval corresponding to the 'yearly' results ontological element.

The answer object may include a definition or description of one or more visualizations for responding to the resolved-request. For example, the definition or description of the visualization, or visualizations, may include axis labels, visualization type data, color data, presentation format data, or other visualization description data.

The answer object may include a definition or description of one or more headline data elements for responding to the resolved-request. The headline data elements may include data describing the response data, such as a cardinality of the set of response data.

Generating the answer object may include storing the answer object, such as by sending, transmitting, or otherwise making available, the data representing the answer object to the distributed in-memory ontology unit.

The semantic interface unit may generate one or more corresponding data-queries at 5420, that are compatible with a distributed in-memory database of the low-latency database analysis system, such as the distributed in-memory database 3300. For example, the relational search unit may generate the data-query, or data-queries based on the answer object obtained at 5410. Generating a data-query, or data-queries, at 5420 may be similar to generating one or more data-queries at 4410 as shown in FIG. 4, except as described herein or otherwise clear from context.

Generating a data-query, or data-queries, at 5420 may include generating a proto-query based on the resolved-request. A proto-query, which may be database agnostic, may be structured or formatted in a form, language, or protocol that differs from the defined structured query language of the distributed in-memory database 3300.

Generating the proto-query may include generating one or more proto-query expressions including one or more query-transformation chronometric operators corresponding to respective portions of the answer object. For example, the definition or description of an ontological element of the answer object may include data for generating a proto-query, or a portion thereof, to obtain results data for the respective ontological element of the answer object. Generating the proto-query may include generating an expression for obtaining results data for the ontological element of the answer object, or a portion thereof. For example, the ontological element of the answer object may include data describing a filter for the results data and generating the proto-query may include generating an expression for filtering results data in accordance with the data describing the filter for the results data from the answer object.

The expressions may include expressions for 'last_period' type filters, which may indicate filtering the results to omit data other than data corresponding a temporal interval immediately preceding a current temporal interval.

For example, the answer object may include data describing a 'last year' filter. The semantic interface unit may identify the 'last year' filter and may generate a corresponding 'last year' expression including the query-transformation chronometric operator, which may express the 'last year' filter wherein a representative value, such as a 'year' ordinal value, of the chronometric 'date' column may be expressed using the query-transformation chronometric operator with reference to the chronometric 'date' column and a chronometric column identifier, such as 'absolute_year_number' as shown in Table 1, the chronometric filter criteria may be expressed as the difference between a representative value, such as a 'year' ordinal value, of the current date, which may be expressed using the query-transformation chronometric operator with reference to the current date and the chronometric column identifier, and the constant one (1), such that data corresponding to a respective value of the chronometric 'date' column is included in the results data if the representative value of the chronometric 'date' column is equivalent to the difference.

In another example, the answer object may include data describing a 'last quarter' filter. The semantic interface unit may identify the 'last quarter' filter and may generate a corresponding 'last quarter' expression including the query-transformation chronometric operator, which may express the 'last quarter' filter wherein a representative value, such as a 'quarter' ordinal value, of the chronometric 'date' column may be expressed using the query-transformation chronometric operator with reference to the chronometric 'date' column and a chronometric column identifier, such as 'absolute_quarter_number' as shown in Table 1, the chronometric filter criteria may be expressed as the difference between the representative value, such as a 'year' ordinal value, of the current date, which may be expressed using the query-transformation chronometric operator with reference to the current date and the chronometric column identifier, and the constant one (1), such that data corresponding to a respective value of the chronometric 'date' column is included in the results data if the representative value of the chronometric 'date' column is equivalent to the difference.

In another example, the answer object may include data describing a 'last month' filter. The semantic interface unit may identify the 'last month' filter and may generate a corresponding 'last month' expression including the query-transformation chronometric operator, which may express the 'last month' filter wherein a representative value, such as a 'month' ordinal value, of the chronometric 'date' column may be expressed using the query-transformation chronometric operator with reference to the chronometric 'date' column and a chronometric column identifier, such as 'absolute_month_number' as shown in Table 1, the chronometric filter criteria may be expressed as the difference between the representative value, such as a 'year' ordinal value, of the current date, which may be expressed using the query-transformation chronometric operator with reference to the current date and the chronometric column identifier, and the constant one (1), such that data corresponding to a respective value of the chronometric 'date' column is included in the results data if the representative value of the chronometric 'date' column is equivalent to the difference.

In another example, the semantic interface unit may identify the 'last week' filter and may generate a corresponding 'last week' expression including the query-transformation chronometric operator, which may express the 'last week' filter wherein a representative value, such as a 'week' ordinal value, of the chronometric 'date' column may be expressed using the query-transformation chronometric operator with reference to the chronometric 'date' column and a chronometric column identifier, such as 'absolute_week_number' as shown in Table 1, the chronometric filter criteria may be expressed as the difference between the representative value, such as a 'year' ordinal value, of the current date, which may be expressed using the query-transformation chronometric operator with reference to the current date and the chronometric column identifier, and the constant one (1), such that data corresponding to a respective value of the chronometric 'date' column is included in the results data if the value of the representative chronometric 'date' column is equivalent to the difference.

The expressions may include expressions for 'last_N_period' type filters, which may indicate filtering the results to omit data other than data corresponding a specified cardinality (N) of temporal intervals immediately preceding a current temporal interval.

For example, the answer object may include data describing a 'last 3 years' filter. The semantic interface unit may identify the 'last 3 years' filter and may generate a corresponding 'last N years' expression including the query-transformation chronometric operator, which may express the 'last 3 years' filter wherein a representative value, such as a 'year' ordinal value, of the chronometric 'date' column may be expressed using the query-transformation chronometric operator with reference to the chronometric 'date' column and a chronometric column identifier, such as 'absolute_year_number' as shown in Table 1, such that data corresponding to a respective value of the chronometric 'date' column is included in the results data if a difference between a representative value, such as a 'year' ordinal value, of the current date, which may be expressed using the query-transformation chronometric operator with reference to the current date and the chronometric column identifier, and the specified cardinality (3), is at within, such as less than or equal to, the representative value of the chronometric 'date' column and the representative value of the chronometric 'date' column is less than the representative value of the current date.

In another example, the answer object may include data describing a 'last 3 quarters' filter. The semantic interface unit may identify the 'last 3 quarters' filter and may generate a corresponding 'last 3 quarters' expression including the query-transformation chronometric operator, which may express the 'last 3 quarters' filter wherein a representative value, such as a 'quarter' ordinal value, of the chronometric 'date' column may be expressed using the query-transformation chronometric operator with reference to the chronometric 'date' column and a chronometric column identifier, such as 'absolute_quarter_number' as shown in Table 1, such that data corresponding to a respective value of the chronometric 'date' column is included in the results data if a difference between a representative value, such as a 'quarter' ordinal value, of the current date, which may be expressed using the query-transformation chronometric operator with reference to the current date and the chronometric column identifier, and the specified cardinality (3), is at within, such as less than or equal to, the representative value of the chronometric 'date' column and the representative value of the chronometric 'date' column is less than the representative value of the current date.

In another example, the answer object may include data describing a 'last 3 months' filter. The semantic interface unit may identify the 'last 3 months' filter and may generate a corresponding 'last 3 months' expression including the query-transformation chronometric operator, which may express the 'last 3 months' filter wherein a representative value, such as a 'month' ordinal value, of the chronometric 'date' column may be expressed using the query-transformation chronometric operator with reference to the chronometric 'date' column and a chronometric column identifier, such as 'absolute_month_number' as shown in Table 1, such that data corresponding to a respective value of the chronometric 'date' column is included in the results data if a difference between a representative value, such as a 'month' ordinal value, of the current date, which may be expressed using the query-transformation chronometric operator with reference to the current date and the chronometric column identifier, and the specified cardinality (3), is at within, such as less than or equal to, the representative value of the chronometric 'date' column and the representative value of the chronometric 'date' column is less than the representative value of the current date.

In another example, the answer object may include data describing a 'last 3 weeks' filter. The semantic interface unit may identify the 'last 3 weeks' filter and may generate a corresponding 'last 3 weeks' expression including the query-transformation chronometric operator, which may express the 'last 3 weeks' filter wherein a representative value, such as a 'week' ordinal value, of the chronometric 'date' column may be expressed using the query-transformation chronometric operator with reference to the chronometric 'date' column and a chronometric column identifier, such as 'absolute_week_number' as shown in Table 1, such that data corresponding to a respective value of the chronometric 'date' column is included in the results data if a difference between a representative value, such as a 'week' ordinal value, of the current date, which may be expressed using the query-transformation chronometric operator with reference to the current date and the chronometric column identifier, and the specified cardinality (3), is at within, such as less than or equal to, the representative value of the chronometric 'date' column and the representative value of the chronometric 'date' column is less than the representative value of the current date.

The expressions may include expressions for 'period_to_date' type filters, which may indicate filtering the results to omit data other than data corresponding a current temporal interval.

For example, the answer object may include data describing a 'year_to_date' filter. The semantic interface unit may identify the 'year_to_date' filter and may generate a corresponding 'year_to_date' expression including the query-transformation chronometric operator, which may express the 'year_to_date' filter wherein a representative value, such as a 'year' ordinal value, of the chronometric 'date' column may be expressed using the query-transformation chronometric operator with reference to the chronometric 'date' column and a chronometric column identifier, such as 'absolute_year_number' as shown in Table 1, such that data corresponding to a respective value of the chronometric 'date' column is included in the results data if the respective value of the chronometric 'date' column is within, such as less than or equal to, the current date, and the representative value of the chronometric 'date' column is equivalent to the representative value, such as a 'year' ordinal value, of the current date, which may be expressed using the query-transformation chronometric operator with reference to the current date and the chronometric column identifier.

In another example, the answer object may include data describing a 'quarter_to_date' filter. The semantic interface unit may identify the 'quarter_to_date' filter and may generate a corresponding 'quarter_to_date' expression including the query-transformation chronometric operator, which may express the 'quarter_to_date' filter wherein a representative value, such as a 'quarter' ordinal value, of the chronometric 'date' column may be expressed using the query-transformation chronometric operator with reference to the chronometric 'date' column and a chronometric column identifier, such as 'absolute_quarter_number' as shown in Table 1, such that data corresponding to a respective value of the chronometric 'date' column is included in the results data if the respective value of the chronometric 'date' column is within, such as less than or equal to, the current date, and the representative value of the chronometric 'date' column is equivalent to the representative value, such as a 'quarter' ordinal value, of the current date, which may be expressed using the query-transformation chronometric operator with reference to the current date and the chronometric column identifier.

In another example, the answer object may include data describing a 'month_to_date' filter. The semantic interface unit may identify the 'month_to_date' filter and may generate a corresponding 'month_to_date' expression including the query-transformation chronometric operator, which may express the 'month_to_date' filter wherein a representative value, such as a 'month' ordinal value, of the chronometric 'date' column may be expressed using the query-transformation chronometric operator with reference to the chronometric 'date' column and a chronometric column identifier, such as 'absolute_month_number' as shown in Table 1, such that data corresponding to a respective value of the chronometric 'date' column is included in the results data if the respective value of the chronometric 'date' column is within, such as less than or equal to, the current date, and the representative value of the chronometric 'date' column is equivalent to the representative value, such as a 'month' ordinal value, of the current date, which may be expressed using the query-transformation chronometric operator with reference to the current date and the chronometric column identifier.

In another example, the answer object may include data describing a 'week_to_date' filter. The semantic interface unit may identify the 'week_to_date' filter and may generate a corresponding 'week_to_date' expression including the query-transformation chronometric operator, which may express the 'week_to_date' filter wherein a representative value, such as a 'week' ordinal value, of the chronometric 'date' column may be expressed using the query-transformation chronometric operator with reference to the chronometric 'date' column and a chronometric column identifier, such as 'absolute_week_number' as shown in Table 1, such that data corresponding to a respective value of the chronometric 'date' column is included in the results data if the respective value of the chronometric 'date' column is within, such as less than or equal to, the current date, and the representative value of the chronometric 'date' column is equivalent to the representative value, such as a 'week' ordinal value, of the current date, which may be expressed using the query-transformation chronometric operator with reference to the current date and the chronometric column identifier.

The expressions may include expressions for a 'specified year' type filter, which may indicate filtering the results to omit data other than data corresponding a temporal interval corresponding to a specified 'year' chronometric unit, wherein the value of the specified 'year' chronometric unit is expressed as an ordinal 'year' value. For example, the answer object may include data describing a 'specified year' filter. The semantic interface unit may identify the 'specified year' filter and may generate a corresponding 'specified year' expression including the query-transformation chronometric operator, which may express the 'specified year' filter wherein a representative value, such as a 'year' ordinal value, of the chronometric 'date' column may be expressed using the query-transformation chronometric operator with reference to the chronometric 'date' column and a chronometric column identifier, such as 'absolute_year_number' as shown in Table 1, such that data corresponding to a respective value of the chronometric 'date' column is included in the results data if the respective value of the chronometric 'date' column is equivalent to the specified a 'year' ordinal value.

The expressions may include expressions for a 'specified quarter' type filter, which may indicate filtering the results to omit data other than data corresponding a temporal interval corresponding to a specified 'quarter' chronometric unit with respect to a specified 'year' chronometric unit, wherein the specified 'quarter' chronometric unit is expressed as a descriptor of the 'quarter' chronometric unit and the specified 'year' chronometric unit is expressed as a descriptor of the 'year' chronometric unit. For example, the answer object may include data describing a 'specified quarter' filter, the descriptor of the 'quarter' chronometric unit, and the descriptor of the 'year' chronometric unit. The semantic interface unit may identify the 'specified quarter' filter and may generate a corresponding 'specified quarter' expression including the query-transformation chronometric operator, which may express the 'specified quarter' filter such that data corresponding to a respective value of the chronometric 'date' column is included in the results data if the descriptor corresponding to the 'quarter' chronometric unit for the respective value of the chronometric 'date' column, which may be expressed using the query-transformation chronometric operator with reference to the chronometric 'date' column and a chronometric column identifier, such as 'quarter' as shown in Table 1, is equivalent to the specified descriptor of the 'quarter' chronometric unit, and the descriptor corresponding to the 'year' chronometric unit for the respective value of the chronometric 'date' column, which may be expressed using the query-transformation chronometric operator with reference to the chronometric 'date' column and a chronometric column identifier, such as 'year' as shown in Table 1, is equivalent to the specified descriptor of the 'year' chronometric unit.

The expressions may include expressions for a 'specified month' type filter, which may indicate filtering the results to omit data other than data corresponding a temporal interval corresponding to a specified 'month' chronometric unit, wherein the specified 'month' chronometric unit is expressed as a descriptor of the 'month' chronometric unit. For example, the answer object may include data describing a 'specified month' filter. The semantic interface unit may identify the 'specified month' filter and may generate a corresponding 'specified month' expression including the query-transformation chronometric operator, which may express the 'specified month' filter such that data corresponding to a respective value of the chronometric 'date' column is included in the results data if the descriptor corresponding to the 'month' chronometric unit for the respective value of the chronometric 'date' column, which may be expressed using the query-transformation chronometric operator with reference to the chronometric 'date' column and a chronometric column identifier, such as 'month' as shown in Table 1, is equivalent to the specified descriptor of the 'month' chronometric unit.

The expressions may include expressions for a 'weekday' or 'weekend' type filter, which may indicate filtering the results to omit data other than data corresponding chronometric units having the 'weekday' or 'weekend' property respectively.

For example, the answer object may include data describing a 'weekday' type filter. The semantic interface unit may identify the 'weekday' type filter and may generate a corresponding 'weekday' expression including the query-transformation chronometric operator, which may express the 'weekday' type filter such that data corresponding to a respective value of the chronometric 'date' column is included in the results data if the data corresponding to the 'day' chronometric unit for the respective value of the chronometric 'date' column, which may be expressed using the query-transformation chronometric operator with reference to the chronometric 'date' column and a chronometric column identifier, such as 'is weekend' as shown in Table 1, is equivalent to the value, such as zero (0), indicating that the respective chronometric unit has the 'weekday' property. Values of the chronometric 'date' column for which the corresponding value with respect to the chronometric column identifier 'is weekend' is equivalent to the value, such as one (1), indicating that the respective chronometric unit has the 'weekend' property may be omitted or excluded.

In another example, the answer object may include data describing a 'weekend' type filter. The semantic interface unit may identify the 'weekend' type filter and may generate a corresponding 'weekend' expression including the query-transformation chronometric operator, which may express the 'weekend' type filter such that data corresponding to a respective value of the chronometric 'date' column is included in the results data if the data corresponding to the 'day' chronometric unit for the respective value of the chronometric 'date' column, which may be expressed using the query-transformation chronometric operator with reference to the chronometric 'date' column and a chronometric column identifier, such as 'is weekend' as shown in Table 1, is equivalent to the value, such as one (1), indicating that the respective chronometric unit has the 'weekend' property. Values of the chronometric 'date' column for which the corresponding value with respect to the chronometric column identifier 'is weekend' is equivalent to the value, such as zero (0), indicating that the respective chronometric unit has the 'weekday' property may be omitted or excluded.

The expressions may include expressions for a 'month of year' type filter, which may indicate filtering the results to omit data other than data corresponding a temporal interval corresponding to a specified 'month' chronometric unit with respect to a specified 'year' chronometric unit, wherein the specified 'month' chronometric unit is expressed as a descriptor of the 'month' chronometric unit and the specified 'year' chronometric unit is expressed as a descriptor of the 'year' chronometric unit. For example, the answer object may include data describing a 'specified month' filter, the descriptor of the 'month' chronometric unit, and the descriptor of the 'year' chronometric unit. The semantic interface unit may identify the 'specified month' filter and may generate a corresponding 'specified month' expression including the query-transformation chronometric operator, which may express the 'specified month' filter such that data corresponding to a respective value of the chronometric 'date' column is included in the results data if the descriptor corresponding to the 'month' chronometric unit for the respective value of the chronometric 'date' column, which may be expressed using the query-transformation chronometric operator with reference to the chronometric 'date' column and a chronometric column identifier, such as 'month' as shown in Table 1, is equivalent to the specified descriptor of the 'month' chronometric unit, and the descriptor corresponding to the 'year' chronometric unit for the respective value of the chronometric 'date' column, which may be expressed using the query-transformation chronometric operator with reference to the chronometric 'date' column and a chronometric column identifier, such as 'year' as shown in Table 1, is equivalent to the specified descriptor of the 'year' chronometric unit.

The expressions may include expressions for 'N_periods_prior' type filters, which may indicate filtering the results to omit data other than data corresponding a temporal interval preceding the current temporal interval by a specified cardinality (N) of temporal intervals.

For example, the answer object may include data describing a '3_years_prior' filter. The semantic interface unit may identify the '3_years_prior' filter and may generate a corresponding '3_years_prior' expression including the query-transformation chronometric operator, which may express the '3_years_prior' filter wherein a representative value, such as a 'year' ordinal value, of the chronometric 'date' column may be expressed using the query-transformation chronometric operator with reference to the chronometric 'date' column and a chronometric column identifier, such as 'absolute_year_number' as shown in Table 1, such that data corresponding to a respective value of the chronometric 'date' column is included in the results data if a difference between a representative value, such as a 'year' ordinal value, of the current date, which may be expressed using the query-transformation chronometric operator with reference to the current date and the chronometric column identifier, and the specified cardinality (3), is at within, such as less than or equal to, the representative value of the chronometric 'date' column and the specified cardinality (3) of temporal intervals is equivalent to the representative value of the chronometric 'date' column.

In another example, the answer object may include data describing a '3_quarters_prior' filter. The semantic interface unit may identify the '3_quarters_prior' filter and may generate a corresponding '3_quarters_prior' expression including the query-transformation chronometric operator, which may express the '3_quarters_prior' filter wherein a representative value, such as a 'quarter' ordinal value, of the chronometric 'date' column may be expressed using the query-transformation chronometric operator with reference to the chronometric 'date' column and a chronometric column identifier, such as 'absolute_quarter_number' as shown in Table 1, such that data corresponding to a respective value of the chronometric 'date' column is included in the results data if a difference between a representative value, such as a 'quarter' ordinal value, of the current date, which may be expressed using the query-transformation chronometric operator with reference to the current date and the chronometric column identifier, and the specified cardinality (3), is at within, such as less than or equal to, the representative value of the chronometric 'date' column and the specified cardinality (3) of temporal intervals is equivalent to the representative value of the chronometric 'date' column.

In another example, the answer object may include data describing a '3_months_prior' filter. The semantic interface unit may identify the '3_months_prior' filter and may generate a corresponding '3_months_prior' expression including the query-transformation chronometric operator, which may express the '3_months_prior' filter wherein a representative value, such as a 'month' ordinal value, of the chronometric 'date' column may be expressed using the query-transformation chronometric operator with reference to the chronometric 'date' column and a chronometric column identifier, such as 'absolute_month_number' as shown in Table 1, such that data corresponding to a respective value of the chronometric 'date' column is included in the results data if a difference between a representative value, such as a 'month' ordinal value, of the current date, which may be expressed using the query-transformation chronometric operator with reference to the current date and the chronometric column identifier, and the specified cardinality (3), is at within, such as less than or equal to, the representative value of the chronometric 'date' column and the specified cardinality (3) of temporal intervals is equivalent to the representative value of the chronometric 'date' column.

The expressions may include expressions for 'current period' type filters, which may indicate filtering the results to omit data other than data corresponding a current temporal interval.

For example, the answer object may include data describing a 'current_year' filter. The semantic interface unit may identify the 'current_year' filter and may generate a corresponding 'current_year' expression including the query-transformation chronometric operator, which may express the 'current_year' filter wherein a representative value, such as a 'year' ordinal value, of the chronometric 'date' column may be expressed using the query-transformation chronometric operator with reference to the chronometric 'date' column and a chronometric column identifier, such as 'absolute_year_number' as shown in Table 1, such that data corresponding to a respective value of the chronometric 'date' column is included in the results data if a representative value, such as a 'year' ordinal value, of the current date, which may be expressed using the query-transformation chronometric operator with reference to the current date and the chronometric column identifier, is equivalent to the representative value of the chronometric 'date' column.

In another example, the answer object may include data describing a 'current_quarter' filter. The semantic interface unit may identify the 'current quarter' filter and may generate a corresponding 'current_quarter' expression including the query-transformation chronometric operator, which may express the 'current_quarter' filter wherein a representative value, such as a 'quarter' ordinal value, of the chronometric 'date' column may be expressed using the query-transformation chronometric operator with reference to the chronometric 'date' column and a chronometric column identifier, such as 'absolute_quarter_number' as shown in Table 1, such that data corresponding to a respective value of the chronometric 'date' column is included in the results data if a representative value, such as a 'quarter' ordinal value, of the current date, which may be expressed using the query-transformation chronometric operator with reference to the current date and the chronometric column identifier, is equivalent to the representative value of the chronometric 'date' column.

In another example, the answer object may include data describing a 'current month' filter. The semantic interface unit may identify the 'current_month' filter and may generate a corresponding 'current_month' expression including the query-transformation chronometric operator, which may express the 'current month' filter wherein a representative value, such as a 'month' ordinal value, of the chronometric 'date' column may be expressed using the query-transformation chronometric operator with reference to the chronometric 'date' column and a chronometric column identifier, such as 'absolute_month_number' as shown in Table 1, such that data corresponding to a respective value of the chronometric 'date' column is included in the results data if a representative value, such as a 'month' ordinal value, of the current date, which may be expressed using the query-transformation chronometric operator with reference to the current date and the chronometric column identifier, is equivalent to the representative value of the chronometric 'date' column.

The expressions may include expressions for 'subsequent_period' type filters, which may indicate filtering the results to omit data other than data corresponding a temporal interval immediately subsequent to a current temporal interval.

For example, the answer object may include data describing a 'subsequent year' filter. The semantic interface unit may identify the 'subsequent year' filter and may generate a corresponding 'subsequent year' expression including the query-transformation chronometric operator, which may express the 'subsequent year' filter wherein a representative value, such as a 'year' ordinal value, of the chronometric 'date' column may be expressed using the query-transformation chronometric operator with reference to the chronometric 'date' column and a chronometric column identifier, such as 'absolute_year_number' as shown in Table 1, the chronometric filter criteria may be expressed as the sum of a representative value, such as a 'year' ordinal value, of the current date, which may be expressed using the query-transformation chronometric operator with reference to the current date and the chronometric column identifier, and the constant one (1), such that data corresponding to a respective value of the chronometric 'date' column is included in the results data if the representative value of the chronometric 'date' column is equivalent to the sum.

In another example, the answer object may include data describing a 'subsequent quarter' filter. The semantic interface unit may identify the 'subsequent quarter' filter and may generate a corresponding 'subsequent quarter' expression including the query-transformation chronometric operator, which may express the 'subsequent quarter' filter wherein a representative value, such as a 'quarter' ordinal value, of the chronometric 'date' column may be expressed using the query-transformation chronometric operator with reference to the chronometric 'date' column and a chronometric column identifier, such as 'absolute_quarter_number' as shown in Table 1, the chronometric filter criteria may be expressed as the sum of a representative value, such as a 'quarter' ordinal value, of the current date, which may be expressed using the query-transformation chronometric operator with reference to the current date and the chronometric column identifier, and the constant one (1), such that data corresponding to a respective value of the chronometric 'date' column is included in the results data if the representative value of the chronometric 'date' column is equivalent to the sum.

In another example, the answer object may include data describing a 'subsequent month' filter. The semantic interface unit may identify the 'subsequent month' filter and may generate a corresponding 'subsequent month' expression including the query-transformation chronometric operator, which may express the 'subsequent month' filter wherein a representative value, such as a 'month' ordinal value, of the chronometric 'date' column may be expressed using the query-transformation chronometric operator with reference to the chronometric 'date' column and a chronometric column identifier, such as 'absolute_month_number' as shown in Table 1, the chronometric filter criteria may be expressed as the sum of a representative value, such as a 'month' ordinal value, of the current date, which may be expressed using the query-transformation chronometric operator with reference to the current date and the chronometric column identifier, and the constant one (1), such that data corresponding to a respective value of the chronometric 'date' column is included in the results data if the representative value of the chronometric 'date' column is equivalent to the sum.

In another example, the answer object may include data describing a 'subsequent week' filter. The semantic interface unit may identify the 'subsequent week' filter and may generate a corresponding 'subsequent week' expression including the query-transformation chronometric operator, which may express the 'subsequent week' filter wherein a representative value, such as a 'week' ordinal value, of the chronometric 'date' column may be expressed using the query-transformation chronometric operator with reference to the chronometric 'date' column and a chronometric column identifier, such as 'absolute_week_number' as shown in Table 1, the chronometric filter criteria may be expressed as the sum of a representative value, such as a 'week' ordinal value, of the current date, which may be expressed using the query-transformation chronometric operator with reference to the current date and the chronometric column identifier, and the constant one (1), such that data corresponding to a respective value of the chronometric 'date' column is included in the results data if the representative value of the chronometric 'date' column is equivalent to the sum.

The expressions may include expressions for 'subsequent_N_periods' type filters, which may indicate filtering the results to omit data other than data corresponding a specified cardinality (N) of temporal intervals immediately subsequent to a current temporal interval.

For example, the answer object may include data describing a 'subsequent 3 years' filter. The semantic interface unit may identify the 'subsequent 3 years' filter and may generate a corresponding 'subsequent 3 years' expression including the query-transformation chronometric operator, which may express the 'subsequent 3 years' filter wherein a representative value, such as a 'year' ordinal value, of the chronometric 'date' column may be expressed using the query-transformation chronometric operator with reference to the chronometric 'date' column and a chronometric column identifier, such as 'absolute_year_number' as shown in Table 1, such that data corresponding to a respective value of the chronometric 'date' column is included in the results data if the representative value of the chronometric 'date' column is less than a representative value, such as a 'year' ordinal value, of the current date, which may be expressed using the query-transformation chronometric operator with reference to the current date and the chronometric column identifier, and a sum of the representative value of the current date and the specified cardinality (3) of temporal intervals is at least, such as greater than or equal to, the representative value of the chronometric 'date' column.

In another example, the answer object may include data describing a 'subsequent 3 quarters' filter. The semantic interface unit may identify the 'subsequent 3 quarters' filter and may generate a corresponding 'subsequent 3 quarters' expression including the query-transformation chronometric operator, which may express the 'subsequent 3 quarters' filter wherein a representative value, such as a 'quarter' ordinal value, of the chronometric 'date' column may be expressed using the query-transformation chronometric operator with reference to the chronometric 'date' column and a chronometric column identifier, such as 'absolute_quarter_number' as shown in Table 1, such that data corresponding to a respective value of the chronometric 'date' column is included in the results data if the representative value of the chronometric 'date' column is less than a representative value, such as a 'quarter' ordinal value, of the current date, which may be expressed using the query-transformation chronometric operator with reference to the current date and the chronometric column identifier, and a sum of the representative value of the current date and the specified cardinality (3) of temporal intervals is at least, such as greater than or equal to, the representative value of the chronometric 'date' column.

In another example, the answer object may include data describing a 'subsequent 3 months' filter. The semantic interface unit may identify the 'subsequent 3 months' filter and may generate a corresponding 'subsequent 3 months' expression including the query-transformation chronometric operator, which may express the 'subsequent 3 months' filter wherein a representative value, such as a 'month' ordinal value, of the chronometric 'date' column may be expressed using the query-transformation chronometric operator with reference to the chronometric 'date' column and a chronometric column identifier, such as 'absolute_month_number' as shown in Table 1, such that data corresponding to a respective value of the chronometric 'date' column is included in the results data if the representative value of the chronometric 'date' column is less than a representative value, such as a 'month' ordinal value, of the current date, which may be expressed using the query-transformation chronometric operator with reference to the current date and the chronometric column identifier, and a sum of the representative value of the current date and the specified cardinality (3) of temporal intervals is at least, such as greater than or equal to, the representative value of the chronometric 'date' column.

In another example, the answer object may include data describing a 'subsequent 3 weeks' filter. The semantic interface unit may identify the 'subsequent 3 weeks' filter and may generate a corresponding 'subsequent 3 weeks' expression including the query-transformation chronometric operator, which may express the 'subsequent 3 weeks' filter wherein a representative value, such as a 'week' ordinal value, of the chronometric 'date' column may be expressed using the query-transformation chronometric operator with reference to the chronometric 'date' column and a chronometric column identifier, such as 'absolute_week_number' as shown in Table 1, such that data corresponding to a respective value of the chronometric 'date' column is included in the results data if the representative value of the chronometric 'date' column is less than a representative value, such as a 'week' ordinal value, of the current date, which may be expressed using the query-transformation chronometric operator with reference to the current date and the chronometric column identifier, and a sum of the representative value of the current date and the specified cardinality (3) of temporal intervals is at least, such as greater than or equal to, the representative value of the chronometric 'date' column.

The expressions may include expressions for 'last_sub_per_super' type filters, which may indicate filtering the results to omit data other than data corresponding temporal intervals expressed with reference to a first chronometric unit (sub) and a second chronometric unit (super) wherein instances of the second chronometric unit include instances of the first chronometric unit and wherein a respective instance of the first chronometric unit is the temporally maximal (last) instance of the first chronometric unit within a respective instance of the second chronometric unit.

A 'last_sub_per_super' expression may include a first representative value, such as a maximum epoch value for a respective instance of the sub chronometric unit, of the chronometric 'date' column, which may be expressed using the query-transformation chronometric operator with reference to the chronometric 'date' column and a chronometric column identifier indicating the chronometric column corresponding to the maximum epoch value for a respective instance of the sub chronometric unit; a second representative value, such as an ordinal value for the super chronometric unit, of the first representative value of the chronometric 'date' column, which may be expressed using the query-transformation chronometric operator with reference to the first representative value of the chronometric 'date' column and a chronometric column identifier indicating the chronometric column corresponding to the ordinal value for the super chronometric unit, such that data corresponding to a respective value of the chronometric 'date' column is included in the results data if the second representative value is equivalent to a sum of one (1) and a representative value, such as the ordinal value for the super chronometric unit, of the of the chronometric 'date' column, which may be expressed using the query-transformation chronometric operator with reference to the chronometric 'date' column and the chronometric column identifier indicating the chronometric column corresponding to the ordinal value for the super chronometric unit.

For example, the answer object may include data describing a 'last_month_per_quarter' filter. The semantic interface unit may identify the data describing the 'last_month_per_quarter' filter and may generate a corresponding 'last_month_per_quarter' expression including the query-transformation chronometric operator, which may express the 'last_month_per_quarter' filter wherein a first representative value, such as a maximum epoch value for a respective instance of 'month' chronometric unit, of the chronometric 'date' column may be expressed using the query-transformation chronometric operator with reference to the chronometric 'date' column and a chronometric column identifier, such as 'end_of_month_epoch' as shown in Table 1, a second representative value, such as a 'quarter' ordinal value, of the first representative value of the chronometric 'date' column may be expressed using the query-transformation chronometric operator with reference to the first representative value of the chronometric 'date' column and a chronometric column identifier, such as 'absolute_quarter_number' as shown in Table 1, such that data corresponding to a respective value of the chronometric 'date' column is included in the results data if the second representative value is equivalent to a sum of one (1) and a representative value, such as a 'quarter' ordinal value, of the of the chronometric 'date' column, which may be expressed using the query-transformation chronometric operator with reference to the chronometric 'date' column and a chronometric column identifier, such as 'absolute_quarter_number' as shown in Table 1.

The expressions may include expressions for 'last N_subs_per_super' type filters, which may indicate filtering the results to omit data other than data corresponding a specified cardinality (N) of temporal intervals expressed with reference to a first chronometric unit (sub) and a second chronometric unit (super) wherein instances of the second chronometric unit include instances of the first chronometric unit and wherein a contiguous sequence of N respective instances of the first chronometric unit includes the temporally maximal (last) instance of the first chronometric unit within a respective instance of the second chronometric unit.

A 'last N_subs_per_super' expression may include a first representative value, such as a maximum epoch value for a respective instance of the super chronometric unit, of the chronometric 'date' column, which may be expressed using the query-transformation chronometric operator with reference to the chronometric 'date' column and a chronometric column identifier indicating the chronometric column corresponding to the maximum epoch value for a respective instance of the super chronometric unit; a difference value, which may be expressed using a day difference query-transformation chronometric operator with reference to the first representative value and a defined cordiality of days, such as one (1) day, which may indicate an epoch value corresponding to a day temporally preceding the first representative value by the defined cardinality of days; a second representative value, such as an ordinal value for the sub chronometric unit with respect to the super chronometric unit, of the difference value, which may be expressed using the query-transformation chronometric operator with reference to the difference value and a chronometric column identifier indicating the chronometric column corresponding to the ordinal value for the sub chronometric unit with respect to the super chronometric unit; such that data corresponding to a respective value of the chronometric 'date' column is included in the results data if a difference between the second representative value and a representative value, such as the ordinal value for the sub chronometric unit with respect to the super chronometric unit, of the chronometric 'date' column, which may be expressed using the query-transformation chronometric operator with reference to the chronometric 'date' column and the chronometric column identifier indicating the chronometric column corresponding to the ordinal value for the sub chronometric unit with respect to the super chronometric unit, is less than the cardinality (N) of temporal intervals.

For example, the answer object may include data describing a 'last_3_weeks_per_month' filter. The semantic interface unit may identify the data describing the 'last_3_weeks_per_month' filter and may generate a corresponding 'last_3_weeks_per_month' expression including the query-transformation chronometric operator, which may express the 'last_3_weeks_per_month' filter wherein a 'last_3_weeks_per_month' expression may include a first representative value, such as a maximum epoch value for a respective instance of the 'month' chronometric unit, of the chronometric 'date' column, which may be expressed using the query-transformation chronometric operator with reference to the chronometric 'date' column and a chronometric column identifier, such as 'end_of_month_epoch' as shown in Table 1; a difference value, which may be expressed using a day difference query-transformation chronometric operator with reference to the first representative value and a defined cordiality of days, such as one (1) day, which may indicate an epoch value corresponding to a day temporally preceding the first representative value by the defined cardinality of days; a second representative value, such as an ordinal value for the 'week' chronometric unit with respect to the 'month' chronometric unit, of the difference value, which may be expressed using the query-transformation chronometric operator with reference to the difference value and a chronometric column identifier, such as 'week_number_of_month' as shown in Table 1; such that data corresponding to a respective value of the chronometric 'date' column is included in the results data if a difference between the second representative value and a representative value, such as the ordinal value for the 'week' chronometric unit with respect to the 'month' chronometric unit, of the chronometric 'date' column, which may be expressed using the query-transformation chronometric operator with reference to the chronometric 'date' column and the chronometric column identifier, such as 'week_number_of_month' as shown in Table 1, is less than the cardinality (3) of temporal intervals.

In some implementations, an instance of a first chronometric unit, such as a 'year' chronometric unit, may include an instance of a second chronometric unit, such as a 'week' chronometric unit, that includes an instance of a third chronometric unit, such as a 'day' chronometric unit that is omitted from the instance of the first chronometric unit, and the 'last_N_weeks_per_super' expression may include a first representative value (DP1), such as a maximum epoch value for a respective instance of the super chronometric unit, of the chronometric 'date' column, which may be expressed using the query-transformation chronometric operator with reference to the chronometric 'date' column and a chronometric column identifier indicating the chronometric column corresponding to the maximum epoch value for a respective instance of the super chronometric unit; a first difference value (DD1), which may be expressed using the day difference query-transformation chronometric operator with reference to the first representative value and a defined cordiality of days, such as one (1) day, which may indicate an epoch value corresponding to a day temporally preceding the first representative value by the defined cardinality of days; a second representative value (DP2), such as an ordinal value for the sub chronometric unit with respect to the super chronometric unit, of the first difference value, which may be expressed using the query-transformation chronometric operator with reference to the first difference value and a chronometric column identifier indicating the chronometric column corresponding to the ordinal value for the sub chronometric unit with respect to the super chronometric unit; a third representative value (DP3), such as a minimum epoch value for a respective instance of the sub chronometric unit, of the first difference value, which may be expressed using the query-transformation chronometric operator with reference to the first difference value and a chronometric column identifier indicating the chronometric column corresponding to the minimum epoch value for a respective instance of the sub chronometric unit; a second difference value (DD2), which may be expressed using a day difference query-transformation chronometric operator with reference to the third representative value and a defined cordiality of days, such as one (1) day, which may indicate an epoch value corresponding to a day temporally preceding the third representative value by the defined cardinality of days; a fourth representative value (DP4), such as an ordinal value for the sub chronometric unit with respect to the super chronometric unit, of the second difference value, which may be expressed using the query-transformation chronometric operator with reference to the second difference value and the chronometric column identifier indicating the chronometric column corresponding to the ordinal value for the sub chronometric unit with respect to the super chronometric unit; and a fifth representative value (DP5), such as the ordinal value for the sub chronometric unit with respect to the super chronometric unit, of the chronometric 'date' column, which may be expressed using the query-transformation chronometric operator with reference to the chronometric 'date' column and the chronometric column identifier indicating the chronometric column corresponding to the ordinal value for the sub chronometric unit with respect to the super chronometric unit; such that data corresponding to a respective value of the chronometric 'date' column is included in the results data if the second representative value differs from one (1) and a difference between the second representative value and the fifth representative value is less than the cardinality (N) of temporal intervals, or the second representative value is equivalent to one (1) and a difference between the fourth representative value and the fifth representative value is less than the cardinality (N) of temporal intervals, which may be expressed as the following:

$$((DP2!=1)\&\&((D_P2-DP5)<N)||((DP2==1)\&\&(DP4-DP5)).$$

Data corresponding to other values of the chronometric 'date' column may be omitted from the results data.

Figure 7:
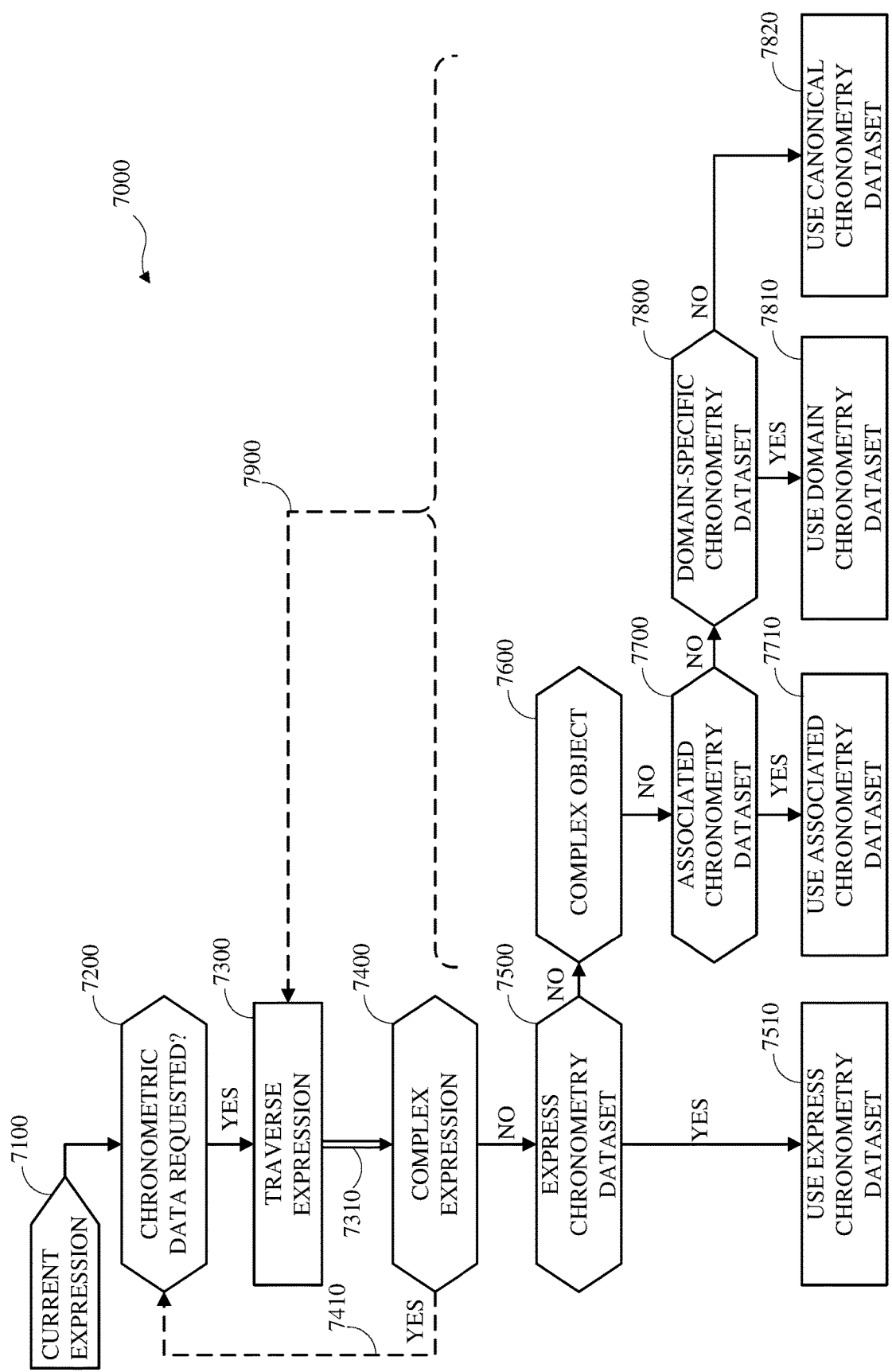
FIG. 7 is a flow diagram of a method of chronometry determination for data-query generation for analytical data access with available domain-specific chronometry in a low-latency database analysis system.

Generating a data-query, or data-queries, at 5420 may include identifying or determining chronometry for the data-query, or data-queries. For example, generating the proto-query may include identifying the chronometry. An example of identifying chronometry is shown in FIG. 7.

The semantic interface unit may send, or otherwise make available, the data-queries to the distributed in-memory database of the low-latency database analysis system. The distributed in-memory database may receive, or otherwise access, the data-queries. The distributed in-memory database may execute or perform one or more queries to generate or obtain response data responsive to the data-query based on the low-latency data at 5430.

The distributed in-memory database may output, or otherwise make available, the results data, or a portion thereof, such as to the semantic interface unit. The semantic interface unit may receive, or otherwise access, the results data, or a portion thereof, and may output, or otherwise make available, the results data, or a portion thereof, such as to the relational search unit. The relational search unit may receive, or otherwise access, the results data, or a portion thereof, and may output, or otherwise make available, the results data, or a portion thereof, such as to the system access interface unit. The system access interface unit may receive, or otherwise access, the results data, or a portion thereof.

The results data may include a deterministic, or contextually-unique, identifier for a respective results column. For example, the deterministic identifier for a results column may be generated based on a deterministic, or contextually-unique, identifier for a corresponding ontological element in the answer object. In some implementations, two or more results columns may correspond with a respective ontological element in the answer object and the respective deterministic, or contextually-unique, identifier for the results columns may be determined based on the deterministic, or contextually-unique, identifier for the ontological element in the answer object and one or more other properties of the ontological element.

In another example, a headline data element may be associated with multiple results columns, and the deterministic identifier for the respective results columns may be determined based on a sequence identifier associated with the respective results column.

The system access interface unit may output a response including data representing the results data, or a portion thereof, at 5500. The system access interface unit may generate data for presenting a user interface, or one or more portions thereof, representing the results data, such as visualization data. For example, the system access interface unit may generate instructions for rendering, or otherwise presenting, the user interface, or one or more portions thereof and may transmit, or otherwise make available, the instructions for rendering, or otherwise presenting, the user interface, or one or more portions thereof to the system access unit, for presentation to a user of a system access unit. For example, the results data may include an epoch value and outputting the response may include outputting data representing the epoch value in accordance with a chronometric data visualization for the system-defined chronometry at 5510.

The results data obtained at 5400 may include chronometric results data for respective chronometric results ontological elements. Obtaining the results data at 5400 may include obtaining the chronometric results data from a respective chronometry dataset, such as the canonical chronometry or a domain-specific chronometry. The chronometric results data for a chronometric results ontological element may include display-data, such as value data, such as numeric value data, descriptor data, such as string descriptor data or display value, or a combination thereof. Other data defining or describing the chronometric results ontological elements may be included. The results data obtained at 5400 may include control-data ontological elements corresponding to respective chronometric display-data ontological elements. Outputting the results data at 5500 may include identifying the data associating respective control-data ontological elements with respective display-data ontological elements.

For example, the resolved-request may represent the request string "precipitation yearly meteorological". The meteorological domain-specific chronometry may define descriptors for respective instances of the 'year' chronometric unit with respect to an ordered contiguous sequence of 'year' chronometric units corresponding to, or within, the era of the domain-specific chronometry as "Y1", "Y2", "Y3", and the like. The results data responsive to the resolved-request may include a 'precipitation' results display-data ontological element for including aggregated precipitation values and a 'yearly' results display-data chronometric ontological element for including data representing respective descriptors for year-wise date values, such as "Y1", "Y2", and the like. The results data responsive to the resolved-request may include a control-data ontological element for a minimal temporal location value, which may be an epoch value, and a control-data ontological element for a maximal temporal location value, which may be an epoch value. The results data responsive to the resolved-request may include a deterministic identifier for the control-data ontological element for the minimal temporal location value and a deterministic identifier for the control-data ontological element for the maximal temporal location value. Outputting the results data at 5500 may include determining that the control-data ontological element for the minimal temporal location value is associated with the 'yearly' results display-data chronometric ontological element based on the deterministic identifier for the control-data ontological element for the minimal temporal location value. Outputting the results data at 5500 may include determining that the control-data ontological element for the maximal temporal location value is associated with the 'yearly' results display-data chronometric ontological element based on the deterministic identifier for the control-data ontological element for the maximal temporal location value. For example, the control-data ontological element for the minimal temporal location value may include an epoch value corresponding to the descriptor for the year-wise date value "Y1" indicating a temporally minimal or earliest epoch value for the respective 'year' chronometric unit instance and the control-data ontological element for the maximal temporal location value may include an epoch value corresponding to the descriptor for the year-wise date value "Y1" indicating a temporally maximal or latest epoch value for the respective 'year' chronometric unit instance.

In another example, the resolved-request may represent a request string including the term "daily", the results data may include a display-data oncological element including a descriptor, such as "Monday", for an instance of a 'day' chronometric unit, a control data oncological element including a minimal temporal location for the instance of the 'day' chronometric unit, and a control data oncological element including a maximal temporal location for the instance of the 'day' chronometric unit.

Although generating a resolved-request at 5300, obtaining response data at 5400, and outputting a response at 5500 are shown separately in FIG. 5, one or more aspects of generating a resolved-request at 5300, obtaining response data at 5400, and outputting a response at 5500 may be combined, one or more aspects may be omitted, and one or more aspects other than the aspects described may be included. For example, generating a resolved-request at 5300, obtaining response data at 5400, and outputting a response at 5500 may be referred to as obtaining results data.

FIG. 6 is a flow diagram of a method of obtaining domain-specific chronometry 6000 in a low-latency database analysis system. Obtaining domain-specific chronometry 6000 may be implemented in one or more components of a low-latency database analysis system, such as the low-latency database analysis system 3000 shown in FIG. 3, such as in a distributed in-memory database, such as the distributed in-memory database 3300 shown in FIG. 3, a relational search unit, such as the relational search unit 3700 shown in FIG. 3, a natural language processing unit, such as the natural language processing unit 3710 shown in FIG. 3, and a system access interface unit, such as the system access interface unit 3900 shown in FIG. 3. Obtaining domain-specific chronometry 6000 may be similar to the obtaining domain-specific chronometry at 5120 shown in FIG. 5, except as described herein, or otherwise clear from context.

Obtaining domain-specific chronometry 6000 includes obtaining chronometry configuration data at 6100, generating a domain-specific chronometry dataset at 6200, and storing the domain-specific chronometry dataset at 6300.

Chronometry configuration data may be obtained at 6100. Obtaining the chronometry configuration data may include obtaining data expressing a usage intent with respect to the low-latency database analysis system indicating the chronometry configuration data, or a portion thereof. In some implementations, the data expressing the usage intent may include a request to generate the domain-specific chronometry, which may indicate, or may otherwise be associated with, a current domain, which may be a sub-domain of the system-domain, such as an organization-domain.

In some implementations, obtaining the chronometry configuration data may include obtaining chronometry boundary configuration data (CBCD) at 6110. For example, the data expressing the usage intent may include the chronometry boundary configuration data, or a portion thereof. In some implementations, obtaining the chronometry boundary configuration data may include obtaining the chronometry boundary configuration data in response to user input.

The chronometry boundary configuration data may include chronometric location data. The chronometric location data may be expressed, in the chronometry boundary configuration data, in accordance with canonical chronometry, such as the system-defined chronometry defined at 5100 as shown in FIG. 5. The chronometric location data may include chronometric location data representing a minimum temporal location for the domain-specific chronometry dataset. The chronometric location data may include chronometric location data representing a maximum temporal location for the domain-specific chronometry dataset. The domain-specific chronometry dataset may describe an era corresponding to a duration from the minimum temporal location to the maximum temporal location.

The chronometry boundary configuration data may include a chronometry type identifier. The chronometry type identifier may indicate a system-defined template, pattern, or prototype for the domain-specific chronometry.

The chronometry boundary configuration data may include chronometric relationship data. The chronometric relationship data may define or describe a relationship among chronometric units of the domain-specific chronometry.

For example, the domain-specific chronometry may define or describe a first chronometric unit of the domain-specific chronometry dataset as corresponding with, or including, an ordered contiguous sequence of second chronometric units of the domain-specific chronometry dataset, and the chronometric relationship data may include chronometric relationship data indicating a sequentially earliest second chronometric unit with respect to the first chronometric unit, which may be expressed, in the chronometry boundary configuration data, with reference to a month-ordinal of the canonical chronometry.

In another example, the domain-specific chronometry may define or describe a third chronometric unit of the domain-specific chronometry dataset as corresponding with an ordered contiguous sequence of fourth chronometric units of the domain-specific chronometry dataset, and the chronometric relationship data may include chronometric relationship data indicating a sequentially earliest fourth chronometric unit with respect to the third chronometric unit, which may be expressed, in the chronometry boundary configuration data, with reference to a day-ordinal of the canonical chronometry.

In another example, the chronometric relationship data may include chronometric relationship data indicating, for the third chronometric unit, a fourth chronometric unit from the ordered sequence of fourth chronometric units, which may be expressed, in the chronometry boundary configuration data, with reference to a day-ordinal of the canonical chronometry, such that an instance of a chronometric unit of the domain-specific chronometry dataset that includes an instance of the fourth chronometric unit from the ordered sequence of fourth chronometric units includes an instance of the third chronometric unit that includes the instance of the fourth chronometric unit.

The chronometry boundary configuration data may include descriptor data for a chronometric unit of the domain-specific chronometry dataset. A temporal location may be represented, such as for output, such as for presentation to a user of the low-latency database analysis system, based on the descriptor data for a chronometric unit corresponding to the temporal location, or a combination of the descriptor data and a value of the chronometric unit corresponding to the temporal location. For example, a temporal point may be represented in the low-latency database analysis system as an epoch value, the chronometry boundary configuration data may include descriptor data for a year chronometric unit of the domain-specific chronometry dataset, such as the string "Y", and output data expressing the temporal point with reference to the year chronometric unit may include a concatenation of the string "Y" with a value, such as and integer value, of the year chronometric unit corresponding to the temporal point.

Obtaining the chronometry configuration data may include automatically generating the chronometry configuration data, or a portion thereof, such as primary chronometry configuration data (PCCD) at 6120. For example, one or more of the components of the low-latency database analysis system may automatically generate the primary chronometry configuration data, or a portion thereof, in response to obtaining the chronometry boundary configuration data, or a portion thereof, which may include automatically generating the primary chronometry configuration data, or the portion thereof, in accordance with the chronometry boundary configuration data, or a portion thereof.

In some implementations, the chronometry boundary configuration data may include output location data, such as output location data indicating a computer storage location for outputting the primary chronometry configuration data. Obtaining the chronometry configuration data may include outputting the primary chronometry configuration data, at 6130, in accordance with the output location data, such as by storing the primary chronometry configuration data, or otherwise causing the primary chronometry configuration data to be stored, in the computer storage location indicating in the chronometry boundary configuration data. In some embodiments, the primary chronometry configuration data output at 6130 may be externally modified.

In some implementations, obtaining the chronometry boundary configuration data at 6110, generating the primary chronometry configuration data at 6120, outputting the primary chronometry configuration data at 6130, or a combination thereof, may be omitted, as indicated by the broken line boarder at 6110, 6120, and 6130.

Obtaining the chronometry configuration data may include receiving, reading, or otherwise accessing, previously generated, such as previously stored, domain-specific chronometry configuration data (DSCCD) at 6140. Obtaining the chronometry configuration data may include obtaining, receiving, reading, or otherwise accessing, a name or descriptor for one or more domain-specific chronometry datasets.

For example, obtaining the chronometry configuration data may include automatically generating primary chronometry configuration data at 6120, storing the primary chronometry configuration data at 6130, such as in a computer storage location indicated in chronometry boundary configuration data, and receiving, reading, or otherwise accessing, chronometry configuration data from a data source corresponding to the primary chronometry configuration data, which may include the primary chronometry configuration data, other chronometry configuration data, or a combination thereof, as the domain-specific chronometry configuration data at 6140.

In some implementations, obtaining the domain-specific chronometry configuration data may include obtaining the domain-specific chronometry configuration data in response to user input. For example, the data expressing the usage intent, which may be obtained in response to user input, may include a request to generate a domain-specific chronometry dataset and a computer system file location, data storage location, or other data source, and the domain-specific chronometry configuration data may be obtained from the identified data source responsive to the request to generate the domain-specific chronometry dataset.

The domain-specific chronometry dataset may define or describe one or more chronometric units for the domain-specific chronometry. One or more of the chronometric units for the domain-specific chronometry may be correlated to corresponding chronometric units for the system-defined chronometry. One or more of the chronometric units for the domain-specific chronometry may differ from the chronometric units for the system-defined chronometry.

The domain-specific chronometry dataset may define or describe a minimal chronometric unit (seconds) that is equivalent to the minimal chronometric unit for the system-defined chronometry. The domain-specific chronometry dataset may define or describe a minute chronometric unit as an ordered contiguous sequence of sixty (60) minimal chronometric units (seconds), which may be equivalent to the minute chronometric unit of the system-defined chronometry. The domain-specific chronometry dataset may define or describe an hour chronometric unit as an ordered contiguous sequence of sixty (60) minute chronometric units, which may be equivalent to the hour chronometric unit of the system-defined chronometry. The domain-specific chronometry dataset may define or describe a day chronometric unit as an ordered contiguous sequence of twenty-four (24) hour chronometric units, which may be equivalent to the day chronometric unit of the system-defined chronometry. In some implementations, the domain-specific chronometry dataset may omit expressly defining or describing the minimal chronometric unit (seconds), the minute chronometric unit, the hour chronometric unit, the day chronometric unit, or a combination thereof, and may use the minimal chronometric unit (seconds), the minute chronometric unit, the hour chronometric unit, the day chronometric unit, or a combination thereof, defined in the system-defined chronometry.

The domain-specific chronometry configuration data may include chronometric instance data, such as a row, record, or otherwise delimited set of data (chronometry configuration data portion), describing an instance of a chronometric unit for the domain-specific chronometry dataset. For example, the domain-specific chronometry configuration data may include chronometric instance data describing an instance of the day chronometric unit.

The domain-specific chronometry dataset may define or describe an era corresponding to a duration from a minimum chronometric location of the domain-specific chronometry dataset to a maximum chronometric location of the domain-specific chronometry dataset. The domain-specific chronometry configuration data may include respective chronometric instance data describing the respective instances of a chronometric unit, such as the day chronometric unit, for the era of the domain-specific chronometry dataset.

In some embodiments, automatically generating the primary chronometry configuration data at 6120 may include generating the chronometric instance data or a portion thereof. In some embodiments, the chronometric instance data, or a portion thereof, may differ from the primary chronometry configuration data. Automatically generating the primary chronometry configuration data may include identifying the minimum temporal location for the domain-specific chronometry dataset from the chronometry boundary configuration data. Automatically generating the primary chronometry configuration data may include identifying the maximum temporal location for the domain-specific chronometry dataset from the chronometry boundary configuration data. For example, automatically generating the primary chronometry configuration data may include identifying a chronometry granularity for automatically generating the primary chronometry configuration data. For example, the system-defined day chronometric unit may be identified as the chronometry granularity.

The chronometric instance data describing an instance of the day chronometric unit may include a temporal location (temporal location data) expressed in accordance with the canonical chronometry, such as an epoch value (a first temporal location). In some implementations, automatically generating the primary chronometry configuration data based on the chronometry boundary configuration data, as described herein, may include automatically generating the temporal location data as primary chronometry configuration data.

For example, automatically generating the primary chronometry configuration data may include automatically generating the primary chronometry configuration data on the basis of the identified chronometry granularity, such as for respective day chronometric units which may correspond with respective chronometric instance data, or a portion thereof, such that the primary chronometry configuration data includes primary chronometry configuration data on a per-chronometry granularity chronometric unit basis, such as a per-day basis, for a sequence of corresponding chronometric units, such as a sequence of days, corresponding to a duration from the minimum chronometric location to the maximum chronometric location.

The chronometric instance data describing the instance of the day chronometric unit may include a descriptor for the instance of the day chronometric unit with respect to an ordered contiguous sequence of day chronometric units corresponding to, or within, an instance of a second chronometric unit of the domain-specific chronometry dataset. The instance of the second chronometric unit may have a temporal duration that is greater than or equal to temporal duration of the day chronometric unit. The second chronometric unit may differ from the day chronometric unit.

For example, the second chronometric unit of the domain-specific chronometry dataset may be similar to the week chronometric unit of the canonical chronometry, except as described herein or otherwise clear from context, and the descriptor for the instance of the day chronometric unit with respect to an ordered contiguous sequence of day chronometric units corresponding to, or within, an instance of a second chronometric unit of the domain-specific chronometry dataset may be a day-of-week-name. The respective descriptors for the instances of the day chronometric unit with respect to the ordered contiguous sequence of day chronometric units corresponding to, or within, an instance of a week chronometric unit of the canonical chronometry are "Monday", "Tuesday", "Wednesday", "Thursday", "Friday", "Saturday", and "Sunday". The descriptors for the instances of the day chronometric unit with respect to the ordered contiguous sequence of day chronometric units corresponding to, or within, the second chronometric unit of the domain-specific chronometry dataset may be similar to, or may differ from, the respective descriptors for the instances of the day chronometric unit with respect to the ordered contiguous sequence of day chronometric units corresponding to, or within, an instance of a week chronometric unit of the canonical chronometry.

In some implementations, automatically generating the primary chronometry configuration data based on the chronometry boundary configuration data, as described herein, may include automatically generating the descriptor for the instance of the day chronometric unit with respect to an ordered contiguous sequence of day chronometric units corresponding to, or within, an instance of a second chronometric unit of the domain-specific chronometry dataset as primary chronometry configuration data, such as based on the chronometry boundary configuration data.

The chronometric instance data describing the instance of the day chronometric unit may include a descriptor for an instance of a third chronometric unit. The instance of the third chronometric unit may have a temporal duration that is greater than or equal to the temporal duration of the day chronometric unit. The instance of the third chronometric unit may include the instance of the day chronometric unit. The third chronometric unit may differ from the day chronometric unit and the second chronometric unit.

For example, the third chronometric unit of the domain-specific chronometry dataset may be similar to the month chronometric unit of the canonical chronometry, except as described herein or otherwise clear from context, and the descriptor for the instance of the third chronometric unit may be a month-name. The respective descriptors for the instances of the month chronometric unit with respect to the ordered contiguous sequence of month chronometric units corresponding to, or within, an instance of a year chronometric unit of the canonical chronometry are "January", "February", "March", "April", "May", "June", "July", "August", "September", "October", "November", and "December". The descriptors for the instances of the third chronometric unit with respect to the ordered contiguous sequence of third chronometric units corresponding to, or within, a fourth chronometric unit of the domain-specific chronometry dataset may be similar to, or may differ from, the respective descriptors for the instances of the month chronometric unit with respect to the ordered contiguous sequence of month chronometric units corresponding to, or within, an instance of a year chronometric unit of the canonical chronometry.

In some implementations, automatically generating the primary chronometry configuration data based on the chronometry boundary configuration data, as described herein, may include automatically generating the descriptor for the instance of the third chronometric unit as primary chronometry configuration data, such as based on the chronometry boundary configuration data.

The chronometric instance data describing the instance of the day chronometric unit may include a descriptor for an instance of the fourth chronometric unit. The instance of the fourth chronometric unit may have a temporal duration that is greater than or equal to the temporal duration of the day chronometric unit. The instance of the fourth chronometric unit may include the instance of the day chronometric unit. The fourth chronometric unit may differ from the day chronometric unit, the second chronometric unit, and the third chronometric unit. The descriptor for the instance of the fourth chronometric unit may include, for example, a concatenation of a descriptor for the fourth chronometric unit and a value, such as an integer value, of the instance of the fourth chronometric unit, such as an ordinal value of the instance of the fourth chronometric unit in an ordered contiguous sequence of fourth chronometric units corresponding to, or included in, a fifth chronometric unit.

For example, the fourth chronometric unit of the domain-specific chronometry dataset may be similar to the quarter chronometric unit of the canonical chronometry, except as described herein or otherwise clear from context, and the descriptor for the instance of the fourth chronometric unit may be a quarter-name. The respective descriptors for the instances of the quarter chronometric unit with respect to the ordered contiguous sequence of quarter chronometric units corresponding to, or within, an instance of the year chronometric unit of the canonical chronometry are "Q1", "Q2", "Q3", and "Q4". The descriptors for the instances of the fourth chronometric unit with respect to the ordered contiguous sequence of fourth chronometric units corresponding to, or within, a fifth chronometric unit of the domain-specific chronometry dataset may be similar to, or may differ from, the respective descriptors for the instances of the quarter chronometric unit with respect to the ordered contiguous sequence of quarter chronometric units corresponding to, or within, an instance of the year chronometric unit of the canonical chronometry.

In some implementations, automatically generating the primary chronometry configuration data based on the chronometry boundary configuration data, as described herein, may include automatically generating the descriptor for the instance of the fourth chronometric unit as primary chronometry configuration data, such as based on the chronometry boundary configuration data.

The chronometric instance data describing the instance of the day chronometric unit may include a descriptor for an instance of the fifth chronometric unit. The instance of the fifth chronometric unit may have a temporal duration that is greater than or equal to the temporal duration of the day chronometric unit. The instance of the fifth chronometric unit may include the instance of the day chronometric unit. The fifth chronometric unit may differ from the day chronometric unit, the second chronometric unit, the third chronometric unit, and the fourth chronometric unit. The descriptor for the instance of the fifth chronometric unit may include, for example, a concatenation of the descriptor data for the chronometric unit indicated in the chronometry boundary configuration data and a value, such as and integer value, of the instance of the fifth chronometric unit. For example, the value of the instance of the fifth chronometric unit may be an ordinal value of the instance of the fifth chronometric unit in an ordered ordered contiguous sequence of fifth chronometric units corresponding to, or included in, the era. For example, the fifth chronometric unit of the domain-specific chronometry dataset may be similar to the year chronometric unit of the canonical chronometry, except as described herein or otherwise clear from context, and the descriptor for the instance of the fifth chronometric unit may be a year-name. In some implementations, automatically generating the primary chronometry configuration data based on the chronometry boundary configuration data, as described herein, may include automatically generating the descriptor for the instance of the fifth chronometric unit as primary chronometry configuration data, such as based on the chronometry boundary configuration data.

The chronometric instance data describing the instance of the day chronometric unit may include an ordinal value for the instance of the day chronometric unit with respect to the ordered contiguous sequence of day chronometric units corresponding to, or within, the instance of the second chronometric unit of the domain-specific chronometry dataset. For example, the second chronometric unit of the domain-specific chronometry dataset may be similar to the week chronometric unit of the canonical chronometry, except as described herein or otherwise clear from context, and the ordinal value for the instance of the day chronometric unit with respect to the ordered contiguous sequence of day chronometric units corresponding to, or within, the instance of the second chronometric unit of the domain-specific chronometry dataset may be a day-number-of-week. In some implementations, automatically generating the primary chronometry configuration data based on the chronometry boundary configuration data, as described herein, may include automatically generating the ordinal value for the instance of the day chronometric unit with respect to the ordered contiguous sequence of day chronometric units corresponding to, or within, the instance of the second chronometric unit of the domain-specific chronometry dataset as primary chronometry configuration data, such as based on the chronometry boundary configuration data.

The chronometric instance data describing the instance of the day chronometric unit may include an ordinal value for the instance of the second chronometric unit with respect to the ordered contiguous sequence of second chronometric units corresponding to, or within, the instance of the third chronometric unit of the domain-specific chronometry dataset. For example, the second chronometric unit of the domain-specific chronometry dataset may be similar to the week chronometric unit of the canonical chronometry, except as described herein or otherwise clear from context, the third chronometric unit of the domain-specific chronometry dataset may be similar to the month chronometric unit of the canonical chronometry, except as described herein or otherwise clear from context, and the ordinal value for the instance of the second chronometric unit with respect to the ordered contiguous sequence of second chronometric units corresponding to, or within, the instance of the third chronometric unit of the domain-specific chronometry dataset may be a week-number-of-month. In some implementations, automatically generating the primary chronometry configuration data based on the chronometry boundary configuration data, as described herein, may include automatically generating the ordinal value for the instance of the second chronometric unit with respect to the ordered contiguous sequence of second chronometric units corresponding to, or within, the instance of the third chronometric unit of the domain-specific chronometry dataset as primary chronometry configuration data, such as based on the chronometry boundary configuration data.

The chronometric instance data describing the instance of the day chronometric unit may include an ordinal value for the instance of the second chronometric unit with respect to the ordered contiguous sequence of second chronometric units corresponding to, or within, the instance of the fourth chronometric unit of the domain-specific chronometry dataset. For example, the second chronometric unit of the domain-specific chronometry dataset may be similar to the week chronometric unit of the canonical chronometry, except as described herein or otherwise clear from context, the fourth chronometric unit of the domain-specific chronometry dataset may be similar to the quarter chronometric unit of the canonical chronometry, except as described herein or otherwise clear from context, and the ordinal value for the instance of the second chronometric unit with respect to the ordered contiguous sequence of second chronometric units corresponding to, or within, the instance of the fourth chronometric unit of the domain-specific chronometry dataset may be a week-number-of-quarter. In some implementations, automatically generating the primary chronometry configuration data based on the chronometry boundary configuration data, as described herein, may include automatically generating the ordinal value for the instance of the second chronometric unit with respect to the ordered contiguous sequence of second chronometric units corresponding to, or within, the instance of the fourth chronometric unit of the domain-specific chronometry dataset as primary chronometry configuration data, such as based on the chronometry boundary configuration data.

The chronometric instance data describing the instance of the day chronometric unit may include an ordinal value for the instance of the second chronometric unit with respect to the ordered contiguous sequence of second chronometric units corresponding to, or within, the instance of the fifth chronometric unit of the domain-specific chronometry dataset. For example, the second chronometric unit of the domain-specific chronometry dataset may be similar to the week chronometric unit of the canonical chronometry, except as described herein or otherwise clear from context, the fifth chronometric unit of the domain-specific chronometry dataset may be similar to the year chronometric unit of the canonical chronometry, except as described herein or otherwise clear from context, and the ordinal value for the instance of the second chronometric unit with respect to the ordered contiguous sequence of second chronometric units corresponding to, or within, the instance of the fifth chronometric unit of the domain-specific chronometry dataset may be a week-number-of-year. In some implementations, automatically generating the primary chronometry configuration data based on the chronometry boundary configuration data, as described herein, may include automatically generating the ordinal value for the instance of the second chronometric unit with respect to the ordered contiguous sequence of second chronometric units corresponding to, or within, the instance of the fifth chronometric unit of the domain-specific chronometry dataset as primary chronometry configuration data, such as based on the chronometry boundary configuration data.

Obtaining the chronometry configuration data may include automatically generating a portion of the chronometry configuration data, such as secondary chronometric instance data (SCID) at 6150. The chronometry configuration data may include respective chronometric instance data describing the respective instances of the chronometric unit, such as the day chronometric unit, for the era of the domain-specific chronometry dataset, and generating the secondary chronometric instance data may include generating respective secondary chronometric instance data describing the respective instances of the chronometric unit, such as the day chronometric unit, for the era of the domain-specific chronometry dataset The secondary chronometric instance data describing the instance of the day chronometric unit may include a descriptor for the instance of the third chronometric unit of the domain-specific chronometry dataset with respect to the instance of the fifth chronometric unit of the domain-specific chronometry dataset. For example, the third chronometric unit of the domain-specific chronometry dataset may be similar to the month chronometric unit of the canonical chronometry, except as described herein or otherwise clear from context, the fifth chronometric unit of the domain-specific chronometry dataset may be similar to the year chronometric unit of the canonical chronometry, except as described herein or otherwise clear from context, and the descriptor for the instance of the third chronometric unit with respect to the instance of the fifth chronometric unit of the domain-specific chronometry dataset may be a month-and-year-name. The descriptor for the instance of the third chronometric unit of the domain-specific chronometry dataset with respect to the instance of the fifth chronometric unit of the domain-specific chronometry dataset may include, for example, a concatenation of the descriptor for the third chronometric unit and the value of the instance of the fifth chronometric unit. For example, the descriptor for the instance of the third chronometric unit of the domain-specific chronometry dataset may correspond with the 'Monthly' column shown in Table 1.

The secondary chronometric instance data describing the instance of the day chronometric unit may include a descriptor for the instance of the fourth chronometric unit of the domain-specific chronometry dataset with respect to the instance of the fifth chronometric unit of the domain-specific chronometry dataset. For example, the fourth chronometric unit of the domain-specific chronometry dataset may be similar to the quarter chronometric unit of the canonical chronometry, except as described herein or otherwise clear from context, the fifth chronometric unit of the domain-specific chronometry dataset may be similar to the year chronometric unit of the canonical chronometry, except as described herein or otherwise clear from context, and the descriptor for the instance of the fourth chronometric unit with respect to the instance of the fifth chronometric unit of the domain-specific chronometry dataset may be a quarter-and-year-name. The descriptor for the instance of the fourth chronometric unit with respect to the instance of the fifth chronometric unit of the domain-specific chronometry dataset may include, for example, a concatenation of the descriptor for the fourth chronometric unit and the value of the instance of the fifth chronometric unit. For example, the descriptor for the instance of the fourth chronometric unit of the domain-specific chronometry dataset may correspond with the 'Quarterly' column shown in Table 1.

The secondary chronometric instance data describing the instance of the day chronometric unit may include an ordinal value for the instance of the first chronometric unit with respect to the ordered sequence of first chronometric units corresponding to, or within, the instance of the third chronometric unit of the domain-specific chronometry dataset. For example, the third chronometric unit of the domain-specific chronometry dataset may be similar to the month chronometric unit of the canonical chronometry, except as described herein or otherwise clear from context, and the ordinal value for the instance of the first chronometric unit with respect to the ordered sequence of first chronometric units corresponding to, or within, the instance of the third chronometric unit of the domain-specific chronometry dataset may be a day-number-of-month. For example, the ordinal value for the instance of the first chronometric unit with respect to the ordered sequence of first chronometric units corresponding to, or within, the instance of the third chronometric unit of the domain-specific chronometry dataset may correspond with the 'day_number_of_month' column shown in Table 1.

The secondary chronometric instance data describing the instance of the day chronometric unit may include an ordinal value for the instance of the first chronometric unit with respect to the ordered sequence of first chronometric units corresponding to, or within, the instance of the fourth chronometric unit of the domain-specific chronometry dataset. For example, the fourth chronometric unit of the domain-specific chronometry dataset may be similar to the quarter chronometric unit of the canonical chronometry, except as described herein or otherwise clear from context, and the ordinal value for the instance of the first chronometric unit with respect to the ordered sequence of first chronometric units corresponding to, or within, the instance of the fourth chronometric unit of the domain-specific chronometry dataset may be a day-number-of-quarter. For example, the ordinal value for the instance of the first chronometric unit with respect to the ordered sequence of first chronometric units corresponding to, or within, the instance of the fourth chronometric unit of the domain-specific chronometry dataset may correspond with the 'day_number_of_quarter' column shown in Table 1.

The secondary chronometric instance data describing the instance of the day chronometric unit may include an ordinal value for the instance of the first chronometric unit with respect to the ordered sequence of first chronometric units corresponding to, or within, the instance of the fifth chronometric unit of the domain-specific chronometry dataset. For example, the fifth chronometric unit of the domain-specific chronometry dataset may be similar to the year chronometric unit of the canonical chronometry, except as described herein or otherwise clear from context, and the ordinal value for the instance of the first chronometric unit with respect to the ordered sequence of first chronometric units corresponding to, or within, the instance of the fifth chronometric unit of the domain-specific chronometry dataset may be a day-number-of-year. For example, the ordinal value for the instance of the first chronometric unit with respect to the ordered sequence of first chronometric units corresponding to, or within, the instance of the fifth chronometric unit of the domain-specific chronometry dataset may correspond with the 'day_number_of_year' column shown in Table 1.

The secondary chronometric instance data describing the instance of the day chronometric unit may include an ordinal value for the instance of the third chronometric unit with respect to the ordered sequence of third chronometric units corresponding to, or within, the instance of the fourth chronometric unit of the domain-specific chronometry dataset. For example, the third chronometric unit of the domain-specific chronometry dataset may be similar to the month chronometric unit of the canonical chronometry, the fourth chronometric unit of the domain-specific chronometry dataset may be similar to the quarter chronometric unit of the canonical chronometry, except as described herein or otherwise clear from context, and the ordinal value for the instance of the third chronometric unit with respect to the ordered sequence of third chronometric units corresponding to, or within, the instance of the fourth chronometric unit of the domain-specific chronometry dataset may be a month-number-of-quarter. For example, the ordinal value for the instance of the third chronometric unit with respect to the ordered sequence of third chronometric units corresponding to, or within, the instance of the fourth chronometric unit of the domain-specific chronometry dataset may correspond with the 'month_number_of_quarter' column shown in Table 1.

The secondary chronometric instance data describing the instance of the day chronometric unit may include an ordinal value for the instance of the third chronometric unit with respect to the ordered sequence of third chronometric units corresponding to, or within, the instance of the fifth chronometric unit of the domain-specific chronometry dataset. For example, the third chronometric unit of the domain-specific chronometry dataset may be similar to the month chronometric unit of the canonical chronometry, the fifth chronometric unit of the domain-specific chronometry dataset may be similar to the year chronometric unit of the canonical chronometry, except as described herein or otherwise clear from context, and the ordinal value for the instance of the third chronometric unit with respect to the ordered sequence of third chronometric units corresponding to, or within, the instance of the fifth chronometric unit of the domain-specific chronometry dataset may be a month-number-of-year. For example, the ordinal value for the instance of the third chronometric unit with respect to the ordered sequence of third chronometric units corresponding to, or within, the instance of the fifth chronometric unit of the domain-specific chronometry dataset may correspond with the 'month_number_of_year' column shown in Table 1.

The secondary chronometric instance data describing the instance of the day chronometric unit may include an ordinal value for the instance of the fourth chronometric unit with respect to the ordered sequence of fourth chronometric units corresponding to, or within, the instance of the fifth chronometric unit of the domain-specific chronometry dataset. For example, the fourth chronometric unit of the domain-specific chronometry dataset may be similar to the quarter chronometric unit of the canonical chronometry, the fifth chronometric unit of the domain-specific chronometry dataset may be similar to the year chronometric unit of the canonical chronometry, except as described herein or otherwise clear from context, and the ordinal value for the instance of the fourth chronometric unit with respect to the ordered sequence of fourth chronometric units corresponding to, or within, the instance of the fifth chronometric unit of the domain-specific chronometry dataset may be a quarter-number-of-year. For example, the ordinal value for the instance of the fourth chronometric unit with respect to the ordered sequence of fourth chronometric units corresponding to, or within, the instance of the fifth chronometric unit of the domain-specific chronometry dataset may correspond with the 'quarter_number_of_year' column shown in Table 1.

The secondary chronometric instance data describing the instance of the day chronometric unit may include a sequence value for the instance of the second chronometric unit with respect to an ordered contiguous sequence of second chronometric units corresponding to, or within, the era of the domain-specific chronometry dataset. For example, the second chronometric unit of the domain-specific chronometry dataset may be similar to the week chronometric unit of the canonical chronometry, and the sequence value for the instance of the second chronometric unit with respect to the ordered contiguous sequence of second chronometric units corresponding to, or within, the era of the domain-specific chronometry dataset may be an era-week-number. For example, the sequence value for the instance of the second chronometric unit with respect to an ordered contiguous sequence of second chronometric units corresponding to, or within, the era of the domain-specific chronometry dataset may correspond with the 'absolute_week_number' column shown in Table 1.

The secondary chronometric instance data describing the instance of the day chronometric unit may include a second temporal location expressed in accordance with the canonical chronometry. The second temporal location may be expressed as an epoch value. The second temporal location may correspond to a minimum day chronometric unit with respect to the ordered sequence of day chronometric units within the instance of the second chronometric unit of the domain-specific chronometry dataset that includes the instance of the day chronometric unit. For example, the second temporal location may correspond with the start_of_week_epoch shown in Table 1.

The secondary chronometric instance data describing the instance of the day chronometric unit may include a third temporal location expressed in accordance with the canonical chronometry. The third temporal location may be expressed as an epoch value. The third temporal location may correspond to a maximum day chronometric unit with respect to the ordered sequence of day chronometric units within the instance of the second chronometric unit of the domain-specific chronometry dataset that includes the instance of the day chronometric unit. For example, the third temporal location may correspond with the 'end_of_week_epoch' column shown in Table 1.

The secondary chronometric instance data describing the instance of the day chronometric unit may include a sequence value for the instance of the third chronometric unit with respect to an ordered contiguous sequence of third chronometric units corresponding to, or within, the era of the domain-specific chronometry dataset. For example, the third chronometric unit of the domain-specific chronometry dataset may be similar to the month chronometric unit of the canonical chronometry, and the sequence value for the instance of the third chronometric unit with respect to the ordered contiguous sequence of third chronometric units corresponding to, or within, the era of the domain-specific chronometry dataset may be an era-month-number. For example, the sequence value for the instance of the third chronometric unit with respect to an ordered contiguous sequence of third chronometric units corresponding to, or within, the era of the domain-specific chronometry dataset may correspond with the 'absolute_month_number' column shown in Table 1.

The secondary chronometric instance data describing the instance of the day chronometric unit may include a fourth temporal location expressed in accordance with the canonical chronometry. The fourth temporal location may be expressed as an epoch value. The fourth temporal location may correspond to a minimum day chronometric unit with respect to the ordered sequence of day chronometric units within the instance of the third chronometric unit of the domain-specific chronometry dataset that includes the instance of the day chronometric unit. For example, the fourth temporal location may correspond with the 'start_of_month_epoch' column shown in Table 1.

The secondary chronometric instance data describing the instance of the day chronometric unit may include a fifth temporal location expressed in accordance with the canonical chronometry. The fifth temporal location may be expressed as an epoch value. The fifth temporal location may correspond to a maximum day chronometric unit with respect to the ordered sequence of day chronometric units within the instance of the third chronometric unit of the domain-specific chronometry dataset that includes the instance of the day chronometric unit. For example, the fifth temporal location may correspond with the 'end_of_month_epoch' column shown in Table 1.

The secondary chronometric instance data describing the instance of the day chronometric unit may include a sequence value for the instance of the fourth chronometric unit with respect to an ordered contiguous sequence of fourth chronometric units corresponding to, or within, the era of the domain-specific chronometry dataset. For example, the fourth chronometric unit of the domain-specific chronometry dataset may be similar to the quarter chronometric unit of the canonical chronometry, and the sequence value for the instance of the fourth chronometric unit with respect to the ordered contiguous sequence of fourth chronometric units corresponding to, or within, the era of the domain-specific chronometry dataset may be an era-quarter-number.

For example, the sequence value for the instance of the fourth chronometric unit with respect to an ordered contiguous sequence of fourth chronometric units corresponding to, or within, the era of the domain-specific chronometry dataset may correspond with the 'absolute_quarter_number' column shown in Table 1.

The secondary chronometric instance data describing the instance of the day chronometric unit may include a sixth temporal location expressed in accordance with the canonical chronometry. The sixth temporal location may be expressed as an epoch value. The sixth temporal location may correspond to a minimum day chronometric unit with respect to the ordered sequence of day chronometric units within the instance of the fourth chronometric unit of the domain-specific chronometry dataset that includes the instance of the day chronometric unit. For example, the sixth temporal location may correspond with the 'start_of_quarter_epoch' column shown in Table 1.

The secondary chronometric instance data describing the instance of the day chronometric unit may include a seventh temporal location expressed in accordance with the canonical chronometry. The seventh temporal location may be expressed as an epoch value. The seventh temporal location may correspond to a maximum day chronometric unit with respect to the ordered sequence of day chronometric units within the instance of the fourth chronometric unit of the domain-specific chronometry dataset that includes the instance of the day chronometric unit. For example, the seventh temporal location may correspond with the 'end_of_quarter_epoch' column shown in Table 1.

The secondary chronometric instance data describing the instance of the day chronometric unit may include a sequence value for the instance of the fifth chronometric unit with respect to an ordered contiguous sequence of fifth chronometric units corresponding to, or within, the era of the domain-specific chronometry dataset. For example, the fifth chronometric unit of the domain-specific chronometry dataset may be similar to the year chronometric unit of the canonical chronometry, and the sequence value for the instance of the fifth chronometric unit with respect to the ordered contiguous sequence of fifth chronometric units corresponding to, or within, the era of the domain-specific chronometry dataset may be an era-year-number. For example, the sequence value for the instance of the fifth chronometric unit with respect to an ordered contiguous sequence of fifth chronometric units corresponding to, or within, the era of the domain-specific chronometry dataset may correspond with the 'absolute_year_number' column shown in Table 1.

The secondary chronometric instance data describing the instance of the day chronometric unit may include an eighth temporal location expressed in accordance with the canonical chronometry. The eighth temporal location may be expressed as an epoch value. The eighth temporal location may correspond to a minimum day chronometric unit with respect to the ordered sequence of day chronometric units within the instance of the fifth chronometric unit of the domain-specific chronometry dataset that includes the instance of the day chronometric unit. For example, the eighth temporal location may correspond with the 'start_of_year_epoch' column shown in Table 1.

The secondary chronometric instance data describing the instance of the day chronometric unit may include a ninth temporal location expressed in accordance with the canonical chronometry. The ninth temporal location may be expressed as an epoch value. The ninth temporal location may correspond to a maximum day chronometric unit with respect to the ordered sequence of day chronometric units within the instance of the fifth chronometric unit of the domain-specific chronometry dataset that includes the instance of the day chronometric unit. For example, the ninth temporal location may correspond with the 'end_of_year_epoch' column shown in Table 1.

The secondary chronometric instance data describing the instance of the day chronometric unit may include a Boolean or binary value, such as a flag or bit, which may be an integer datatype including the values zero (0) and one (1), indicating whether the instance of the day chronometric unit is identified as having a 'weekend' property or a 'weekday' property. For example, the secondary chronometric instance data describing the instance of the day chronometric unit may include a bit having the value zero (0) indicating that the instance of the day chronometric unit has the 'weekday' property or the secondary chronometric instance data describing the instance of the day chronometric unit may include a bit having the value one (1) indicating that the instance of the day chronometric unit has the 'weekend' property. For example, the value indicating whether the instance of the day chronometric unit is identified as having a 'weekend' property or a 'weekday' property may correspond with the 'is_weekend' column shown in Table 1.

In some implementations, obtaining the chronometry configuration data may include storing, such as in a data storage unit of the low-latency database analysis system, the chronometric instance data, the secondary chronometric instance data, or a combination thereof.

The domain-specific chronometry dataset may be generated at 6200 in accordance with the chronometry configuration data obtained at 6100. The domain-specific chronometry dataset may be stored in the low-latency database analysis system at 6300. Generating the domain-specific chronometry dataset at 6200 and storing the domain-specific chronometry dataset at 6300 may be combined.

Generating the domain-specific chronometry dataset may be similar to generating the canonical chronometry dataset as shown at 5110 in FIG. 5, except as described herein or otherwise clear from context. The domain-specific chronometry dataset describes a chronometric unit for the domain-specific chronometry such that a temporal location expressed with reference to the chronometric unit and indicative of an epoch value differs from a temporal location expressed in accordance with the canonical chronometry and indicative of the epoch value.

Generating the domain-specific chronometry dataset at 6200, storing the domain-specific chronometry dataset at 6300, or a combination thereof, may include generating, storing or both, a chronometry table for the domain-specific chronometry, such as in a distributed in-memory database of the low-latency database analysis system, such as the distributed in-memory database 3300 shown in FIG. 3. Generating the domain-specific chronometry dataset at 6200, storing the domain-specific chronometry dataset at 6300, or a combination thereof, may include populating the chronometry table for the domain-specific chronometry based on the chronometry configuration data obtained at 6100. For example, a record or row may be generated, populated, or both, in the chronometry table for the domain-specific chronometry corresponding to a respective chronometric instance indicated in the chronometry configuration data. The chronometry table for the domain-specific chronometry may be similar to the chronometry table for the canonical chronometry as shown in Table 1, except as described herein or otherwise clear from context. For example, the chronometry table for the domain-specific chronometry may include one or more domain-specific columns that differ from the columns shown in Table 1, such as a 'season' column.

Generating the domain-specific chronometry dataset at 6200, storing the domain-specific chronometry dataset at 6300, or a combination thereof, may include generating an object representing the domain-specific chronometry dataset and storing the object in a distributed in-memory ontology of the low-latency database analysis system. Generating the domain-specific chronometry dataset at 6200, storing the domain-specific chronometry dataset at 6300, or a combination thereof, may include generating edge data representing a relationship between a date column in the low-latency database analysis system and the domain-specific chronometry dataset and storing the edge data in the distributed in-memory ontology of the low-latency database analysis system.

Generating the domain-specific chronometry dataset at 6200, storing the domain-specific chronometry dataset at 6300, or a combination thereof, may include generating and sending, or otherwise making available, ontological data representing the domain-specific chronometry dataset to the relational search unit of the low-latency database analysis system for indexing. For example, the ontological data representing the domain-specific chronometry dataset sent, or otherwise made available, to the relational search unit may include ontological data representing the calendar object, ontological data representing respective chronometric units, or a combination thereof. The relational search unit may include data corresponding to the ontological data representing the domain-specific chronometry dataset in a previously generated index of the low-latency database analysis system. In some implementations, the relational search unit may generate an index based on the ontological data representing the domain-specific chronometry dataset.

In some implementations, the relational search unit may include the name or descriptor for the domain-specific chronometry dataset, such as obtained from the ontological data representing the domain-specific chronometry dataset, in an index of chronometry names or descriptors, in association with a unique identifier of the domain-specific chronometry dataset, such as an identifier of the chronometry table, such that the relational search unit may identify the domain-specific chronometry dataset, such as the chronometry table, by traversing the index based on a value, such as a string corresponding to the name or descriptor, or a portion thereof. The relational search unit may identify the chronometry datasets, such as the canonical chronometry, the domain-specific chronometry, or a combination thereof. For example, the relational search unit may identify the chronometry datasets available in the low-latency database analysis system by traversing the index of chronometry. The relational search unit may output, send, transmit, or otherwise make available data indicating the chronometry datasets.

Generating the domain-specific chronometry dataset at 6200, storing the domain-specific chronometry dataset at 6300, or a combination thereof, may include generating a finite state machine (FSM) based on the domain-specific chronometry dataset. For example, the relational search unit of the low-latency database analysis system may generate the finite state machine based on the ontological data representing the domain-specific chronometry dataset.

FIG. 7 is a flow diagram of a method of chronometry determination for data-query generation for analytical data access with available domain-specific chronometry 7000 in a low-latency database analysis system. Chronometry determination for data-query generation for analytical data access with available domain-specific chronometry 7000 may be implemented in one or more components of a low-latency database analysis system, such as the low-latency database analysis system 3000 shown in FIG. 3, such as in a semantic interface unit of the low-latency database analysis system, such as the semantic interface unit 3600 shown in FIG. 3.

Chronometry determination for data-query generation for analytical data access with available domain-specific chronometry 7000 includes obtaining a current expression at 7100. For example, a relational search unit of the low-latency database analysis system, such as the relational search unit 3700 shown in FIG. 3, may obtain a resolved-request, such as shown at 5300 in FIG. 5, and may send, or otherwise make available, a resolved-request to the semantic interface unit. The semantic interface unit may receive, or otherwise access, the resolved-request, the semantic interface unit may obtain an answer object including a expression representing results data responsive to the resolved-request, which may be identified as the current expression at 7100.

Chronometry determination for data-query generation for analytical data access with available domain-specific chronometry 7000 includes determining whether chronometric data is requested at 7200. Determining whether chronometric data is requested at 7200 may include determining whether chronometric data is requested based on the current expression. Determining whether chronometric data is requested at 7200 may include determining whether the current expression includes a chronometric operator expression. For example, the semantic interface unit may determine whether the current expression includes a chronometric operator expression. The current expression may include one or more expressions, and the semantic interface unit may traverse each expression, such as hierarchically, such as in depth-first order, to determine whether an expression from the current expression includes a chronometric operator.

Determining whether chronometric data is requested at 7200 may include determining that the current expression omits a request for chronometric data (e.g., omits a chronometric operator). In response to determining that the current expression omits a request for chronometric data, chronometry determination for data-query generation for analytical data access with available domain-specific chronometry 7000 may be otherwise omitted with respect to the current expression. Analytical data access, other than chronometry determination for data-query generation for analytical data access with available domain-specific chronometry 7000 may be otherwise performed for the current expression.

Chronometry determination for data-query generation for analytical data access with available domain-specific chronometry 7000 may include traversing the current expression at 7300. For example, the current expression obtained at 7100 may be a complex expression including two or more expressions. Traversing the complex expression at 7300 may include identifying the expressions, or nodes, of the complex expression, and identifying, such as on a per-expression basis, a respective expression from the complex expression as the current expression. For example, the current expression may be traversed on a depth-first basis. The semantic interface unit may perform chronometry determination for data-query generation for analytical data access with available domain-specific chronometry 7000, or a portion thereof, for respective expressions serially or in parallel, as indicated by the double directional arrow at 7310.

Chronometry determination for data-query generation for analytical data access with available domain-specific chronometry 7000 may include determining whether the current expression includes a complex expression at 7400. For example, the current expression may include an operator expression and the current expression may be identified as a complex expression. In another example, the current expression may include a column expression or a constant expression, and the current expression may be identified as a simple expression.

In response to a determination that the current expression includes a complex expression, the semantic interface unit may perform chronometry determination for data-query generation for analytical data access with available domain-specific chronometry 7000 for the current expression as indicated by the broken directional arrow at 7410.

Chronometry determination for data-query generation for analytical data access with available domain-specific chronometry 7000 may include determining whether the current expression includes an express indication of a chronometry dataset at 7500. For example, in response to a determination that the current expression omits a complex expression, the semantic interface unit may determine whether the current expression includes an express indication of a chronometry dataset, such as a constant expression indicating an express chronometry dataset, at 7500.

Chronometry determination for data-query generation for analytical data access with available domain-specific chronometry 7000 may include identifying the chronometry dataset expressly indicated in the current expression as the chronometry dataset for the current expression at 7510. For example, in response to a determination that the current expression includes an express indication of a chronometry dataset at 7500, the semantic interface unit may identify the chronometry dataset expressly indicated in the current expression as the chronometry dataset for the current expression at 7510.

In response to the determination that the current expression includes the express indication of the chronometry dataset at 7500, the semantic interface unit may omit performing chronometry determination for data-query generation for analytical data access with available domain-specific chronometry 7000 for other expressions from the current expression identified at 7100 for the answer object. In response to the determination that the current expression includes the express indication of the chronometry dataset at 7500, the semantic interface unit may omit using a chronometry dataset identified for other expressions from the current expression identified at 7100 for the answer object.

Chronometry determination for data-query generation for analytical data access with available domain-specific chronometry 7000 may include determining whether the current expression includes a complex object at 7600. For example, in response to a determination that the current expression omits an express indication of a chronometry dataset at 7500, the semantic interface unit may determine whether the current expression includes a complex object at 7600.

The current expression may include a constant expression, other than a constant expression indicating express indication of a chronometry dataset, and the current expression may be identified as including a complex object at 7600. In response to a determination that the current expression includes a complex object at 7600, chronometry determination for data-query generation for analytical data access with available domain-specific chronometry 7000 may be otherwise omitted with respect to the current expression.

Chronometry determination for data-query generation for analytical data access with available domain-specific chronometry 7000 may include determining whether the current expression is associated with a chronometry dataset at 7700. For example, in response to a determination that the current expression omits a complex object at 7600, the current expression may be identified as indicating a current object, such as a column object, and the semantic interface unit may determine whether data associating the current object with a chronometry dataset is available at 7700.

Chronometry determination for data-query generation for analytical data access with available domain-specific chronometry 7000 may include identifying the chronometry dataset associated with the current object as the chronometry dataset for the current expression at 7710. For example, in response to a determination that data associating the current object with a chronometry dataset is available at 7700, the semantic interface unit may identify the chronometry dataset associated with the current object as the chronometry dataset for the current expression at 7710.

Chronometry determination for data-query generation for analytical data access with available domain-specific chronometry 7000 may include determining whether a domain-specific chronometry dataset is associated with a domain for the current expression at 7800. For example, in response to a determination that data associating the current object with a chronometry dataset is unavailable at 7700, the semantic interface unit may determine whether data indicating a domain-specific chronometry dataset associated with a domain for the current expression is available at 7800.

Chronometry determination for data-query generation for analytical data access with available domain-specific chronometry 7000 may include identifying the domain-specific chronometry dataset as the chronometry dataset for the data-query at 7810. For example, in response to a determination that data indicating the domain-specific chronometry dataset associated with the domain for the current expression is available, the semantic interface unit may identify the domain-specific chronometry dataset as the chronometry dataset for the current expression at 7810.

Chronometry determination for data-query generation for analytical data access with available domain-specific chronometry 7000 may include identifying the canonical chronometry dataset as the chronometry dataset for the current expression at 7820. For example, in response to a determination that data indicating the domain-specific chronometry dataset associated with the domain for the current expression is unavailable, the semantic interface unit may identify the canonical chronometry dataset as the chronometry dataset for the current expression at 7820.

In some implementations, the complex expression traversed at 7300 may include an expression, or expressions, subsequent to the current expression, such as in the depth-first traversal order, and the semantic interface unit may perform chronometry determination for data-query generation for analytical data access with available domain-specific chronometry 7000, or a portion thereof, for the subsequent expressions, as indicated by the broken directional arrow at 7900.

As used herein, the terminology "computer" or "computing device" includes any unit, or combination of units, capable of performing any method, or any portion or portions thereof, disclosed herein.

As used herein, the terminology "processor" indicates one or more processors, such as one or more special purpose processors, one or more digital signal processors, one or more microprocessors, one or more controllers, one or more microcontrollers, one or more application processors, one or more central processing units (CPU)s, one or more graphics processing units (GPU)s, one or more digital signal processors (DSP)s, one or more application specific integrated circuits (ASIC)s, one or more application specific standard products, one or more field programmable gate arrays, any other type or combination of integrated circuits, one or more state machines, or any combination thereof.

As used herein, the terminology "memory" indicates any computer-usable or computer-readable medium or device that can tangibly contain, store, communicate, or transport any signal or information that may be used by or in connection with any processor. For example, a memory may be one or more read only memories (ROM), one or more random access memories (RAM), one or more registers, low power double data rate (LPDDR) memories, one or more cache memories, one or more semiconductor memory devices, one or more magnetic media, one or more optical media, one or more magneto-optical media, or any combination thereof.

As used herein, the terminology "instructions" may include directions or expressions for performing any method, or any portion or portions thereof, disclosed herein, and may be realized in hardware, software, or any combination thereof. For example, instructions may be implemented as information, such as a computer program, stored in memory that may be executed by a processor to perform any of the respective methods, algorithms, aspects, or combinations thereof, as described herein. Instructions, or a portion thereof, may be implemented as a special purpose processor, or circuitry, that may include specialized hardware for carrying out any of the methods, algorithms, aspects, or combinations thereof, as described herein. In some implementations, portions of the instructions may be distributed across multiple processors on a single device, on multiple devices, which may communicate directly or across a network such as a local area network, a wide area network, the Internet, or a combination thereof.

As used herein, the terminology "determine," "identify," "obtain," and "form" or any variations thereof, includes selecting, ascertaining, computing, looking up, receiving, determining, establishing, obtaining, or otherwise identifying or determining in any manner whatsoever using one or more of the devices and methods shown and described herein.

As used herein, the term "computing device" includes any unit, or combination of units, capable of performing any method, or any portion or portions thereof, disclosed herein.

As used herein, the terminology "example," "embodiment," "implementation," "aspect," "feature," or "element" indicates serving as an example, instance, or illustration. Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "or" is intended to mean an inclusive "or" rather than an exclusive "or." That is, unless specified otherwise, or clear from context, "X includes A or B" is intended to indicate any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from the context to be directed to a singular form.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and elements.

Although some embodiments herein refer to methods, it will be appreciated by one skilled in the art that they may also be embodied as a system or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "processor," "device," or "system." Furthermore, aspects of the present invention may take the form of a computer program product embodied in one or more computer readable mediums having computer readable program code embodied thereon. Any combination of one or more computer readable mediums may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to CDs, DVDs, wireless, wireline, optical fiber cable, RF, etc., or any suitable combination of the foregoing.

Computer program code for carrying out operations for aspects of the present invention may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Attributes may comprise any data characteristic, category, content, etc. that in one example may be non-quantifiable or non-numeric. Measures may comprise quantifiable numeric values such as sizes, amounts, degrees, etc. For example, a first column containing the names of states may be considered an attribute column and a second column containing the numbers of orders received for the different states may be considered a measure column.

Aspects of the present embodiments are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a computer, such as a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks. The flowcharts and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. An apparatus for use in a database analysis system, the apparatus comprising:
    a memory storing computer executable instructions for dynamic chronometry data orientation; and
    a processor configured to execute the instructions to:
        obtain chronometry configuration data;
        generate, in the database analysis system, a domain-specific chronometry dataset in accordance with the chronometry configuration data, such that the domain-specific chronometry dataset describes chronometric units including a chronometric unit such that a temporal location expressed with reference to the chronometric unit and indicative of an epoch value differs from a temporal location indicative of the epoch value and expressed in accordance with a canonical chronometry; and
        store the domain-specific chronometry dataset in the database analysis system.

2. The apparatus of claim 1, wherein to store the domain-specific chronometry dataset the processor executes the instructions to:
    generate a table in a distributed in-memory database of the database analysis system; and
    store the domain-specific chronometry dataset in the table.

3. The apparatus of claim 1, wherein to store the domain-specific chronometry dataset the processor executes the instructions to:
    generate an object that represents the domain-specific chronometry dataset; and
    store the object in a distributed in-memory ontology of the database analysis system as ontological data that represents the domain-specific chronometry dataset.

4. The apparatus of claim 3, wherein to store the domain-specific chronometry dataset the processor executes the instructions to:
    obtain a descriptor value for the chronometric unit from the domain-specific chronometry dataset, wherein the chronometric unit is associated with a chronometric unit type; and
    generate a chronometry index for indexing descriptor values for chronometric units from the domain-specific chronometry dataset associated with the chronometric unit type, wherein to generate the chronometry index the processor executes the instructions to include the descriptor value for the chronometric unit in the chronometry index.

5. The apparatus of claim 3, wherein to store the domain-specific chronometry dataset the processor executes the instructions to:
    generate a finite state machine based on the ontological data representing the domain-specific chronometry dataset.

6. The apparatus of claim 1, wherein the canonical chronometry describes a Gregorian calendar.

7. The apparatus of claim 1, wherein to obtain the chronometry configuration data the processor executes the instructions to:
    obtain data expressing a usage intent with respect to the database analysis system, the data expressing the usage intent including chronometry boundary configuration data.

8. The apparatus of claim 7, wherein the chronometry boundary configuration data includes:
    first chronometric location data representing a minimum temporal location for the domain-specific chronometry dataset, the first chronometric location data expressed in the chronometry boundary configuration data in accordance with the canonical chronometry;
    second chronometric location data representing a maximum temporal location for the domain-specific chronometry dataset, the second chronometric location data expressed in the chronometry boundary configuration data in accordance with the canonical chronometry, such that the domain-specific chronometry dataset describes an era corresponding to a duration from the minimum temporal location to the maximum temporal location;
    a chronometry type identifier;
    first chronometric relationship data indicating, for a first chronometric unit of the domain-specific chronometry dataset, wherein the first chronometric unit corresponds with an ordered sequence of second chronometric units of the domain-specific chronometry dataset, a sequentially earliest second chronometric unit expressed in the chronometry boundary configuration data with reference to a month-ordinal of the canonical chronometry;
    second chronometric relationship data indicating, for a third chronometric unit of the domain-specific chronometry dataset, wherein the third chronometric unit corresponds with an ordered sequence of fourth chronometric units of the domain-specific chronometry dataset, a sequentially earliest fourth chronometric unit expressed in the chronometry boundary configuration data with reference to a day-ordinal of the canonical chronometry;

third chronometric relationship data indicating, for the third chronometric unit, a fourth chronometric unit from the ordered sequence of fourth chronometric units, represented with reference to a day-ordinal of the canonical chronometry, such that an instance of a chronometric unit of the domain-specific chronometry dataset that includes an instance of the fourth chronometric unit from the ordered sequence of fourth chronometric units includes an instance of the third chronometric unit that includes the instance of the fourth chronometric unit; and descriptor data for the first chronometric unit of the domain-specific chronometry dataset.

9. The apparatus of claim 8, wherein to obtain the chronometry configuration data the processor executes the instructions to:

obtain the chronometry boundary configuration data; and
automatically generate primary chronometry configuration data in response to the chronometry boundary configuration data.

10. The apparatus of claim 9, wherein:

the chronometry boundary configuration data includes output location data indicating a computer storage location for outputting the primary chronometry configuration data generated based on the chronometry boundary configuration data; and to obtain the chronometry configuration data the processor executes the instructions to output the primary chronometry configuration data in accordance with the output location data.

11. The apparatus of claim 1, wherein the chronometry configuration data includes chronometric instance data describing an instance of a first chronometric unit of the domain-specific chronometry dataset.

12. The apparatus of claim 11, wherein the domain-specific chronometry dataset describes an era corresponding to a duration from a minimum chronometric location of the domain-specific chronometry dataset to a maximum chronometric location of the domain-specific chronometry dataset, such that the chronometry configuration data includes respective chronometric instance data describing each instance of the first chronometric unit of the domain-specific chronometry dataset for the era of the domain-specific chronometry dataset.

13. The apparatus of claim 12, wherein the chronometric instance data includes:

a first temporal location expressed in accordance with the canonical chronometry;

a descriptor for the instance of the first chronometric unit with respect to an ordered sequence of first chronometric units within an instance of a second chronometric unit of the domain-specific chronometry dataset;

a descriptor for an instance of a third chronometric unit, wherein the instance of the third chronometric unit includes the instance of the first chronometric unit;

a descriptor for an instance of a fourth chronometric unit, wherein the instance of the fourth chronometric unit includes the instance of the first chronometric unit;

a descriptor for an instance of a fifth chronometric unit, wherein the instance of the fifth chronometric unit includes the instance of the first chronometric unit;

an ordinal value for the instance of the first chronometric unit with respect to the ordered sequence of first chronometric units within the instance of the second chronometric unit of the domain-specific chronometry dataset;

an ordinal value for the instance of the second chronometric unit with respect to an ordered sequence of second chronometric units within the instance of the third chronometric unit of the domain-specific chronometry dataset;

an ordinal value for the instance of the second chronometric unit with respect to an ordered sequence of second chronometric units within the instance of the fourth chronometric unit of the domain-specific chronometry dataset; and an ordinal value for the instance of the second chronometric unit with respect to an ordered sequence of second chronometric units within the instance of the fifth chronometric unit of the domain-specific chronometry dataset.

14. The apparatus of claim 13, wherein to obtain the chronometry configuration data the processor executes the instructions to automatically generate secondary chronometric instance data describing the instance of the first chronometric unit of the domain-specific chronometry dataset, wherein the secondary chronometric instance data includes:

a descriptor for the instance of the third chronometric unit of the domain-specific chronometry dataset with respect to the instance of the fifth chronometric unit of the domain-specific chronometry dataset;

a descriptor for the instance of the fourth chronometric unit of the domain-specific chronometry dataset with respect to the instance of the fifth chronometric unit of the domain-specific chronometry dataset;

an ordinal value for the instance of the first chronometric unit with respect to the ordered sequence of first chronometric units within the instance of the third chronometric unit of the domain-specific chronometry dataset;

an ordinal value for the instance of the first chronometric unit with respect to the ordered sequence of first chronometric units within the instance of the fourth chronometric unit of the domain-specific chronometry dataset;

an ordinal value for the instance of the first chronometric unit with respect to the ordered sequence of first chronometric units within the instance of the fifth chronometric unit of the domain-specific chronometry dataset;

an ordinal value for the instance of third chronometric unit with respect to an ordered sequence of third chronometric units within the instance of the fourth chronometric unit of the domain-specific chronometry dataset;

an ordinal value for the instance of third chronometric unit with respect to an ordered sequence of third chronometric units within the instance of the fifth chronometric unit of the domain-specific chronometry dataset;

an ordinal value for the instance of fourth chronometric unit with respect to an ordered sequence of fourth chronometric units within the instance of the fifth chronometric unit of the domain-specific chronometry dataset;

a sequence value for the instance of the second chronometric unit with respect to an ordered sequence of second chronometric units within the era of the domain-specific chronometry dataset;

a second temporal location expressed in accordance with the canonical chronometry, the second temporal location corresponding to a minimum first chronometric unit with respect to the ordered sequence of first chronometric units within the instance of the second chronometric unit of the domain-specific chronometry dataset;
a third temporal location expressed in accordance with the canonical chronometry, the third temporal location corresponding to a maximum first chronometric unit with respect to the ordered sequence of first chronometric units within the instance of the second chronometric unit of the domain-specific chronometry dataset;
a sequence value for the instance of the third chronometric unit with respect to an ordered sequence of third chronometric units within the era of the domain-specific chronometry dataset;
a fourth temporal location expressed in accordance with the canonical chronometry, the fourth temporal location corresponding to a minimum first chronometric unit with respect to the ordered sequence of first chronometric units within the instance of the third chronometric unit of the domain-specific chronometry dataset;
a fifth temporal location expressed in accordance with the canonical chronometry, the fifth temporal location corresponding to a maximum first chronometric unit with respect to the ordered sequence of first chronometric units within the instance of the third chronometric unit of the domain-specific chronometry dataset;
a sequence value for the instance of the fourth chronometric unit with respect to an ordered sequence of fourth chronometric units within the era of the domain-specific chronometry dataset;
a sixth temporal location expressed in accordance with the canonical chronometry, the sixth temporal location corresponding to a minimum first chronometric unit with respect to the ordered sequence of first chronometric units within the instance of the fourth chronometric unit of the domain-specific chronometry dataset;
a seventh temporal location expressed in accordance with the canonical chronometry, the seventh temporal location corresponding to a maximum first chronometric unit with respect to the ordered sequence of first chronometric units within the instance of the fourth chronometric unit of the domain-specific chronometry dataset;
a sequence value for the instance of the fifth chronometric unit with respect to an ordered sequence of fifth chronometric units within the era of the domain-specific chronometry dataset;
an eighth temporal location expressed in accordance with the canonical chronometry, the eighth temporal location corresponding to a minimum first chronometric unit with respect to the ordered sequence of first chronometric units within the instance of the fifth chronometric unit of the domain-specific chronometry dataset; and
a ninth temporal location expressed in accordance with the canonical chronometry, the ninth temporal location corresponding to a maximum first chronometric unit with respect to the ordered sequence of first chronometric units within the instance of the fifth chronometric unit of the domain-specific chronometry dataset.

15. The apparatus of claim 14, wherein to store the domain-specific chronometry dataset the processor executes the instructions to store the chronometric instance data and the secondary chronometric instance data.

16. An apparatus for use in a database analysis system, the apparatus comprising:
a memory storing computer executable instructions for dynamic chronometry data orientation; and
a processor configured to execute the instructions to:
obtain chronometry configuration data;
generate, in the database analysis system, a domain-specific chronometry dataset in accordance with the chronometry configuration data, such that the domain-specific chronometry dataset describes chronometric units including a chronometric unit such that a temporal location expressed with reference to the chronometric unit and indicative of an epoch value differs from a temporal location indicative of the epoch value and expressed in accordance with a canonical chronometry;
generate a chronometry table in a distributed in-memory database of the database analysis system;
store the domain-specific chronometry dataset in the chronometry table in the database analysis system;
generate an object representing the domain-specific chronometry dataset;
store the object in a distributed in-memory ontology of the database analysis system as ontological data representing the domain-specific chronometry dataset;
generate a chronometry index for indexing descriptor values for chronometric units from the domain-specific chronometry dataset associated with a chronometric unit type; and
generate a finite state machine based on the ontological data that represents the domain-specific chronometry dataset.

17. An apparatus for use in a database analysis system, the apparatus comprising:
a memory storing computer executable instructions for dynamic chronometry data orientation; and
a processor configured to execute the instructions to:
obtain chronometry configuration data;
generate, in the database analysis system, a domain-specific chronometry dataset in accordance with the chronometry configuration data, wherein the chronometry configuration data includes chronometric instance data describing an instance of a first chronometric unit of the domain-specific chronometry dataset, wherein the domain-specific chronometry dataset describes an era corresponding to a duration from a minimum chronometric location of the domain-specific chronometry dataset to a maximum chronometric location of the domain-specific chronometry dataset, such that the chronometry configuration data includes respective chronometric instance data describing each instance of the first chronometric unit of the domain-specific chronometry dataset for the era of the domain-specific chronometry dataset, such that the domain-specific chronometry dataset describes a chronometric unit such that a temporal location expressed with reference to the chronometric unit and indicative of an epoch value differs from a temporal location indicative of the epoch value and expressed in accordance with a canonical chronometry; and
store the domain-specific chronometry dataset in the database analysis system.

18. The apparatus of claim 17, wherein the chronometric instance data includes:
a first temporal location expressed in accordance with the canonical chronometry;
a descriptor for the instance of the first chronometric unit with respect to an ordered sequence of first chronometric units within an instance of a second chronometric unit of the domain-specific chronometry dataset;
a descriptor for an instance of a third chronometric unit, wherein the instance of the third chronometric unit includes the instance of the first chronometric unit;
a descriptor for an instance of a fourth chronometric unit, wherein the instance of the fourth chronometric unit includes the instance of the first chronometric unit;
a descriptor for an instance of a fifth chronometric unit, wherein the instance of the fifth chronometric unit includes the instance of the first chronometric unit;
an ordinal value for the instance of the first chronometric unit with respect to the ordered sequence of first chronometric units within the instance of the second chronometric unit of the domain-specific chronometry dataset;
an ordinal value for the instance of the second chronometric unit with respect to an ordered sequence of second chronometric units within the instance of the third chronometric unit of the domain-specific chronometry dataset;
an ordinal value for the instance of the second chronometric unit with respect to an ordered sequence of second chronometric units within the instance of the fourth chronometric unit of the domain-specific chronometry dataset; and
an ordinal value for the instance of the second chronometric unit with respect to an ordered sequence of second chronometric units within the instance of the fifth chronometric unit of the domain-specific chronometry dataset.

19. The apparatus of claim 18, wherein to obtain the chronometry configuration data the processor executes the instructions to automatically generate secondary chronometric instance data that describes the instance of the first chronometric unit of the domain-specific chronometry dataset, wherein the secondary chronometric instance data includes:
a descriptor for the instance of the third chronometric unit of the domain-specific chronometry dataset with respect to the instance of the fifth chronometric unit of the domain-specific chronometry dataset;
a descriptor for the instance of the fourth chronometric unit of the domain-specific chronometry dataset with respect to the instance of the fifth chronometric unit of the domain-specific chronometry dataset;
an ordinal value for the instance of the first chronometric unit with respect to the ordered sequence of first chronometric units within the instance of the third chronometric unit of the domain-specific chronometry dataset;
an ordinal value for the instance of the first chronometric unit with respect to the ordered sequence of first chronometric units within the instance of the fourth chronometric unit of the domain-specific chronometry dataset;
an ordinal value for the instance of the first chronometric unit with respect to the ordered sequence of first chronometric units within the instance of the fifth chronometric unit of the domain-specific chronometry dataset;
an ordinal value for the instance of third chronometric unit with respect to an ordered sequence of third chronometric units within the instance of the fourth chronometric unit of the domain-specific chronometry dataset;
an ordinal value for the instance of third chronometric unit with respect to an ordered sequence of third chronometric units within the instance of the fifth chronometric unit of the domain-specific chronometry dataset;
an ordinal value for the instance of fourth chronometric unit with respect to an ordered sequence of fourth chronometric units within the instance of the fifth chronometric unit of the domain-specific chronometry dataset;
a sequence value for the instance of the second chronometric unit with respect to an ordered sequence of second chronometric units within the era of the domain-specific chronometry dataset;
a second temporal location expressed in accordance with the canonical chronometry, the second temporal location corresponding to a minimum first chronometric unit with respect to the ordered sequence of first chronometric units within the instance of the second chronometric unit of the domain-specific chronometry dataset;
a third temporal location expressed in accordance with the canonical chronometry, the third temporal location corresponding to a maximum first chronometric unit with respect to the ordered sequence of first chronometric units within the instance of the second chronometric unit of the domain-specific chronometry dataset;
a sequence value for the instance of the third chronometric unit with respect to an ordered sequence of third chronometric units within the era of the domain-specific chronometry dataset;
a fourth temporal location expressed in accordance with the canonical chronometry, the fourth temporal location corresponding to a minimum first chronometric unit with respect to the ordered sequence of first chronometric units within the instance of the third chronometric unit of the domain-specific chronometry dataset;
a fifth temporal location expressed in accordance with the canonical chronometry, the fifth temporal location corresponding to a maximum first chronometric unit with respect to the ordered sequence of first chronometric units within the instance of the third chronometric unit of the domain-specific chronometry dataset;
a sequence value for the instance of the fourth chronometric unit with respect to an ordered sequence of fourth chronometric units within the era of the domain-specific chronometry dataset;
a sixth temporal location expressed in accordance with the canonical chronometry, the sixth temporal location corresponding to a minimum first chronometric unit with respect to the ordered sequence of first chronometric units within the instance of the fourth chronometric unit of the domain-specific chronometry dataset;
a seventh temporal location expressed in accordance with the canonical chronometry, the seventh temporal location corresponding to a maximum first chronometric unit with respect to the ordered sequence of first chronometric units within the instance of the fourth chronometric unit of the domain-specific chronometry dataset;
a sequence value for the instance of the fifth chronometric unit with respect to an ordered sequence of fifth chronometric units within the era of the domain-specific chronometry dataset;
an eighth temporal location expressed in accordance with the canonical chronometry, the eighth temporal location corresponding to a minimum first chronometric unit with respect to the ordered sequence of first chronometric units within the instance of the fifth chronometric unit of the domain-specific chronometry dataset; and a ninth temporal location expressed in accordance with the canonical chronometry, the ninth temporal location corresponding to a maximum first chronometric unit with respect to the ordered sequence of first chronometric units within the instance of the fifth chronometric unit of the domain-specific chronometry dataset.

20. The apparatus of claim 19, wherein to store the domain-specific chronometry dataset the processor executes the instructions to store the chronometric instance data and the secondary chronometric instance data.

\* \* \* \* \*